(12) United States Patent
Gray

(10) Patent No.: US 10,419,338 B2
(45) Date of Patent: Sep. 17, 2019

(54) CONNECTING DIVERSE CLIENT CORES USING A DIRECTIONAL TWO-DIMENSIONAL ROUTER AND NETWORK

(71) Applicant: Gray Research LLC, Bellevue, WA (US)

(72) Inventor: Jan Stephen Gray, Bellevue, WA (US)

(73) Assignee: Gray Research LLC, Bellevue, WA (US)

( * ) Notice: Subject to any disclaimer, the term of this patent is extended or adjusted under 35 U.S.C. 154(b) by 0 days.

(21) Appl. No.: 16/140,536

(22) Filed: Sep. 25, 2018

(65) Prior Publication Data

US 2019/0028387 A1 Jan. 24, 2019

Related U.S. Application Data

(63) Continuation of application No. 14/986,532, filed on Dec. 31, 2015, now Pat. No. 10,116,557.

(Continued)

(51) Int. Cl.
| | | |
|---|---|---|
| *H04L 12/773* | (2013.01) | |
| *H04L 12/933* | (2013.01) | |
| *H04L 12/931* | (2013.01) | |

(52) U.S. Cl.
CPC ............ *H04L 45/60* (2013.01); *H04L 49/106* (2013.01); *H04L 49/40* (2013.01)

(58) Field of Classification Search
CPC ........ H04L 45/60; H04L 49/106; H04L 49/40
See application file for complete search history.

(56) References Cited

U.S. PATENT DOCUMENTS

| 5,612,908 A | 3/1997 | Pechanek et al. |
| 7,568,064 B2 | 7/2009 | Reblewski et al. |

(Continued)

FOREIGN PATENT DOCUMENTS

| CN | 1669274 A | 9/2005 |
| WO | 2013033832 A1 | 3/2013 |

(Continued)

OTHER PUBLICATIONS

"Hoplite: FPGA Router and NOC Tools", 25th International Conference on Field-Programmable Logic and Applications, Sep. 2015, pp. 1-2, FPGA CPU News.

(Continued)

*Primary Examiner* — Shailendra Kumar
(74) *Attorney, Agent, or Firm* — Fogg & Powers LLC

(57) ABSTRACT

A configurable directional 2D router for Networks on Chips (NOCs) is disclosed. The router is well suited for implementation in programmable logic in FPGAs, and achieves theoretical lower bounds on FPGA resource consumption for various applications. The router may employ an FPGA router switch design that consumes only one 6-LUT or 8-input ALM logic cell per router per bit of router link width. A NOC comprising a plurality of routers may be configured as a directional 2D torus, or in diverse ways, network sizes and topologies, data widths, routing functions, performance-energy tradeoffs, and other options. System on chip designs may employ a plurality of NOCs with different configuration parameters to customize the system to the application or workload characteristics. A great diversity of NOC client cores, for communication amongst various external interfaces and devices, and on-chip interfaces and resources, may be coupled to a router in order to efficiently communicate with other NOC client cores. The router and NOC enable feasible FPGA implementation of large integrated systems (Continued)

on chips, interconnecting hundreds of client cores over high bandwidth links, including compute and accelerator cores, industry standard IP cores, DRAM/HBM/HMC channels, PCI Express channels, and 10G/25G/40G/100G/400G networks.

34 Claims, 25 Drawing Sheets

Related U.S. Application Data

(60) Provisional application No. 62/165,774, filed on May 22, 2015.

(56) References Cited

U.S. PATENT DOCUMENTS

| | | | |
|---|---|---|---|
| 8,631,205 B1 | 1/2014 | Wentzlaff et al. | |
| 8,812,287 B2 | 8/2014 | Barus | |
| 10,116,557 B2 | 10/2018 | Gray et al. | |
| 2002/0177990 A1* | 11/2002 | Sample | G01R 31/3177 703/28 |
| 2004/0250046 A1 | 12/2004 | Gonzalez et al. | |
| 2005/0050233 A1 | 3/2005 | Anjo et al. | |
| 2008/0229059 A1 | 9/2008 | May | |
| 2009/0108906 A1* | 4/2009 | Butler | H04N 5/268 327/387 |
| 2009/0125574 A1 | 5/2009 | Mejdrich et al. | |
| 2009/0257360 A1 | 10/2009 | Patel et al. | |
| 2011/0243147 A1* | 10/2011 | Paul | H04L 45/60 370/401 |
| 2013/0160026 A1 | 6/2013 | Kuesel et al. | |
| 2014/0376557 A1* | 12/2014 | Park | G06F 15/17381 370/400 |
| 2016/0344629 A1 | 11/2016 | Gray | |
| 2017/0063625 A1 | 3/2017 | Philip et al. | |
| 2017/0220499 A1 | 8/2017 | Gray | |

FOREIGN PATENT DOCUMENTS

| | | |
|---|---|---|
| WO | 2013119241 A1 | 8/2013 |
| WO | 2016191304 A1 | 12/2016 |
| WO | 2017120270 A1 | 7/2017 |

OTHER PUBLICATIONS

"The Past and Future of FPGA Soft Processors", FPGA CPU News, Dec. 31, 2014, pp. 1-2, fpga.org.
China Intellectual Property Office, "First Office Action from CN Application No. 201680041674.3 dated Feb. 20, 2019", from Foreign Counterpart to U.S. Appl. No. 14/986,532, Feb. 20, 2019, pp. 1-9, Published: CN.
U.S. Patent and Trademark Office, "Office Action", U.S. Appl. No. 15/945,662, dated Apr. 8, 2019, pp. 1-7, Published: US.
Gray, "GRVI Phalanx on Xilinx Virtex UltraScale+: A 1680-core, 26 MB RISC-V Parallel Processor Overlay", Gray Research LLC, pp. 1-2.
U.S. Patent and Trademark Office, "Office Action", U.S. Appl. No. 15/398,701, dated Nov. 19, 2018, pp. 1-52, Published: US.
Gray, "Multiprocessors, Jan's Razor, resource sharing, and all that", FPGA CPU News of Mar. 2002, Mar. 5, 2002, pp. 1-4, fpgacpu.org.
International Bureau, "International Preliminary Report on Patentability from PCT Application No. PCT/US2016/033618 dated Dec. 7, 2017", from Foreign Counterpart to U.S. Appl. No. 14/986,532, Dec. 7, 2017, pp. 1-14, Published: Switzerland.
International Bureau, "International Preliminary Report on Patentability from PCT Patent Application No. PCT/US2017/012230 dated Jul. 19, 2018", "from Foreign Counterpart of U.S. Appl. No. 15/398,701", Jul. 19, 2018, pp. 1-11, Published in: WO.
International Searching Authority, "Corrected Page of International Searching Authority (dated Jun. 8, 2017) from PCT Application No. PCT/US2017/012230 dated Jun. 29, 2017", from Foreign Counterpart to U.S. Appl. No. 15/398,701, Jun. 29, 2017, pp. 1-2, Published: WO.
International Searching Authority, "Invitation to Pay Additional Fees from PCT Application No. PCT/US2016/033618 dated Aug. 8, 2016", from Foreign Counterpart to U.S. Appl. No. 14/986,532, Aug. 8, 2016, pp. 1-8, Published: EP.
International Searching Authority, "Invitation to Pay Additional Fees from PCT Application No. PCT/US2017/012230 dated Apr. 13, 2017", from Foreign Counterpart to U.S. Appl. No. 15/398,701, Apr. 13, 2017, pp. 1-8, Published: EP.
International Searching Authority, "Notification of Transmittal of the International Search Report and Written Opinion of the International Searching Authority from PCT Application No. PCT/US2017/012230 dated Jun. 8, 2017", from Foreign Counterpart to U.S. Appl. No. 15/398,701, Jun. 8, 2017, pp. 1-18, Published: EP.
International Searching Authority, "Notification of Transmittal of the International Search Report and Written Opinion of the International Searching Authority from PCT Application No. PCT/US2016/033618 dated Sep. 30, 2016", from Foreign Counterpart to U.S. Appl. No. 14/986,532, Sep. 30, 2016, pp. 1-19, Published: EP.
U.S. Patent and Trademark Office, "Notice of Allowance", U.S. Appl. No. 14/986,532, dated Jun. 18, 2018, pp. 1-19, Published: US.
U.S. Patent and Trademark Office, "Office Action", U.S. Appl. No. 14/986,532, dated Aug. 29, 2017, pp. 1-32, Published: US.
European Patent Office, "Communication under Rule 164(2)(a) from EP Application No. 16726752.5 dated Mar. 18, 2019", from Foreign Counterpart to U.S. Appl. No. 14/986,532, pp. 1-5, Published: EP.
European Patent Office, "Communication pursuant to Rule 164(2)(b) and Article 94(3) from EP Application No. 16726752.5 dated Jun. 21, 2019", from Foreign Counterpart to US Appl. No. 14/986,532, pp. 1-13, Published: EP.
Krishna et al., "Towards the Ideal On-chip Fabric for 1-to-Many and Many-to-1 Communication", 2011, pp. 71-82, ACM.
Ma et al., "Supporting Efficient Collective Communication in NoCs", 2011, pp. 1-12, IEEE.

\* cited by examiner

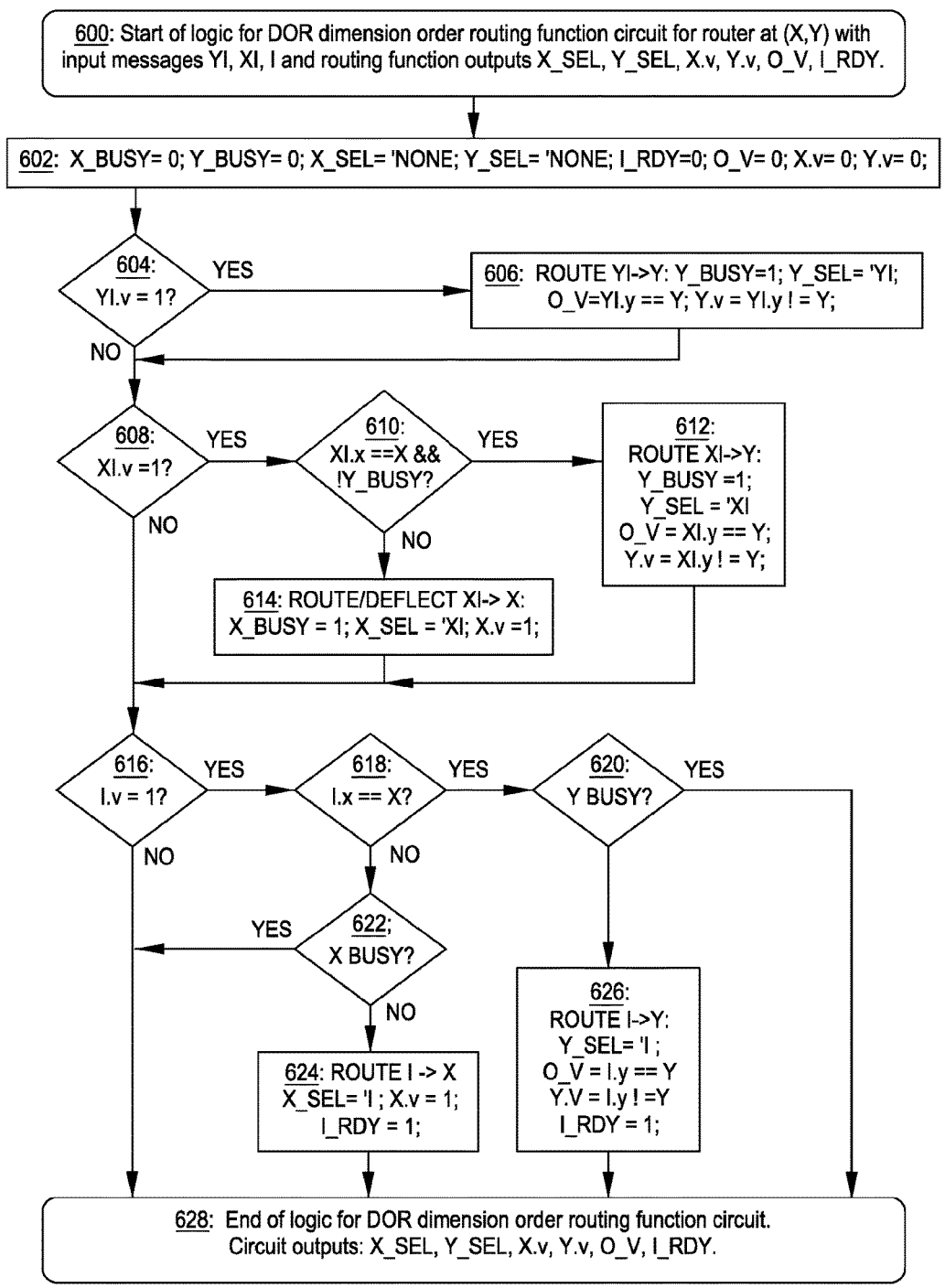

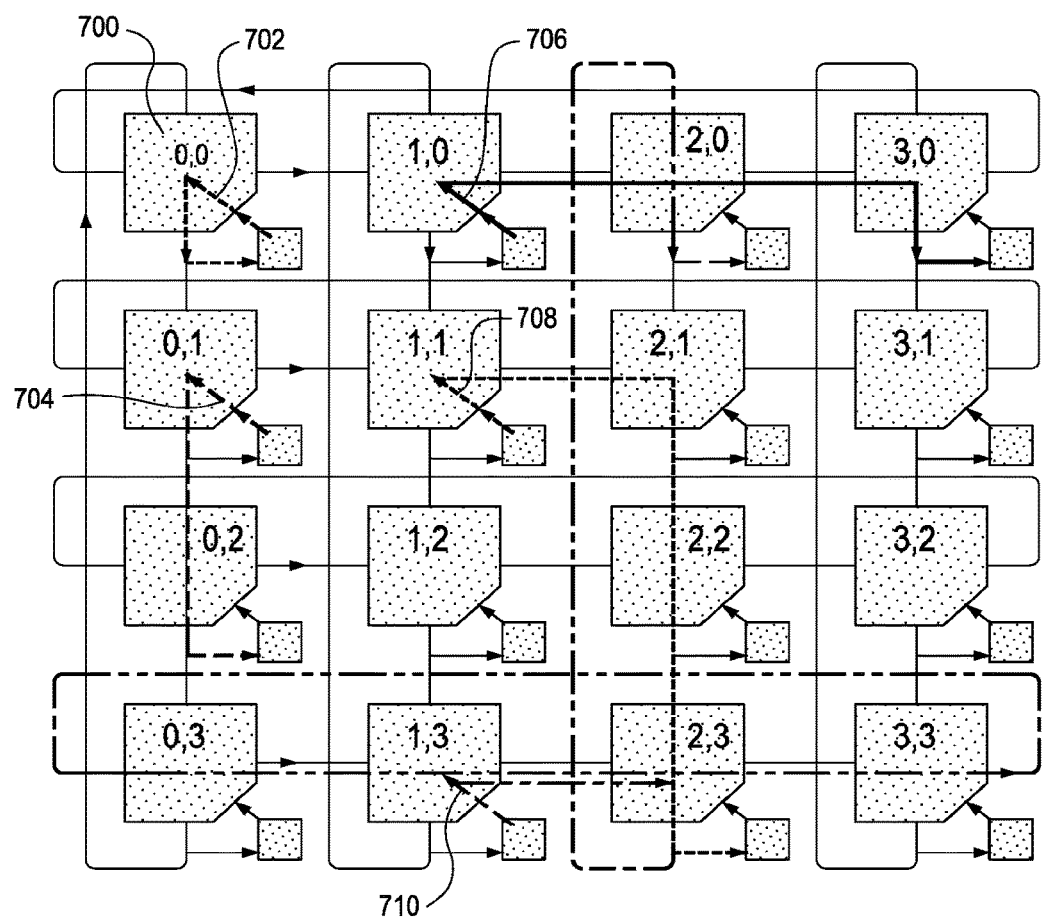

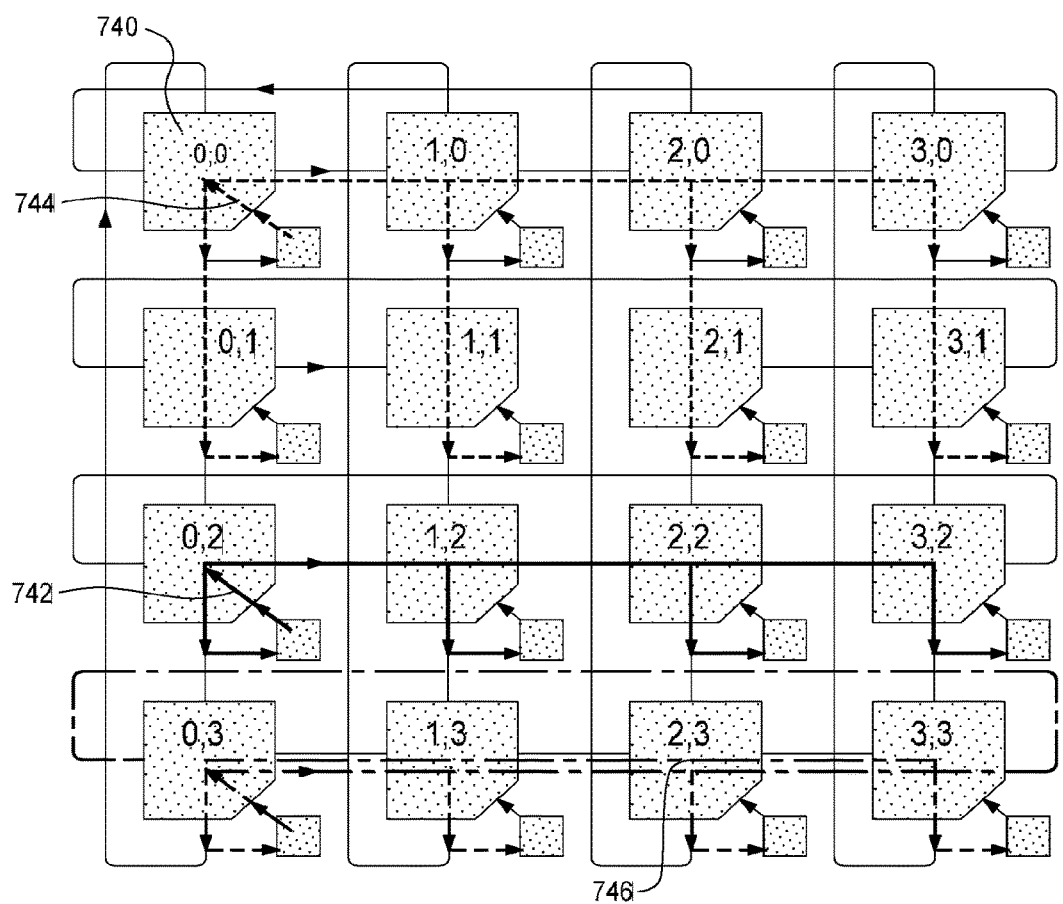

FIG. 13B

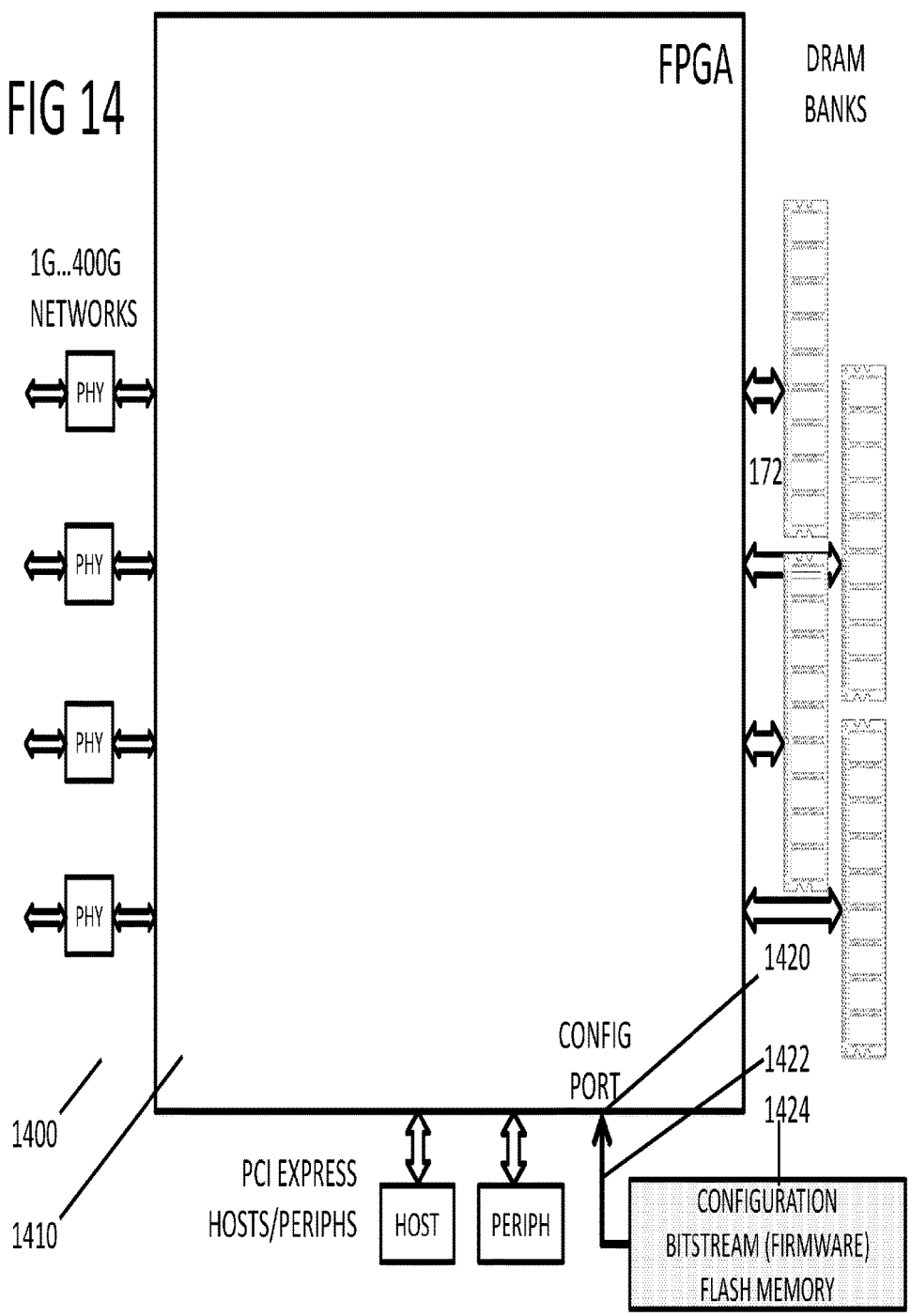

CONNECTING DIVERSE CLIENT CORES USING A DIRECTIONAL TWO-DIMENSIONAL ROUTER AND NETWORK

CROSS-RELATED APPLICATIONS/PRIORITY CLAIM

This application is a continuation of U.S. patent application Ser. No. 14/986,532 filed Dec. 31, 2015 entitled "DIRECTIONAL TWO-DIMENSIONAL ROUTER AND INTERCONNECTION NETWORK FOR FIELD PROGRAMMABLE GATE ARRAYS, AND OTHER CIRCUITS AND APPLICATIONS OF THE ROUTER AND NETWORK" which claims the benefit of U.S. Provisional Patent Application Ser. No. 62/165,774 filed on May 22, 2015 entitled "BUFFERLESS DIRECTIONAL 2D ROUTER AND INTERCONNECTION NETWORK FOR FPGAS, AND APPLICATIONS", the contents of both applications are incorporated herein by reference in their entirety.

TECHNICAL FIELD

The present disclosure relates generally to electronic circuits, and relates more specifically to, e.g., interconnection-network design, field programmable gate array (FPGA) design, computer architecture, and electronic design automation tools.

DESCRIPTION OF THE RELATED ART

The present disclosure pertains to the design and implementation of network-on-chip ("NOC") interconnection networks for efficient implementation in programmable logic in FPGAs. As FPGAs grow in capacity and add support for many very high-bandwidth interfaces and input/output (I/O) channels, and host many more client cores on the same integrated system on a chip (SOC), it is a difficult challenge to implement, in programmable logic, a feasible, scalable, efficient interconnection network so that high-speed data may flow at full bandwidth (i.e., capable of transmission of data at the maximum data rate that a source core (circuit) may produce it or that a destination core may consume it) between and amidst many client cores and the external interface cores.

For example, an FPGA may directly attach to eight channels of Double-Data-Rate-4 (DDR4) Dynamic Random Access Memory (DRAM), to eight channels of High Bandwidth (HBM) [8] DRAM memory, or to sixteen channels of Hybrid Memory Cube (HMC) [9] DRAM memory, each channel capable of reading or writing data at 100-250 Gigabits per second (Gbps). In addition, the FPGA may directly attach to four to sixteen channels of 25-100 Gbps Ethernet interfaces. A large FPGA (SOC) system design may employ an interconnection network system to transport all these data streams at full bandwidth amidst and between any client core site on the FPGA and any DRAM channel-interface core or network-interface core on the FPGA.

To date, prior-art research on FPGA NOC designs has produced complex FPGA NOC systems that consume many FPGA resources for the limited bandwidth they deliver, and that are relatively slow as messages cross routers across the network. Prior-art NOC sizes are relatively small (e.g., the number of clients is fewer than ten), link bandwidths are relatively low (narrow links), and routing latencies are relative high. For example, the recent CMU CONNECT [4] research in optimizing state-of-the-art NOC routers for implementation in FPGAs, widely used by FPGA researchers, and presented at a peer reviewed FPGA conference, achieved a 16-client, 16-router, 4×4 buffered Virtual Channel (VC) router with 64-bit links (transporting 64-bits per clock cycle per inter-router-link) for a component "cost" of 38,000 6-input Look-Up Tables (LUTs), with a minimum latency through one CONNECT router of 11 nanoseconds (ns).

Similarly, FPGA designs composing dozens of client cores to interconnect with each other and with many channels of high-bandwidth data, whether Random Access Memory (RAM), FLASH, 10G/25G/40G/100G networks, 64 Gbps PCI-express gen3×8, InfiniBand, 4K/8K (ultra-high-definition) video-stream data, and so forth, do not have a practical prior-art solution to achieve such a full-bandwidth SEE ABOVE NOC in an FPGA.

Another challenge for FPGA system design is to support interconnection of client cores into massively parallel systems when some messages have a high fan out, e.g., copies of some messages are desired to be sent to many destination client cores, but sending so many individual messages is prohibitive. Multicast messages, which are each delivered to a plurality of client cores simultaneously, or approximately simultaneously, have been proposed for other domains, but there is no prior art for an FPGA NOC system which can concurrently deliver any mix of both arbitrary point-to-point messages and high-fan-out X-, Y-, and XY-multicast (broadcast) messages.

Related Art in NOC and FPGA Specific NOC Design

The literature [3] on design of 2D torus networks assumes topologies and router microarchitectures optimized for ASICs and for high throughput under heavy load. A textbook torus router tackles system design challenges such as variable message sizes (64-bit request vs. 576-bit response), priority, fairness, and deadlock freedom, using segmentation/reassembly of messages into/from Flow Control Digits (FLITS), input buffers, virtual channels, flow-control credits, and 5-port crossbars to route North (N)/South (S)/East (E)/West (W) input flits to N/S/E/W/output links. Such NOCs achieve good throughput and latency, at the cost of design complexity and per-router latency and area.

For some FPGA based systems and workloads, such designs are unnecessarily large, complex, or slow. The many hundreds, or thousands, of FPGA LUTs required by such a router core can dwarf the area of its client compute core ("client"). The purpose the NOC is to efficiently interconnect the client cores. An FPGA SOC may not be feasible or practical if too many of its FPGA resources, or too much of the system power budget, are devoted to the NOC.

A 2D torus NOC implemented with 5-port buffered virtual channel (VC) routers [3] is very large and consumes many FPGA resources. Focusing on a router's data path, it can be shown that the minimal FPGA area for a link/flit width of w bits is 5(w+2 w)=15 w LUTs, assuming w dual-port LUT RAMs for input buffers (shared across VCs) and 2w LUTs for a w-bit 5×5 crossbar. Also, buffer LUT RAM can be a resource constraint: for example, in modern FPGAs manufactured and sold by Xilinx, only 25-50% of LUTs implement LUT RAM (and client cores often use it all).

Existing router-control logic (to control the router data path) is also resource intensive, often requiring buffer First-In-First-Out (FIFO) address counters and credit-flow-control counters for each VC. The routing function and output allocators take many more LUTs. In the CONNECT [4] work, Papamichael and Hoe measure the total FPGA area of a "high quality" "state of the art" NOC router [5]. Despite tuning the Register Transfer Language (RTL), which is a hardware-definition language, implementation for an FPGA implementation, and choosing design parameters to minimize area, the router is enormous: ~3000 LUTs (w=32, 4 VCs) to ~5200 LUTs (w=128, 4 VCs).

Also, this router logic does not account for the complex NOC interface to the client core. If messages are segmented into flits, then the client may need to reassemble multiple incoming messages from the interleaved flits that compose the incoming messages.

The CONNECT work [4] examines VC router microarchitecture for area-efficient FPGA implementation. It recommends shallow or no pipelining and wider link widths. And it provides a "virtual links" option to simplify the client interface. These insights produce a more compact router requiring ~1500 LUTs (w=32, 5 ports, 2 VCs, 4 flits buffered/VC)—but this is still far too resource intensive for many FPGA SOC applications.

Kim [6] evaluates an area-efficient 2D torus router design for ASICs employing dimension-order routing, dimension sliced crossbar, limited router buffering except between dimensions, and modified credit-flow control. Each router in this design is at the intersection of bidirectional X and Y rings. A packet is routed in the first dimension (X) until it reaches a router with the matching X coordinate. It then alights in a FIFO buffer en route to the Y ring, which it traverses until it reaches the destination (x,y) router and exits the network. The dimension-sliced router data path uses two 3×3 crossbars instead of a 5×5 crossbar. Link arbitration is prioritized to packets already in flight. These techniques help reduce some of the unnecessary complexity, latency, and resource use of a router, but amongst its shortcomings the work does not consider FPGA implementation or optimization, does not eliminate buffers in the network, does not simplify the switches as much as possible, and does not optimize the other router logic to the extent possible, as is disclosed elsewhere herein.

Moscibroda and Mutlu [7] evaluate a fast and area-efficient bufferless 5-port 2D torus router design for ASICs, employing deflection routing on output-link contention. Latency is excellent, but only if the network utilization is low (low injection rates). The authors note "[f] or larger traffic volumes, the fundamental effect of removing buffers is a reduction of the total available bandwidth in the network," and they explore various routing functions to mitigate this pitfall. Here again, this work on bufferless routers achieves improved area and energy efficiency vs. buffered VC routers, but it too fails to consider FPGA implementation or optimization and employs a far more resource intensive 2D torus of bidirectional links, and router switches comprising 5×5 crossbar switches.

REFERENCES

[1] Altera Corp., "Arria 10 Core Fabric and General Purpose I/Os Handbook," May 2015, www.altera.com.
[2] Xilinx Inc., "UltraScale Architecture and Product Overview, DS890 v2.0," February 2015, www.xilinx.com.
[3] W. Dally and B. Towles, Principles and Practices of Interconnection Networks. Morgan Kaufmann, 2004.
[4] M. K. Papamichael and J. C. Hoe, "Connect: Re-examining conventional wisdom for designing nocs in the context of fpgas," in Proceedings of the ACM/SIGDA International Symposium on Field Programmable Gate Arrays, ser. FPGA '12. New York, N.Y., USA: ACM, 2012, pp. 37-46.
[5] Stanford Concurrent VLSI Architecture Group, "Open Source Network-on-Chip Router RTL", nocs.stanford.edu.
[6] J. Kim, "Low-cost router microarchitecture for on-chip networks," in Microarchitecture, 2009. MICRO-42. 42nd Annual IEEE/ACM International Symposium on, December 2009, pp. 255-266.
[7] T. Moscibroda and O. Mutlu, "A case for bufferless routing in on-chip networks," in Proceedings of the 36th Annual International Symposium on Computer Architecture, ser. ISCA '09. New York, N.Y., USA: ACM, 2009, pp. 196-207.
[8] JEDEC "High Bandwidth Memory (HBM) DRAM Specification", JESD235, www.jedec.org.
[9] Hybrid Memory Cube Consortium, "Hybrid Memory Cube Specification 1.0", hybridmemorycube.org.

SUMMARY

In contrast to prior-art NOC systems, an embodiment of the "Hoplite" router and Hoplite NOC system disclosed herein implement a 64-bit wide 4×4 directional torus deflection router in just 1230 6-LUTs, with a latency of only 2-3 ns per router. Although both CONNECT and an embodiment of the Hoplite NOC provide the service of interconnecting all client cores in the NOC and, in this example, deliver 64-bit messages from any client to any other client, an embodiment of the Hoplite NOC system is over one hundred times more efficient (expressed as a product of area and latency ratios) for this application—i.e., (38,000 LUTs×11 ns)/(1230 LUTs×2.5 ns) equals a 135 better area×delay product.

An embodiment of the Hoplite router and NOC are so frugal in their use of FPGA resources that they enable practical and cost-effective large NOCs with extremely wide high-bandwidth links, attached to many high-speed interfaces. For example, in an embodiment, a 50-client, 50-router, 10×5 Hoplite torus NOC to route DRAM channel data at a 153 Gbps bandwidth has been designed for implementation in a Xilinx XVU095 device. Each link is extremely wide (576 bits (nets)) (a net is the name of a programmable logic "wire" in an FPGA), the clock period is 3.3 ns (cycle rate/frequency of 300 MHz), the data bandwidth of each link is 153 Gbps, and, during each cycle, any of the 50 clients across the FPGA can send and receive 576-bit messages to/from other clients including DRAM channel-controller clients. This implementation uses just 5% of the die area of the FPGA, leaving abundant resources for the client cores.

An embodiment of the Hoplite router and NOC may be configured to implement X-, Y-, and XY-multicast message delivery, and regular and multicast messages sent from diverse clients can traverse the network concurrently.

The many features of embodiments of the Hoplite router and NOC, and of other embodiments of the disclosure, include, without limitation:

1) A directional torus topology and deflection routing system;
2) A directional 2D bufferless deflection router;
3) a five-terminal (3-messages-in, 2-messages-out) message router switch;
4) optimized technology mapping of router switch elements in Altera 8-input fracturable LUT ALM ("adaptive logic module") [1] (manufactured and sold by Altera) and Xilinx 6-LUT [2] FPGA technologies that consume only one ALM or 6-LUT per router per bit of link width;

5) a router design with routing-control circuit and message-switching circuit that incurs zero LUT delays (FPGA programmable logic gate delays) between upstream router output registers and the router switch elements;
6) a router design with routing-control circuit and message-switching circuit that incurs as few as one LUT delay between upstream router output registers and the router output registers
7) a system with configurable and flexible routers, links, and NOCs;
8) a NOC in which the routing function is reconfigurable;
9) a NOC with mutable message metadata;
10) a NOC with configurable multicast-message-delivery support;
11) a NOC client interface, supporting atomic message send and receive each cycle, with NOC and client-flow control;
12) a configurable NOC floor-planning system;
13) a NOC configuration specification language;
14) a NOC generation tool to generate a workload-specific NOC design from a NOC configuration specification, including, without limitation, synthesizable hardware-definition-language code, simulation test bench, FPGA floor-plan constraints, FPGA implementation constraints, and documentation.
15) Diverse applications of the NOC as described herein below.

In embodiments for Altera and Xilinx FPGAs, the Hoplite router core, and its constituent submodules and FPGA configurations, is so highly efficient that its FPGA resource consumption achieves theoretical lowest bounds for circuits providing a same functionality.

In the design of an embodiment of the Hoplite router, and an embodiment of the composition of Hoplite routers into a Hoplite NOC, traditional torus-router-design orthodoxy was rejected, torus router design was rethought, and a new torus-router-design paradigm was developed from "the ground up." An embodiment of Hoplite employs novel network topology, client interface, atomic message sends, modular configurable routing functions, and router functionality, microarchitecture, FPGA technology mapping, and energy savings, FPGA configurability, design automation tools, and other innovations, to achieve a NOC router design that consumes only about 10+w LUTs per Hoplite router (where w is the link width, e.g., the number of wires in a "link" between routers, or between a client and a router, as described above). Therefore, an embodiment of a Hoplite NOC typically occupies less than one tenth of the area of a conventional NOC (excluding the area occupied by the NOC clients).

In contrast with conventional routers and NOCs, an embodiment of a Hoplite router and NOC includes one or more of the following features: unidirectional, not bidirectional links, output links that share (repurpose) NOC links, a switch data-path transfer function designed for unidirectional torus dimension-order routing, no buffers at all, no virtual channels in the client or router, no credit-flow control, no message segmentation or reassembly, an atomic message/cycle client interface, configurable ultra-wide links, configurable routing function, configurable multicast support, configurable per-client input message elision, configurable (0-n) link pipeline registers, configurable switch-energy reduction, an FPGA-area-efficient technology mapped and floor-planned data path (orders of magnitude smaller); lower switch latency, and lower no-load latency.

Embodiments of these design elements and others herein disclosed contrast starkly with prior work. For example, the Torus16 network in [4], a 4×4 torus of 64-bit-flits-5-port-2-VC routers, consumes 25% of a 150,720 LUT XC6VLX240T Xilinx device, e.g., ~38,000 LUTs, and has a router latency of 11 ns. In comparison, an embodiment of a Hoplite NOC comprising a folded 4×4 directional torus of 64-bit-message Hoplite routers consumes 1230 LUTs and has a router latency of <3 ns. Here, for workloads with moderate message injection rates that do not saturate the NOC, an embodiment of the Hoplite NOC system consumes <3% of the resources of the prior work, and is over three times faster!

An embodiment of a system comprises configurable Hoplite-router and NOC-hardware designs, and a configuration tool to generate NOC circuit designs from a text-based NOC specification.

An embodiment of a Hoplite router is a 2D bufferless deflecting router with routing circuit and switching circuit designed for implementation in Altera ALM-based FPGAs and Xilinx 6-LUT-based FPGAs.

An embodiment of a Hoplite NOC is a composition of a plurality of Hoplite routers and links to form a directional 2D torus.

A system-on-chip design may employ a plurality of Hoplite NOCs with different configuration parameters to customize the design to the application or workload characteristics. Hoplite enables feasible FPGA implementation of large NOCs interconnecting hundreds of client cores over high-bandwidth links, including compute and accelerator cores, DRAM channels, PCI-express channels, and 10G/25G/40G/100G networks.

BRIEF DESCRIPTION OF THE DRAWINGS

FIG. 6 is a flow diagram of the operation of the routing circuit 350 of FIG. 3, according to an embodiment. Typically, the algorithm described by a flow diagram such as the flow diagram of FIG. 6 is converted into the circuitry that forms the routing circuit 350 by representing the algorithm in synthesizable hardware description language (HDL), such as Verilog. An example of a Verilog representation of an embodiment of the routing circuit 350 is provided below.

FIGS. 7A-7D are diagrams of several respective embodiments of NOC routing scenarios, illustrating hop-by-hop message transport across a ring from source client to destination client, using deflecting dimension-order routing and multicast message delivery. FIG. 7A is a diagram of ordinary point-to-point message delivery for messages to self (702), on a Y ring (704), on an X ring (706), on an X ring and then a Y ring (708), and (with deflection) on an X ring and a Y ring. FIG. 7B is a diagram of Y-ring multicast message delivery, sending to a client's home Y ring (722), and sending to a different Y ring (724). FIG. 7C is a diagram of X-ring multicast delivery, sending to a client's home X ring (744), and sending to another X ring (742), and sending to an X ring (with deflection) 746. And FIG. 7D is a diagram of delivery of a message broadcast to every client in the NOC 762.

FIG. 8A is a diagram of a floorplan of an 18×24 (432 router) folded 2D torus NOC of w=50-bit messages, as could be employed in a massively parallel processor or accelerator array. FIGS. 8B and 8C are diagrams of a floorplan of a 5×10 (50 router) folded 2D torus NOC of w=576-bit messages, as could be employed in a high-performance computing or networking accelerator application. FIG. 8B is a photograph of a die plot (floor-plan printout) of the 50-router NOC design, implemented in a Xilinx Kintex UltraScale KU040 device; FIG. 8C is a diagram of the same design as in FIG. 8B. Each link in the system of FIGS. 8B and 8C carries 180 Gbps of data bandwidth, sufficient to route 4-8 channels of 2400 MHz DDR4 DRAM memory traffic to and from any client core at any site in the FPGA.

FIG. 11 is a high-level diagram of an embodiment of a computing device 1100 of the FPGA computing system, where the computing device 1100 comprises an SOC implemented in an FPGA 1102, network interfaces 1106, PCI-express interfaces 1114, connected PCI-express host 1110, and DRAM 1120. The FPGA computing system also comprises HBM DRAM memory 1130, which includes numerous HBM DRAM channels 1132, and a plurality of multi-processor-accelerator-cluster client cores 1180.

FIG. 12 is a diagram of an embodiment of one multiprocessor cluster tile of the FPGA computing system of FIG. 11, where the system comprises a Hoplite router 1200 coupled to its neighboring Hoplite routers (not shown) and coupled to the accelerated-multiprocessor-cluster client core 1210. The exemplary cluster 1210 comprises eight soft processor cores 1220, which share access to a cluster RAM (CRAM) 1230, which, in turn, is connected to a shared accelerator core 1250, and to the router 1200 to send and receive messages over the NOC. In the exemplary FPGA computing system described herein, the system comprises fifty such tiles, or four hundred processors in all. The NOC is used to carry data between clusters, between clusters and external interface cores (for example to load or store to external DRAM), and directly between external interface cores.

To illustrate an example reduction to practice of an embodiment of the above-described system, FIGS. 13A-13D are diagrams of four die plots that illustrate different aspects of the physical implementation and floor planning of such a system and its NOC.

FIG. 13A is a diagram of the FPGA SOC overall, according to an embodiment. FIG. 13A overlays a view of the logical subdivision of the FPGA into 50 clusters.

FIG. 13B is a diagram of the high-level floorplan of the tiles that lay out the router+cluster tiles in a folded 2D torus, according to an embodiment.

FIG. 13C is a diagram of the explicitly placed floorplanned elements of the design, according to an embodiment.

FIG. 13D is a diagram of the logical layout of the NOC that interconnects the clusters 1210 (FIG. 12).

FIG. 14 illustrates how a disclosed router, NOC, and application system design, after processing by FPGA implementation tools, is manifest in an FPGA configuration bitstream file; how that file is stored in a configuration FLASH memory or similar computer readable medium; how that configuration bitstream is conveyed to the FPGA, via its configuration port, and then to its configuration system, in order to load the bitstream file internally to configure the device's myriad programmable logic elements and interconnect fabric in order to implement the disclosed router, NOC, and application system.

DETAILED DESCRIPTION

A Hoplite NOC facilitates efficient interconnection and transport of diverse data messages among diverse client cores in an SOC.

Figure 1:
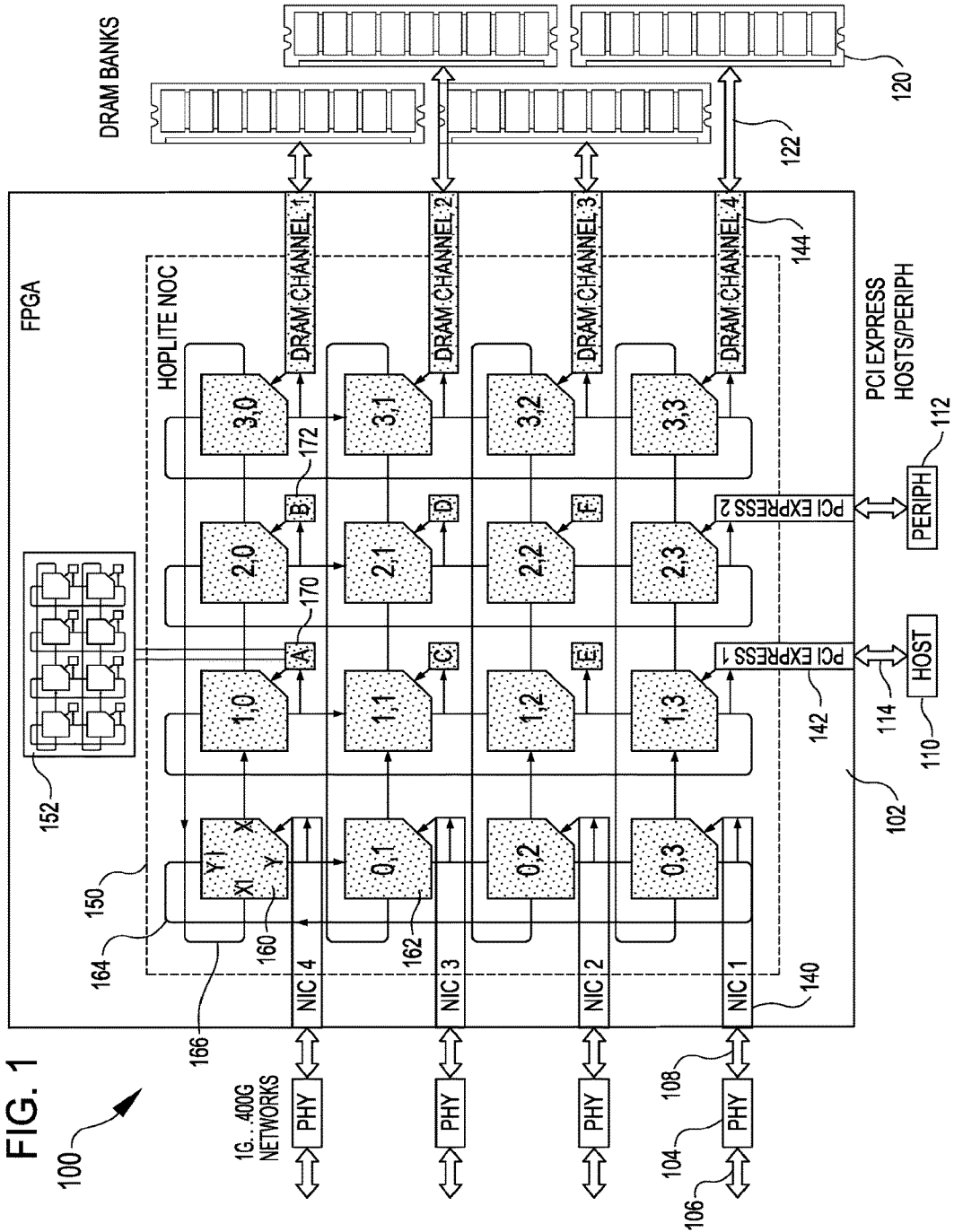
FIG. 1 is a diagram of an embodiment of an integrated computing device 100, which includes an SOC implemented in an FPGA 102, network interfaces 106, PCI-express interfaces 114, coupled PCI-express host and peripheral 110 and 112, and DRAM 120. The FPGA SOC 102 comprises a plurality of client cores including interface cores 140, 142, 144 and user cores 170, 172. The FPGA SOC 102 further comprises Hoplite NOCs 150, 152. NOC 150 interconnects the diverse client cores in a 4×4 2D directional torus. NOC 150 comprises routers 160, 162 and first- and second-dimension ("X" and "Y") unidirectional ring links 164,166.

Referring to FIG. 1, a system 100 comprises diverse interfaces and functions, which are communicatively coupled physically by the I/O pins of an FPGA SOC 102 and PCB traces 108, 114, 122, and which are communicatively coupled functionally by a NOC 150, according to an embodiment. The system 100 comprises network interfaces 106, which are coupled to network PHYs (physical layers) 104, which are coupled by PCB traces 108 to network interface cores 140, which are implemented in the FPGA SOC 102. System 100 further comprises PCI-express interfaces 114 coupled to PCI-express interface cores 142 implemented in FPGA SOC 102. System 100 further comprises a host computing system 110 coupled to FPGA SOC 102 by means of a PCI-express interface 114. System 100 further comprises PCI express peripheral 112 coupled to FPGA SOC 102. System 100 further comprises DRAM 120 coupled by PCB traces 122 to DRAM controller cores 144 implemented in FPGA SOC 102. The FPGA SOC 102 further comprises user cores 170, 172 (designated A-F). The FPGA SOC 102 further comprises NOCs 150 and 152. NOC 150 interconnects the diverse interface cores 140, 142, and 144 and user cores 170 and 172. User core 170 (A) comprises NOC 152 and its submodules (although shown as being separate from the core A in FIG. 1 for clarity, the NOC 152 is actually part of the core A). NOC 150 comprises router cores 160, 162, first-dimension ("X") unidirectional ring links 166, and second-dimension ("Y") unidirectional ring links 164. Although described herein with specificity in conjunction with one or embodiments, The numbers and types of external interfaces to networks, DRAM, and PCI express, the numbers and types of user cores, the numbers and configurations of NOCs, the NOC dimensions, and so forth, are intended to be illustrative, and not limiting. Therefore, it is understood that a diversity of use cases, with and without external interfaces and with different system topologies, are contemplated according to the principles described herein.

The following example of a system use case illustrates the utility and operation of NOC 150, according to an embodiment.

In summary, a host 110 sends a command to PCI-express interface core 142, directing that it initiate a transfer of a block of data from DRAM 120 to network interface 140 for transmission on network 106. In detail, host 110 performs a PCI-express transaction through PCI interface 114 to PCI-express interface 142, which receives the command. PCI-express interface 142 formats a read-memory-request message to request a data transfer from DRAM controller 144 to network interface 140, and sends the message via router (1,3) and via the NOC 150 to DRAM controller 144 via router (3,3). NOC 150 transports the request message from router (1,3) to router (3,3) via router (2,3), and potentially via diverse X links 166. DRAM controller 144 receives the read-request message from router (3,3), performs a DRAM read transaction from the address of the DRAM bank 120 specified by the read-request message, and receives the specified block of data from the specified DRAM address. DRAM controller 144 formats a read-response message comprising the block of data retrieved from the DRAM bank 120 and sends the message via router (3,3) and via the NOC 150 to network interface 140 via router (0,3). NOC 150 transports the response message from router (3,3) to router (3,0) by means of an X link that "wraps around" an X ring, here directly connecting the router (3,3) X link output to the router (0,3) X link input. Network interface 140 receives the message from router (0,3), optionally generates another message containing the data retrieved from the DRAM bank 120, and transmits the data in the format of an Ethernet packet, out of the FPGA, on interface 106 via PHY 104. Of course the preceding is an example; therefore the numbers, types, and sequences of messages and NOC message routing and transport actions described in conjunction with the preceding example, or any other example herein, are intended to be illustrative, and not limiting.

Figure 2A:
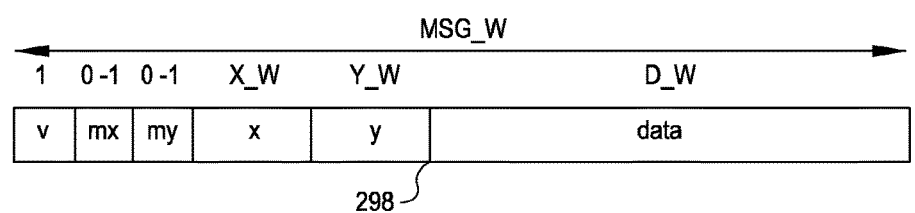
FIG. 2A is a diagram of an embodiment of a Hoplite NOC message 298. A message is a plurality of bits that comprises a first-dimension address 'x', a second-dimension address 'y', a data payload 'data,' and optionally other information such as a message-valid indicator.

FIG. 2A is a diagram of a Hoplite NOC message 298, according to an embodiment.

A message is a plurality of bits that comprises the following fields: a first-dimension address 'x', a second-dimension address 'y', and a data payload 'data'. And the message may further comprise a validity indication 'v,' which indicates to the router core that a message is valid in the current cycle. In an alternative embodiment, this indicator is distinct from a message. The address fields (x,y) correspond to the unique two-dimensional-destination NOC address of the router that is coupled to the client core that is the intended destination of the message. A dimension address may be degenerate (0-bits wide) if it is not required in order that all routers may be uniquely identified by a NOC address. And in alternative embodiment, the destination address may be expressed in an alternative representation of bits, for example, a unique ordinal router number, from which may be obtained by application of some mathematical function, logical x and y coordinates of the router which is the intended destination of the message. In another alternative embodiment, the destination address may comprise bits that describe the desired routing path to take through the routers of the NOC to reach the destination router. In general, a message comprises a description of the destination router sufficient to determine whether the message, as it is traverses a two (or greater) dimensional arrangement of routers, is as of yet at the Y ring upon which resides the destination router, and is as of yet at the X ring upon which resides the destination router.) Furthermore, a message may comprise optional, configurable multicast route indicators "mx" and "my," which facilitate delivery of multicast messages as disclosed herein below.

In an embodiment, each field of the message has a configurable bit width. Router build-time parameters MCAST, X_W, Y_W, and D_W select minimum bit widths for each field of a message and determine the overall message width MSG_W. In an embodiment, the NOC links 250 (FIG. 2B) have a minimum bit width w sufficient to transport a MSG_W-bit message in one cycle.

Figure 2B:
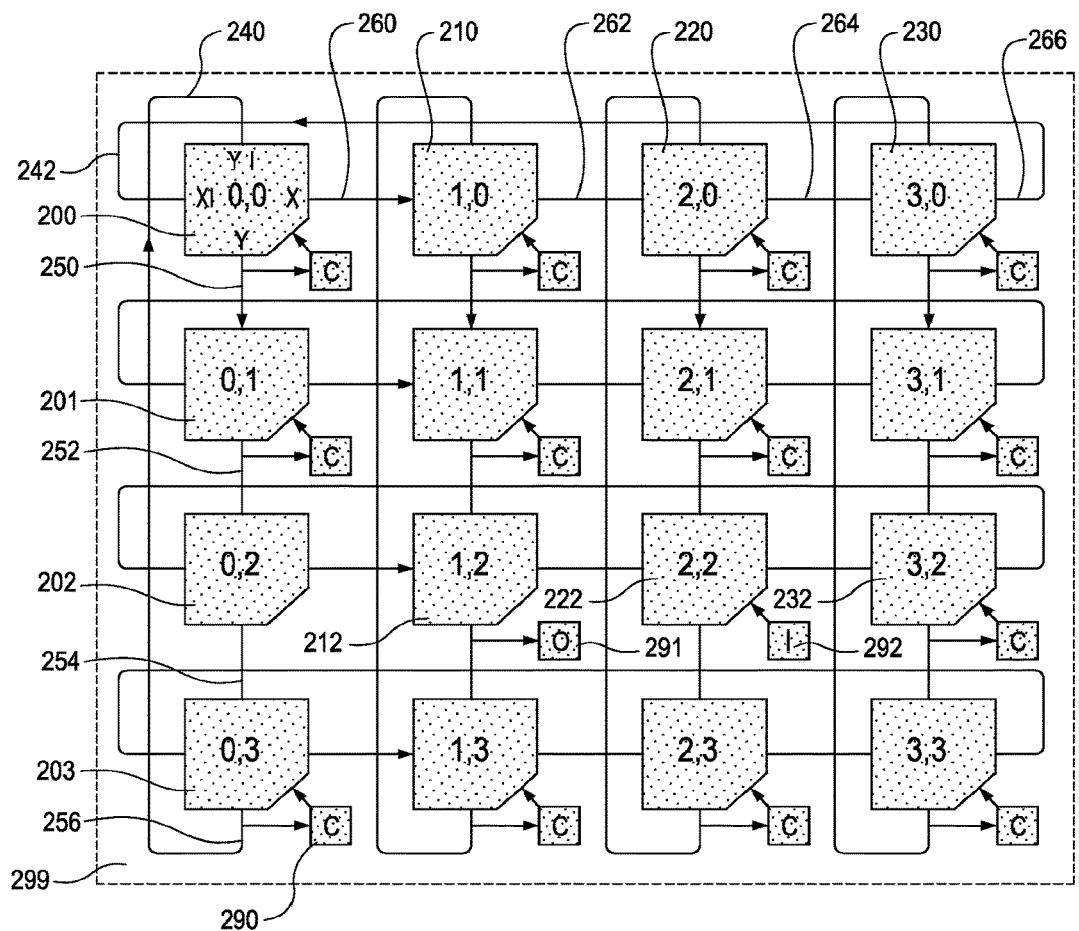
FIG. 2B is a diagram of an embodiment of a Hoplite NOC 299. The NOC 299 comprises a 4×4 torus of 2D routers including routers 200, 201, 202, 203, 210, 212, 220, 222, 230, 232, which intercouple client cores 290, 291, 292 via unidirectional dimensional rings 240, 242, which rings comprise unidirectional links 260, 252, 256, 256, 260, 262, 264, 266. A router 200 comprises message inputs, message outputs, and a router circuit described herein below. Router inputs comprise two-dimensional message inputs designated XI and YI. Router outputs comprise two-dimensional output links designated X and Y. Router inputs may further comprise a client-core message input designated I. A client 290 receives output from a router 203 by sharing the second dimension Y output link 256 with the next router 200 in the same Y ring 240. A router 203 may have a client 290, which sends and receives messages into the NOC 299, or a router 212 may have an output-only client 291 which receives messages only from the NOC 299, or a router 222 may have an input-only client 292 which inputs messages only into the NOC 299, or a router 202 may have no direct connection to any client.

FIG. 2B is a diagram of a NOC 299, according to an embodiment. The NOC 299 comprises a 4×4 torus of 2D routers including routers 200, 201, 202, 203, 210, 212, 220, 222, 230, and 232, which interconnect client cores, including client cores 290, 291, and 292, via unidirectional dimensional rings 240, and 242. Within a NOC, a router is identified by a unique tuple of dimensional coordinates. In a 2D NOC, the two dimensions are herein designated, without loss of generality, X and Y. Therefore, router 200 has NOC address X=0, Y=0, which is also designated (0,0). Similarly router 212 has NOC address X=1, Y=2, or (1,2).

The NOC 299 further comprises a set of unidirectional interconnect links 250, 252, 256, 256, 260, 262, 264, and 266, which form unidirectional dimensional rings 240 and 242. The links may comprise logically parallel wires, conductive traces, pipelines of one or more registers, or any multi-bit communicative coupling channel. The links carry messages that have the structure of the message 298 of FIG. 2A. In an embodiment, the links carry messages atomically, meaning that a message travels in its entirety (i.e., with all its bits at its full width), directly from router to router (or via one or more link pipeline registers), such that the message need not undergo segmentation to, and reassembly from, constituent packets or flits as occurs in some conventional NOCs. For example, if a message is 64 bits wide, then an embodiment of a link includes 64 wires, one wire for each bit of the message. Therefore, the width of a message, and, hence, the minimum logical width of each link in the NOC, is parameter w, which may have a different value for each instance of a NOC.

A router 200 of the NOC 299 comprises message inputs, message outputs, and a router circuit described herein below, according to an embodiment. Router inputs comprise two-dimensional message inputs designated XI and YI. Router outputs comprise two-dimensional output links designated X and Y. And the router inputs may further comprise a client-core message input designated I.

In contrast to conventional 2D routers, the router 200 does not have a dedicated client-message output port. Rather, a client receives a "client output valid" indicator 'O_V,' which indicates the router output to the client is valid and available on the router's second-dimension message output Y.

In an alternative embodiment, a client may receive an output from a router on the router's first-dimension message output X, validated by a client-output-valid indicator O_V. In another alternative embodiment, a client may receive an output from a router on the router's first-dimension message output X or a router's second-dimension output Y, each message output validated by a distinct client-output-valid indicator OX_V and OY_V respectively. (In this embodiment the client is communicatively coupled to the first-dimension message output and the second-dimension router message output.)

A subset of routers with the same Y coordinate is designated an X row. In an embodiment, a set of links 260, 262, 264, and 266 interconnects an X row of routers in a complete unidirectional-connected cycle that is designated an X ring.

Similarly, a subset of routers with the same X coordinate is designated a Y column. In an embodiment, a set of links 250, 252, 254, and 256 interconnects a Y column of routers in a complete unidirectional-connected cycle that is designated a Y ring.

In the NOC 299, there are four X rings designated X ring [Y=0], X ring[Y=1] X ring[Y=2] and X ring[Y=3], and four Y rings designated Y ring [X=0], Y ring [X=1], Y ring [X=2], and Y ring [X=3]. For example, X ring 242 [Y=0] comprises links 260, 262, 264, and 266, and Y ring 240 [X=0] comprises links 250, 252, 254, and 256.

In an embodiment, not every router is coupled to a client and not every client both sends and receives messages to/from the NOC 299. For example, a router 203 at location (0,3) accepts input messages from a client 290 via a client message input, and provides output messages to the client 290 via its Y output port. Receives-output-only-client 291 receives messages from the router 212 at location (1,2) but does not send messages. Conversely, Send-input-only-client 292 sends messages to, but does not receive any messages from, the router 222 at location (2,2). And the router 202 at location (0,2) does not have a client.

In an embodiment there may be more than one client core per router. A plurality of clients may share one router-client input port via an input multiplexer, and a plurality of clients may share one router-client output port by decoding the router output-valid indicator with other state. In an embodiment, some bits of the output message itself may help determine which of a plurality of clients sharing a router output port should receive the output when the output-valid indicator is asserted. In an embodiment, a router may be enhanced to accept a plurality of message inputs on multiple input ports.

In an embodiment, the number of routers in each X ring is the same, and the number of routers in each Y ring in the same. However, alternative embodiments are possible, in which different X rings have different diameters (number of routers in a ring), or in which different Y rings have different diameters. For example, in such a 2D topology, even if there are routers (1,2) and (2,1), it is not required that there is a router (2,2). Such alternative embodiments are included in this disclosure.

Figure 3:
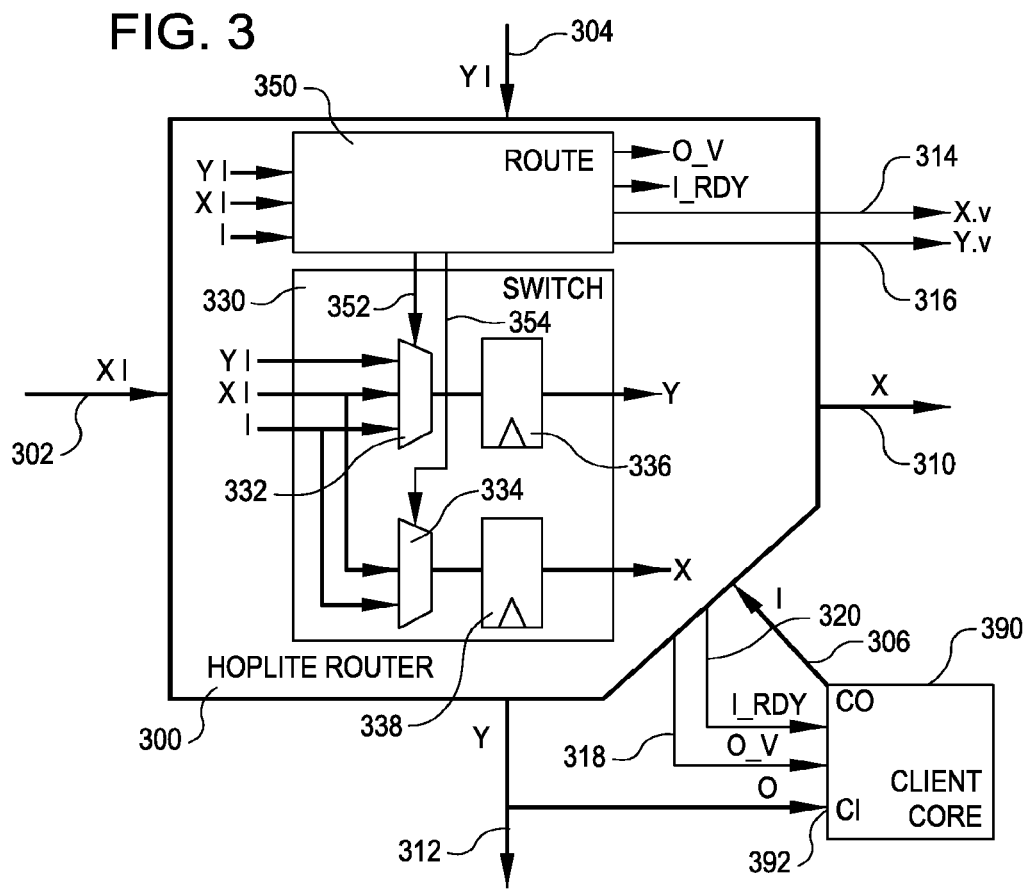
FIG. 3 is a diagram of a subcircuit of an embodiment of a NOC 299, which comprises one router 300 coupled to one client core 390. A router 300 comprises message inputs, message outputs, validity outputs, a routing circuit 350, and a switch circuit 330. Examples of the routing circuit 350 include, but are not limited to, routing logic, control logic, routing-function logic, analog routing circuitry, and any other suitable routing circuitry. Message inputs comprise a first-dimension message input 302, which is designated XI, and a second-dimension message input 304, which is designated YI. Message inputs may also comprise a client-message input 306, which is designated I. Message outputs comprise a first-dimension message output 310, which is designated X, and a second-dimension message output 312, which is designated Y. Validity outputs comprise an X-valid indicator line 314, which is configured to carry a signal that indicates that the X-output message is valid, a Y-valid indicator line 316, which is configured to carry a signal that indicates that the Y-output message is valid, an output-valid indicator line 318, which is designated O_V and which is configured to carry a signal that indicates that the Y-output message is a valid client-output message, and an input-ready indicator line 320, which is designated I_RDY and which is configured to carry a signal that indicates that the router 300 has accepted the client core 390's input message this cycle.

FIG. 3 is a diagram of a router 300 of the NOC 299 of FIG. 2B, according to an embodiment. The router 300 is coupled to one client core 390, and includes message inputs, message outputs, validity outputs, a routing circuit 350, and a switch circuit 330. The message inputs comprise a first-dimension message input 302, which is designated XI, and a second-dimension message input 304, which is designated YI. Message inputs may also comprise a client message input 306, which is designated I. Message outputs comprise a first-dimension message output 310, which is designated X, and a second-dimension message output 312, which is designated Y. Validity outputs carry an X-valid indicator 314, which is a signal that indicates to the next router on its X ring whether the X-output message is valid, a Y-valid indicator 316, which is a signal that indicates to the next router on its Y ring whether the Y-output message is valid, an output-valid indicator 318, which is designated O_V and which is a signal that indicates to the client 390 that the Y output message is a valid client output message, and an input-ready indicator 320, which is designated I_RDY and which is a signal that indicates whether the router 300 has accepted, in the current cycle, the input message from the client core 390. In an embodiment, the X- and Y-valid indicators 314 and 316 are included in the output messages X and Y, but in other embodiments they may be distinct indicator signals.

While enabled, and as often as every clock cycle, the routing circuit 350 examines the input messages 302, 304, and 306 if present, to determine which of the XI, YI, and I inputs should route to which X and Y outputs, and to determine the values of the validity outputs defined herein. In an embodiment, the routing circuit 350 also outputs router switch-control signals comprising X-multiplexer select 354 and Y-multiplexer select 352. In alternative embodiments, switch-control signals may comprise different signals including, without limitation, input- or output-register clock enables and switch-control signals to introduce or modify data in the output messages 310 and 312.

While enabled, and as often as every clock cycle, the switch circuit 330 determines the first- and second-dimension output-message values 310 and 312, on links X and Y, as a function of the input messages 302, 304, and 306 if present, and as a function of switch-control signals 352, 354 received from the routing circuit 350.

In an embodiment that is designed for implementation in Altera FPGAs with fracturable 8-input ALM (Adaptive Logic Module) logic cells, the X output is computed by a w-bit-wide 2:1 multiplexer 334, designated XMUX, and registered in w-bit X register 338, and the Y output is computed by a w-bit-wide 3:1 multiplexer 332, and registered in a w-bit Y register 336, which is designated YMUX.

In another embodiment that is designed for implementation in Xilinx 6-LUT FPGAs, which are detailed below, a 5,5-LUT (a Xilinx 6-LUT with five shared inputs and two separate outputs and two independent 5-LUT lookup table logic functions) simultaneously computes one bit of the Y-output message and one bit of the X-output message, and these two bits are registered in two flip flops in the same logic cell as the 5,5-LUT. In this embodiment the switch 330 comprises a plurality of instances of this 5,5-LUT-plus-two-flip-flops-logic-cell configuration. Other embodiments of the switch circuit 330 are possible, and some of these embodiments are elaborated in FIGS. 4 and 5.

Still referring to FIG. 3, the client core 390 is coupled to the router 300 via a router input 306 and router outputs 312, 318, and 320. A feature of the router 300 is the sharing of the router second-dimension message output line 312 (Y) to also communicate NOC router output messages to the client 390 via its client input port 392, which is designated CI. In an embodiment, the router output-valid indicator O_V 318 signals to the client core 390 that the Y output 312 is a valid message received from the NOC and destined for the client. An advantage of this circuit arrangement versus an arrangement in which the router has a separate, dedicated message output for the client, is the great reduction in switching logic and wiring that sharing the two functions (Y output and client output) on one output link Y affords. In a busy NOC, a message will route from router to router on busy X and Y links, but only in the last cycle of message delivery, at the destination router, would a dedicated client-output link be useful. By sharing a dimension output link as a client output link, routers use substantially fewer FPGA resources to implement the router switch function.

Referring to FIGS. 2A and 3, the message-valid bits are described in more detail. For a message coming from the X output of the router 300, the message-valid bit X.v is the v bit of the X-output message. That is, the bits on the lines 314 (one bit) and 310 (potentially multiple lines/bits) together form the X-output message. Similarly, for a message coming from the Y output of the router 300 and destined for the downstream router (not shown in FIG. 3), the message-valid bit Y.v is the v bit of the Y-output message. That is, the bits on the lines 316 (one bit) and 312 (potentially multiple lines/bits) together form the Y-output message to the downstream router. For a message coming from the Y output of the router 300 and destined for the client 390, although the message-valid bit Y.v is part of the message, the O_V valid bit validates the Y-output message to be a valid router output message, valid for input into the client 390 on its message input port 392. That is, the bits on the lines 316 (one bit), 318 (one bit), and 312 (potentially multiple lines/bits) together form the Y-output message to the client 390, but the client effectively ignores the Y.v bit. Alternatively, in an embodiment, the Y.v bit is not provided to the client 390. And for a message I coming from the CO output of the client 390 on the line 306 and destined for the router 300, the message-valid bit v is part of the message I, although it is not shown separately in FIG. 3. That is, the bits on the line 306, which bits include the I-message valid bit, form the I-input message from the client 390 to the router 300. Alternatively, in an embodiment, there is a separate I_V (client input valid) signal from the client core 390 to the router 300.

FIGS. 4A, 4B, 4C, and 4D are circuit diagrams of alternate embodiments of the switch circuit 330. Although, when implemented in an FPGA, these switch circuits may not be as advantageous as the Altera ALM and Xilinx 6-LUT switch circuits described elsewhere herein, these switch circuits have other features that still make them superior to conventional switch circuits.

Figure 4A:
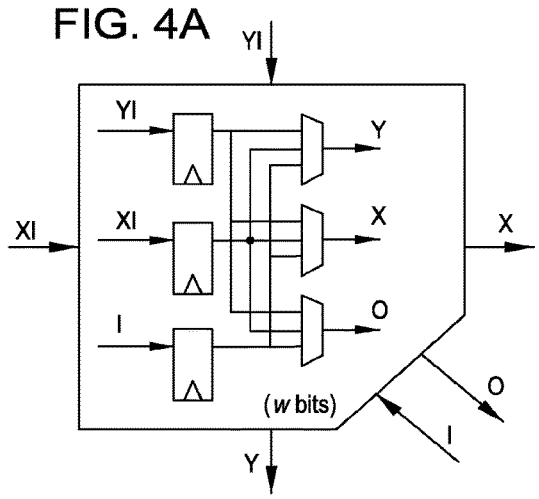
FIGS. 4A-4D are diagrams of alternative embodiments of the switch circuit 330 of FIG. 3.

FIG. 4A is a diagram of the router switch circuit 330 of FIG. 3, according to an embodiment. The switch 330 comprises 3×3 crossbar with input registers, which are implemented by three w-bit registers and three 3:1 multiplexers. In this embodiment, the router has three message outputs, X, Y, and client output O. In contrast to other embodiments (e.g., embodiments where the Y message output also functions as the client output), this embodiment consumes more logic resources.

Figure 4B:
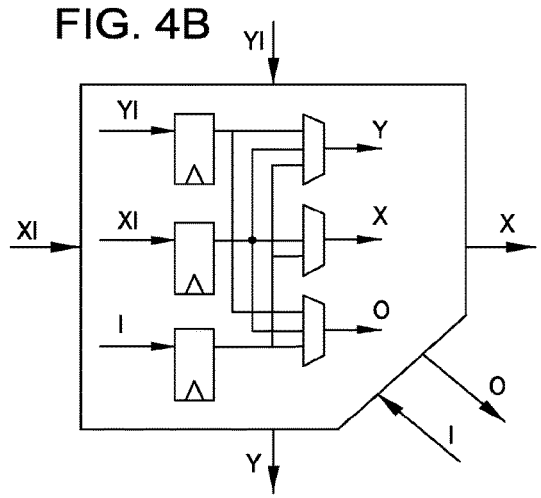

FIG. 4B is a diagram of the router switch circuit 330 of FIG. 3, according to another embodiment. The switch 330 comprises a 3×3 partial crossbar that has taken advantage of dimension-order routing. In dimension-order routing, described elsewhere herein, a message sent from router (x0,y0) to destination (x1,y1), traverses the NOC, first routing in the X dimension, along an X ring, until it reaches a router with corresponding X coordinate x1 (e.g., router (x1,y0)), and then in the Y dimension, along a Y ring, until it reaches a router with a corresponding Y coordinate y1. Using this routing algorithm, no YI input message need ever route to an X ring since it already has the correct X coordinate. Therefore, the YI input to the X output multiplexer can, and has been, eliminated. The X-output multiplexer is now a less-complex 2:1 multiplexer that occupies a reduced area, particularly in an FPGA implementation, as compared to a 3:1 multiplexer. That is, the switch 330 of FIG. 4B is the same as the switch 330 of FIG. 4A except that the X-output multiplexer of FIG. 4B is a 2:1 multiplexer and the X-output multiplexer of FIG. 4A is a 3:1 multiplexer.

Figure 4C:
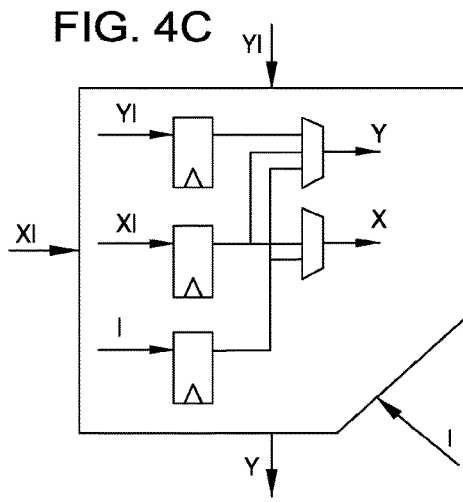

FIG. 4C is a diagram of the router switch 330 of FIG. 3, according to another embodiment. The switch 330 comprises a 3:1 multiplexer and a 2:1 multiplexer, and three message input registers. This embodiment of the switch 330 takes advantage of the herein aforementioned Y-output sharing to eliminate the client-message output port. However, as implemented in an FPGA, it is less efficient than other embodiments because it uses three, not two, w-bit registers, and because switch includes input registers that are located "ahead" of the switch logic instead of including output registers that are located:"after," or "behind," the switch logic. In certain modern FPGAs, such as the Xilinx 6-series and 7-series 6-LUT FPGAs, there are insufficient logic-cell-interconnect resources to utilize, independently, all parts of the LUT and all of the flip-flops in each logic cell. Accordingly, this embodiment of the router switch 330 may use more logic cells than the above-discussed and below-described Xilinx 6-LUT embodiment.

Figure 4D:
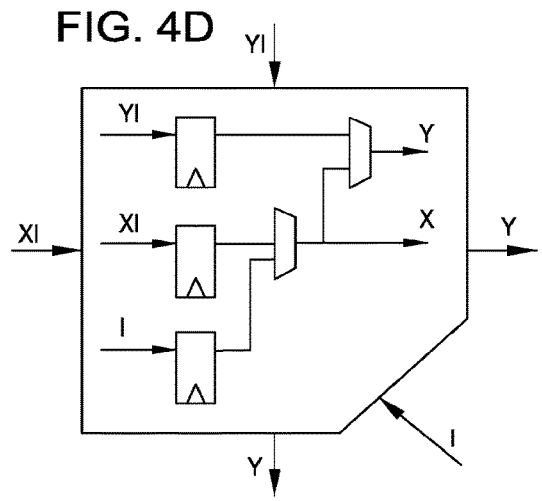

FIG. 4D is a diagram of the router switch circuit 330 of FIG. 3, according to yet another embodiment. The switch 330 comprises two 2:1 multiplexers and three input registers. Although the arrangement of the two 2:1 multiplexers enable a more compact (i.e., consuming fewer FPGA resources) switch 330, the arrangement causes the switch to incur two LUT delays, and prohibits the switch from implementing potentially useful message-route transfer functions such as XI→X and I→Y. In comparison, the Altera ALM embodiment of the router switch 330, which is discussed above and described below, can implement any desired transfer function, and both the Altera and Xilinx 6-LUT switch embodiments incur only one LUT delay, although these embodiments consume more FPGA resources.

Figure 5A:
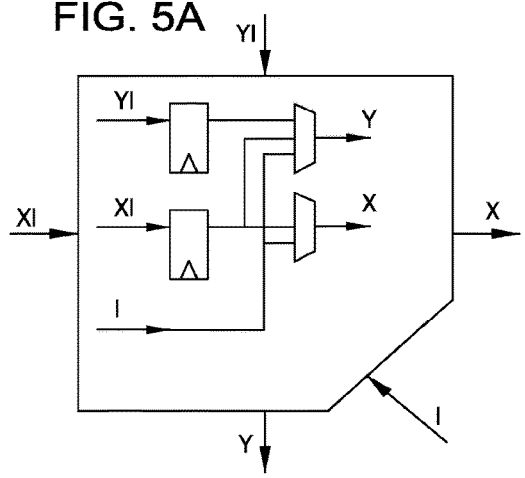
FIGS. 5A, 5B, and 5C are diagrams of additional alternative embodiments of the switch circuit 330 of FIG. 3.
Figure 5B:
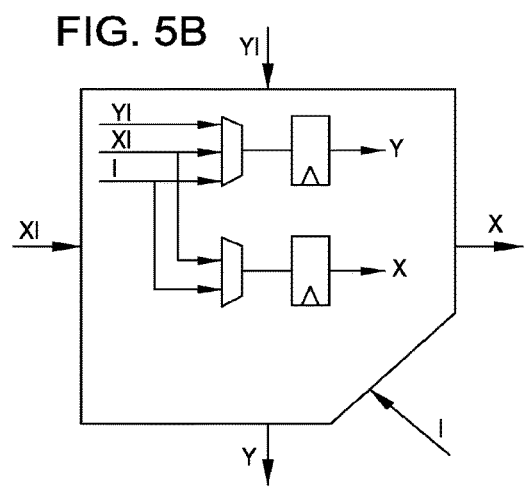
Figure 5C:
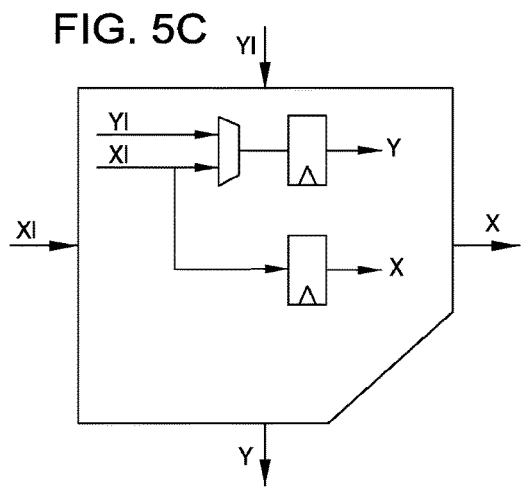

FIGS. 5A, 5B, and 5C are diagrams of additional embodiments of the switch circuit 330 of FIG. 3.

Figure 5D:
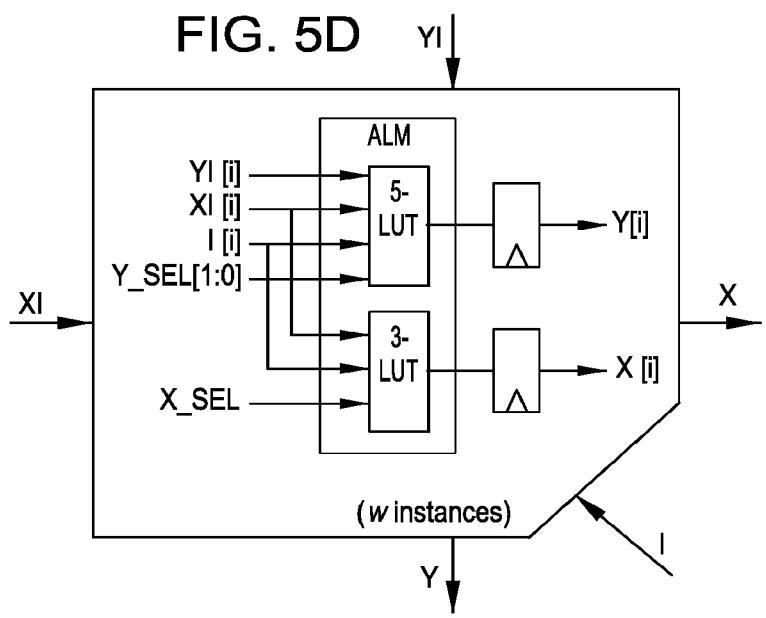
FIGS. 5D and 5E are Altera ALM and Xilinx 6-LUT FPGA embodiments, respectively, of the switch circuit 330 of FIG. 3.
Figure 5E:
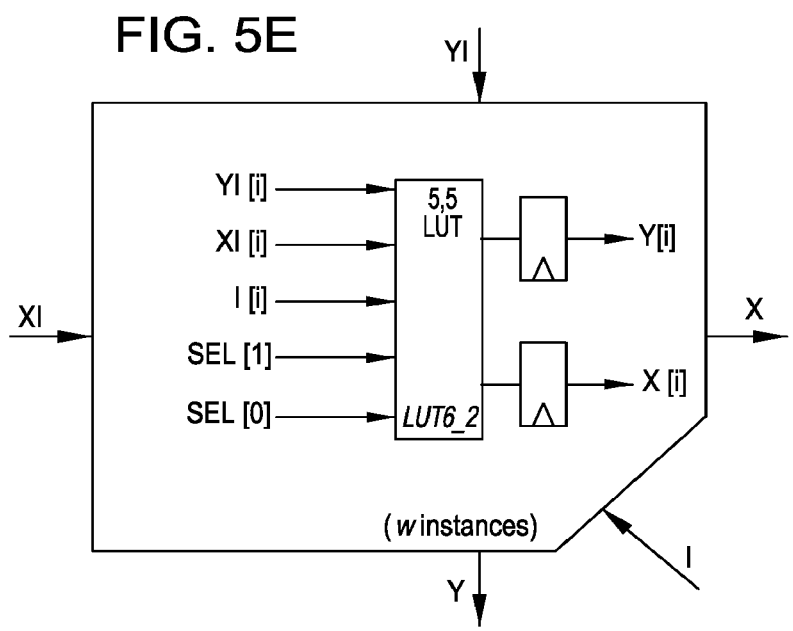

FIGS. 5D and 5E are diagrams of the Altera ALM and Xilinx 6-LUT embodiments, respectively, of the switch circuit 330 of FIG. 3.

Figure 5F:
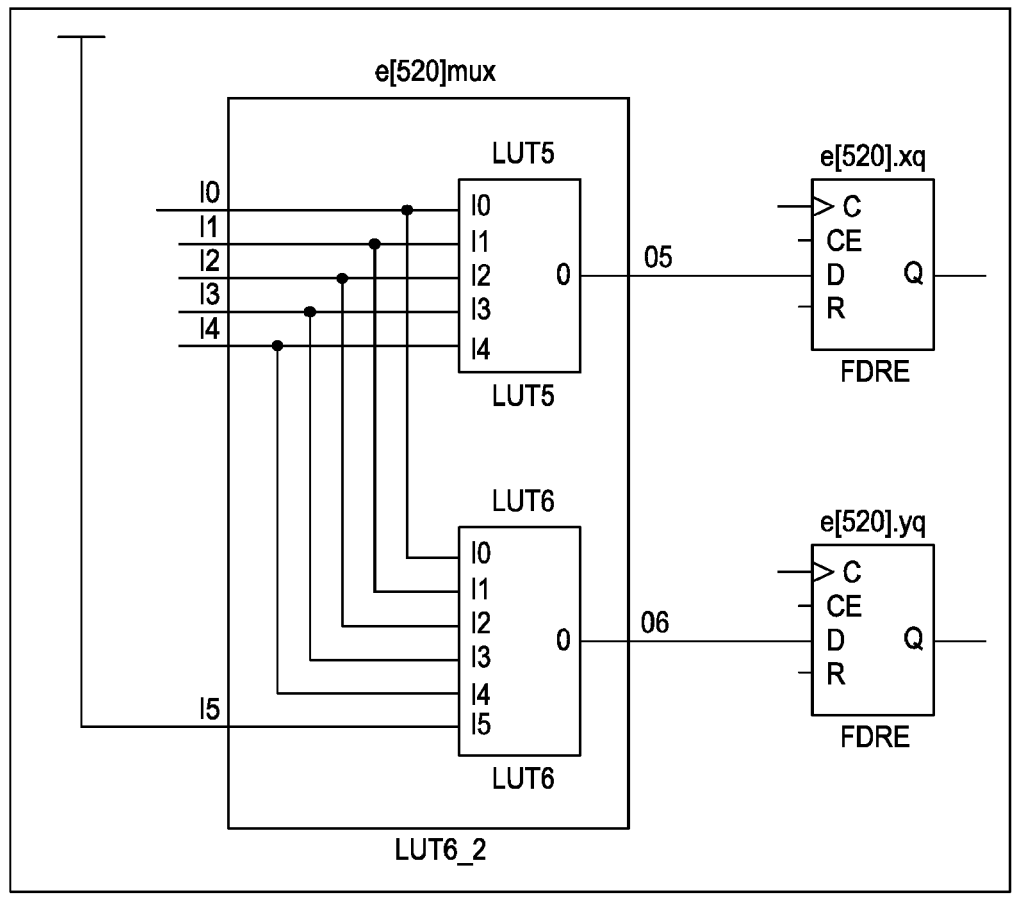
FIG. 5F) is a diagram of an embodiment of a Xilinx post-implementation technology-mapped schematic of a one-bit-wide switch element of FIG. 5E.

FIG. 5F is a diagram of a Xilinx post-implementation technology-mapped one-bit-wide switch element of FIG. 5E, according to an embodiment.

Figure 5G:
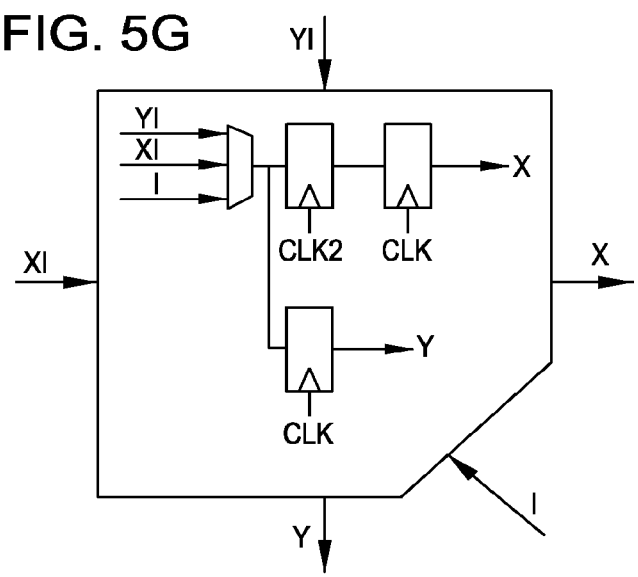
FIG. 5G shows a time-multiplexed alternative embodiment of the switch circuit 330 of FIG. 3.

And FIG. 5G shows a time-multiplexed alternative embodiment of the switch circuit 330 of FIG. 3.

FIG. 5A is a diagram of the router switch circuit 330 of FIG. 3, according to still another embodiment. In this embodiment, the switch 330 comprises two input registers, a 3:1 multiplexer, and a 2:1 multiplexer. The switch 330 does not include an I input register, and, therefore, is more efficient than the router switch circuit 330 of FIG. 4D. But because the input registers still precede the switch logic, when this switch 330 is technology mapped to a Xilinx 6- or 7-series FPGA, the switch may suffer the same interconnect-limited logic-cell placement inefficiencies as the switch circuit 330 of FIG. 4D.

FIG. 5B is a diagram of the router switch circuit 330 of FIG. 3, according to an embodiment. The switch 330 comprises two input registers, a 3:1 multiplexer, and a 2:1 multiplexer, followed by two w-bit-wide output registers for the X and Y outputs. At least for some applications, this switch 330 is improved as compared to at least one of the previously described embodiments of the switch, and is five to twenty times smaller than conventional FPGA NOC router switches with buffered 5×5 crossbars. This embodiment of the router switch 330 includes the basic logic topology for the embodiments of the router switch that are designed for technology mapping to Xilinx and Altera FPGAs.

FIG. 5C is a diagram of the router switch circuit 330 of FIG. 3, according to an embodiment. This switch 330 is designed for special cases such as where the router in which the switch 330 is disposed does not have a client core, or where the router does have a client core that does not send input messages to and through the router, as is the case, for example, for the router 212 and the router client 291 of FIG. 2B. The switch 330 comprises a single 2:1 mux to select the next Y output message, and X and Y w-bit output registers. In some embodiments a router may be configured by a designer to specify whether it is implemented via switching circuits 30 that take advantage of this advantageous simplification. In an embodiment, this reduced-complexity switch 330 may be technology mapped into a dual-output LUT such as an Altera 8-input fracturable LUT ALM or a Xilinx dual-output 6-LUT, implementing two bits of the 2:1 multiplexer of X and Y per LUT, and thereby achieving a 50% programmable-logic resource-usage reduction versus the highly efficient embodiments of FIGS. 5D and 5E, which are described below.

FIG. 5D is a diagram of a one-bit-wide switch element, according to an embodiment, where the switch element is a component of a router switch designed for Altera ALM FPGAs. The 5-LUT and the 3-LUT both pack into a single Altera ALM logic cell, and the two output registers that provide Y[i] and X[i] are implemented in flip-flops that pack into the same Altera ALM logic cell as the 5-LUT and 3-LUT. An embodiment of an Altera ALM router switch includes of a plurality of such switch elements (one switch element per bit). The flexibility of the 8-input 2-output Altera ALM logic cell also enables other embodiments, which are described herein. In one such embodiment, a single ALM logic cell can implement two arbitrary 3-1 multiplexers, enabling a flexible routing switch for non-dimension-order-routing routing functions. In another embodiment, an ALM logic cell can implement a 4-input 2-output partial crossbar switch, enabling a 1 ALM/bit-width router function with first- and second-dimension message inputs and two client inputs.

FIG. 5E is a diagram of a one bit-wide switch element, which is a component of the router switch 330 of FIG. 3 designed for efficiency in Xilinx 6-LUT FPGAs, according to an embodiment. A 6-LUT may be explicitly configured as two 5-LUTs, e.g., a 5,5-LUT has inputs that comprise one bit of each of the three message inputs, XI[i], YI[i], and I[i], and a two bit-switch select SEL[1:0] inputs. A Xilinx 6-LUT configured in 5,5-LUT mode can implement two logic functions of the same five inputs in a single LUT, sometimes specified as a LUT6_2. With a two-bit switch-select SEL [1:0] input, this switch can select four of the possible nine transfer functions of the three inputs XI[i], YI[i], and I[i]. The following table summarizes the transfer functions and the selectable subset (functions 1, 5, 7, 8), according to an embodiment:

TABLE I

| | SEL | Y | X | Comment |
|---|---|---|---|---|
| 1 | 00 | I→Y | I→X | X and/or Y ring ingress, simpler SEL |
| 2 | | I→Y | XI→X | XI→X, plus Y ring ingress |
| 3 | | I→Y | YI→X | Not required with dimension-order routing |
| 4 | | XI→Y | I→X | Affords client ingress and egress |
| 5 | 01 | XI→Y | XI→X | Used for multicast |
| 6 | | XI→Y | YI→X | Not required with dimension-order routing |
| 7 | 10 | YI→Y | I→X | Common X ring ingress |
| 8 | 11 | YI→Y | XI→X | Common X ring, Y ring traffic crossing |
| 9 | | YI→Y | YI→X | Not required with dimension-order routing |

Rationale: the three transfer functions 3, 6, 9 with YI→X are unnecessary due to dimension-order routing, according to an embodiment, but may be useful for non-dimension-order routing functions in which messages traverse from an X input to a Y output or from a Y input to an X output. Transfer functions 7 and 8 are used most often, routing X- and Y-ring traffic past each other, and for X-ring message ingress. Function 5 enables XI→Y routing as well as message fan-out for multicast delivery, which is described below. For efficient Y-ring messaging, it is helpful to have some transfer function I→Y to route the client input I into the Y ring. Otherwise a message from (x0,y0) to (x0,y1) may have to ingress into an X ring and loop back to (x0,y0) before turning south on Y ring [X=x0] to (x0,y1). The two transfer functions 1 and 2 provide I→Y routing. Function 1, enables a simplification of the routing-function computation of the SEL[1:0] router control logic, which is described below. Alternative embodiments of different subsets of transfer functions are also contemplated.

Still referring to FIG. 5E, as described above, the one bit-wide switch element is a component of an embodiment of the router switch 330 of FIG. 3 designed for efficiency in Xilinx 6-LUT FPGAs. The two-output transfer function of XI[i], YI[i], and I[i], selected by switch-select SEL[1:0], outputs a next X[i] signal and a next Y[i] signal, which signals are registered in the two output flip-flops X[i] and Y[i], also packed into the same 6-LUT logic cell. A Xilinx 6-LUT efficient router switch comprises a plurality of such switch elements. In an embodiment, the switch functions are:

next X[i]=SEL[0] ? XI[i]: I[i];

next Y[i]=(SEL==2'b00) ? I[i]: (SEL=2'b01)? XI[i]: YI[i];

An embodiment of a Xilinx-efficient switch module is incorporated herein in the following synthesizable Verilog source code. That is, the following example source code can be used to instantiate, on an FPGA, an embodiment of a Xilinx-efficient switch module. The disclosure of this embodiment should not be construed to be limiting.

```
1    `define Y_INIT 32'hF0F0CCAA
     /*(sel==`YI_XI)?i:(sel==`YX_XX)?xi:yi;*/
2    `define X_INIT 32'hCCAACCAA
     /*(sel==`YI_XI||sel==`YY_XI) ? i : xi;*/
3
4    (* keep_hierarchy="yes" *)
5    module XSwitch #(
6        parameter W = 1
7    ) (
8        input  wire clk,
9        input  wire rst,
10       input  wire x_ce,
11       input  wire y_ce,
12       input  wire [1:0] sel,
13       input  wire [W-1:0] yi,
14       input  wire [W-1:0] xi,
15       input  wire [W-1:0] i,
16       output wire [W-1:0] y,
17       output wire [W-1:0] x
18   );
19       wire [W-1:0] y_nxt;
20       wire [W-1:0] x_nxt;
21
22       genvar j;
23       generate for (j = 0; j < W; j = j + 1) begin : e
24           LUT6_2 #(.INIT({`Y_INIT,`X_INIT}))
25               mux(.I0(i[j]), .I1(xi[j]), .I2(yi[j]), .I3(sel[0]),
26                   .I4(sel[1]), .I5(1'b1), .O5(x_nxt[j]), .O6(y_nxt[j]));
27           FDRE xq(.C(clk), .CE(x_ce), .R(rst), .D(x_nxt[j]), .Q(x[j]));
28           FDRE yq(.C(clk), .CE(y_ce), .R(rst), .D(y_nxt[j]), .Q(y[j]));
29       end endgenerate
30   endmodule
```

In this embodiment, the Xilinx-efficient switch implementation is parameterized by the link width w. For a router with messages of width w, the generate block in this module generates a data path comprising w (2-output) 6-LUTs and two w-bit message output registers x[ ] and y[ ]. Each one-bit slice of this embodiment of the router switch 330 of FIG. 3 corresponds to one instance of the one-bit switch element of FIG. 5E, and each LUT6_2 implements switch transfer functions 1, 5, 7, 8 of the switch-transfer-function TABLE I described above.

The embodiments described in conjunction with FIGS. 5D and 5E for Altera 8-input fracturable LUT ALMs and Xilinx dual-output 6-LUTs, respectively, use the devices' dual-output lookup-table configurations to compute, compactly, two router output bits X[i] and Y[i] per LUT. An alternative embodiment may use time multiplexing to reduce this already frugal result by an additional factor of two. Instead of switching the three inputs XI[i], YI[i], and I[i] into two outputs in one clock period, it is also possible to sequentially switch them into two outputs over two clock periods.

FIG. 5G is a diagram of the router switch circuit 330 of FIG. 3 according to such a time-multiplexed alternative embodiment. During a first clock period, a single 3:1 multiplexer selects a first output from the three inputs; this value is captured at a first "holding" register, which is shown here clocked on a second clock edge CLK2. Note that the X and Y outputs of the router switch 330 need not change during this first clock period. Then, during a second clock period, the multiplexer selects a second output from the three inputs. Both outputs are registered and switch simultaneously in second and third registers whose outputs are the X and Y outputs of the switch. Various embodiments of this time-multiplexed switch are possible. In an embodiment, two different clock edges CLK and CLK2 determine the two clock periods for the time-multiplexed operation of the switch 330, but there are numerous other ways that the two clock periods may be defined, such as, without limitation, using a common clock plus separate clock-enable input signals for the first and the (second and third) register; or CLK2 may be a negated version of CLK, or otherwise may be out of phase with the first CLK; or the first register may be a combinational element employed to delay the output signal by approximately half a clock period so that the combinational 3:1 multiplexer may correctly generate two outputs in a single clock period.

Furthermore, equivalent time-multiplexed switches and NOC switch fabrics may be obtained by retiming the circuit of FIG. 5G, i.e., rearranging some output registers to become input registers. For example, instead of the second and third registers forming output registers of the switch 330, they could be pushed out of the first switch and pushed into the input paths of a next X switch and Y switch. In that case, these registers would, in effect, be input registers XI and YI of these next switches. Similarly the first "holding" register could remain in the first switch, or it too could be pushed into the second switch. In this case, the single output of the switch's three-input multiplexer would be routed to both the XI input of the next X switch and the YI input of the next Y switch.

When implemented in certain FPGA devices, a time-multiplexed router switch 330 affords an advantageous reduction in total LUT area for a router and, therefore, for a NOC interconnection system composed of routers. Various embodiments of FPGA-efficient technology mappings of a time-multiplexed switches are possible, without limitation. For example, one Altera 8-input fracturable LUT ALM may be configured to implement two bits of a 3:1 multiplexer per ALM (one 3:1 multiplexer per bit). Therefore, one w-bit wide 3:1 multiplexer may be implemented using w/2 ALMs. The abundant number of flip-flops in the device, particularly in new FPGA architectures such as Altera Stratix 10 FPGAs with HyperFlex registers in the programmable interconnect fabric, mean that the introduction of a third flip-flop per two output bits need not be a limiting FPGA resource in a time-multiplexed router-switch implementation. A time-multiplexed switch configuration provides a NOC system designer with a useful choice of tradeoffs: a non-time-multiplexed router-switch design that outputs two w-bit messages per clock period for a cost of w LUTs, and a time-multiplexed router-switch design that outputs two w-bit messages per two clock periods for a cost of w/2 LUTs.

An embodiment of the time-multiplexed switch 330 achieves a factor of two area savings for a factor of two reduction in router throughput or bandwidth. It is also possible to compose this switch design with other types of time multiplexing in the inter-router links and at the router-client interface, to achieve a novel, ultra-compact router switch. Various embodiments of this composed time-multiplexing are possible without limitation. For example, w-bit messages may be carried over two beats of a w/2-bit wide router, with w/2-bit wide links, that is itself implemented by the aforementioned time-multiplexed router switch that uses two clock periods per beat. Here, using Altera 8-input fracturable LUT ALMs, a w-bit router switch may be implemented in w/4 ALMs with a throughput of up to two full output messages per 4 clock periods. Other arrangements and degrees of time multiplexing of this configuration are also possible.

Client Interface

Conventional buffered virtual-channel (VC) NOC router design can impose several hardships on the client. If the message width is greater than the flit/link width w, then the client is forced to segment and reassemble messages into/from flits. If the flits of several incoming messages arrive interleaved, then the client is forced to provide sufficient RAM to buffer and reassemble the expected maximum number of partially received messages. In a system with many client cores, this can become an intolerable burden, because, for example, dozens of source clients may send result/outcome messages to a particular destination client to aggregate. For credit-flow-control routers, clients are also forced to maintain per-VC input buffers and credit counters (a respective input buffer and credit counter for each VC) for NOC input flits, and even may be forced to maintain per-VC output buffers for NOC output flits.

Consequently, a buffered virtual-channel (VC) NOC router design is often large and complex.

As an alternative, an embodiment of the router described in the present disclosure provides an austere client interface that is configurable and parameterized (e.g., by message-data-payload width D_W and routing function ROUTE). The described router does not require message segmentation and reassembly, nor does it require logic (e.g., input and output buffers, credit-flow counters) to handle multiple virtual channels. Instead, each router can accept and deliver a message atomically each cycle (unless the network is busy, in which case in some embodiments the network may not accept the offered client input message for an indefinite number of clock cycles, until an opportunity arises to accept the message and immediately output it on a first or second dimension message output port, as is described below).

Referring, for example, to FIG. 3, during each cycle of operation, the following actions may take place: 1) the client 390 may assert an input message (I 306) and assert an input message valid indicator signal; in some embodiments that correspond to FIG. 3, the input message valid signal is the I.v field of the I message; in some embodiments the input message valid signal is a separate signal (not contained in the I message) that is also output from the client; 2) the router 300 may assert ready for input (I_RDY 320); 3) if the input message (I 306) from the client 390 is valid (I.v, not explicitly shown) and the router 300 is ready (I_RDY 320) to receive the input message from the client 390, the router 300 accepts the input message (I 306); 4) the router 300 may also assert an output message (O on output Y) and valid (O_V 318); 5) in some embodiments, the client 390 is always ready to accept an output message; in other embodiments, the client 390 may assert a separate "ready for output" signal; 6) If the output message (O 392) is valid and the client 390 is ready to accept the output message on the client input CI 392, the client accepts the output message.

An embodiment of the NOC does not guarantee fair arbitration of access to NOC resources between and amongst clients 390 competing for NOC resources. Under load, the NOC may not accept an input message for an unbounded time, or may not deliver an accepted message for an unbounded time. But, given enough time, the NOC eventually delivers every message it accepts. The client 390 never needs to resend a lost or dropped message, at least in theory.

Furthermore, an embodiment of the NOC does not guarantee in-order message delivery. For example, if a client at (x0,y0) (see FIG. 2B) sends two messages M1 and M2 to a client at (x1,y1), M1 may deflect around the NOC en route, whereas M2 may route directly, and arrive first.

In an alternative embodiment, NOC routers may be configured with a routing function that ensures in-order of delivery of messages sent from one client to another, or between different subsets of clients, even if routing deflection occurs.

Moreover, if a client-messaging protocol running on the NOC uses multiple independent (non-blocking) channels, different traffic-routing functions, different message widths (e.g., read request vs. cache-line-read-response), or additional bandwidth or throughput under load, the system designer can instantiate multiple (parallel) NOCs with these properties. But even instantiating multiple NOCS with multiple routers per client can be much faster, cheaper, and less resource intensive than a single conventional virtual-channel (VC) router.

In addition, the router's RTL (register transfer language) implementation is modular, and anticipates replacement of the base dimension-order-routing (DOR) circuit with an application-specific routing circuit. With this mechanism (plus the ability to configure the message data width D_W to carry routing metadata) the client and its customized router can introduce new NOC semantics, which may include, for example, guaranteed in-order delivery, bandwidth reservation, time-division-multiplexed routing (TDMR), and circuit switching.

Router Routing Circuits and NOC Operation

The description now turns to the design of the router's routing circuit and composition of routers into a NOC that transports messages from one client to another.

Referring to FIGS. 2B and 3, recall a NOC 299 comprises a plurality of routers 200, and a router 300, which is an embodiment of a router 200, comprises a router switch 330 and a routing circuit (or logic) 350.

In an embodiment, during each cycle, a router receives 0-3 valid input messages XI, YI, and I. On the basis of these inputs (and in some embodiments, on the further basis of other data, including, without limitation, router local state or additional message input metadata), the routing circuit 350 determines which input messages, if any, should be output on which router outputs X and Y, and sends corresponding switch-control signals 352, 354 to the switching circuit 330 to effect these output selections. And the routing circuit 350 also asserts or negates the various validity output signals 314, 316, 318, and 320 described herein.

A plurality of such 2D routers 300 may be used to compose a 2D NOC with one or more useful system-wide behaviors, including, but not limited to the reliable transmission of a message from a source router (x0,y0) to a destination router (x1,y1), step by step, through zero or more intermediate routers.

Torus NOC message routing, in general, is the process of transmitting a message across a NOC, from a source router (xs,ys) to a destination router (xd,yd). In summary, a source router accepts a message from its client, and the message includes destination-router coordinates (xd,yd). If a router (X,Y) receives a message with the same coordinates (X,Y), the message is output on its Y port, asserting the client-output-valid (O_V) indicator and deasserting the Y-output-valid indicator (Y.v); otherwise, the router outputs the message and message-valid indicator on output ports Y and Y.v or X and X.v, depending on the destination-router coordinates (xd, yd). In an embodiment, valid input messages are always output on some output port. That is, valid input messages are not buffered in the router, nor are valid input messages dropped by the network. In this way, the message traverses a path through the routers of the network until it arrives at the destination router; subsequently the message is output to the client, if any.

In an embodiment, the router implementation is modular, and the choice of the routing-circuit topology is a design-time router-configuration parameter. This configurability enables the construction of a system comprising a plurality of NOCs such that NOCs may select advantageous application-specific and application-efficient routing policies and behaviors.

In an embodiment, a router uses a 'DOR' deflecting dimension-order routing circuit. When routers with a DOR routing circuit are incorporated into a 2D torus NOC, the NOC implements, overall, a deflecting dimension-order-message-routing algorithm.

Deflecting dimension-order routing determines the path (the sequence of routers traversed) that a message takes from a source router (xs,ys) to destination router (xd,yd). In dimension-order routing, a message is passed from router to router on the source router X ring (i.e., X ring [Y=ys]) until it reaches the intermediate router (xd,ys) whose X coordinate xd equals the message destination X coordinate xd. Router (xd,ys) then outputs the message on its Y output. It is then passed from router to router on the Y ring [X=xd] until it reaches the destination router (xd,yd) and is output to the client of the destination router.

In an embodiment, the intermediate router (xd,ys), having received the message, can only "attempt" to output it on its Y output. However, the intermediate router may have to allocate the Y output to some higher-priority input message during the cycle in which it receives the message from the source router (xs, ys). For example, the intermediate router may have a valid YI message to output on Y and a valid XI message to output on Y. Only one message may output on Y each cycle; the other message must "go" somewhere else. In an embodiment, the XI message deflects, which means that the router outputs the XI message on the router's X output port, along the X ring. The message then "loops around" and traverses all the routers of the X ring [Y=ys] until arriving back at router (xd,ys), where the router "reattempts" to output the message on its Y output. This process repeats until the original XI message is output on the Y output of the intermediate router (xd, ys). In some embodiments, from that point, no further deflection need occur. The message traverses the Y ring [X=xd] until it reaches the destination router and is output to the client of the destination router. Alternatively the client of the destination router may negate a client output-ready signal from the destination router, which thus causes the message to loop around the Y ring until the client of the destination router is ready to receive the output message from the source client.

Dimension-order routing establishes and preserves an invariant that a message is routed to a Y output, or is present on a Y-ring link, if and only if the destination X coordinate xd of the message is equal to the router X coordinate and the Y-ring X coordinate, i.e., Y ring [X=xd].

In an embodiment, a router's message inputs are prioritized as follows YI>XI>I, meaning that YI takes priority over XI and I, XI takes priority over I, and I has the lowest priority. If YI is valid, YI effectively has its choice of output port (always the Y output port in a dimension-order-routing NOC). Then if XI is valid, XI effectively has its choice of output port (X or Y), unless Y is already taken by YI→Y (i.e., YI has already "chosen" Y). In that, the router deflects XI so that it is output on the X port instead. The router accepts a valid client input message I from the client only if the output port X or Y that the message I would use is available during that cycle.

FIG. 6 is a flow chart that describes a DOR deflecting dimension-order-routing algorithm that the routing circuit 350 of FIG. 3 can be designed to implement, according to an embodiment. The routing circuit 350 can be specified in synthesizable hardware description language (HDL) such as Verilog. Verilog code that can be used to synthesize the routing circuit 350 according to the embodiment of FIG. 6 is provided below.

Referring to FIGS. 3 and 6, as noted at a step 600, a purpose of the routing circuit 350 is to determine on which output ports to output which valid input messages. Therefore, the routing circuit 350 is configured to generate switch-circuit control signals X_SEL and Y_SEL (FIG. 6), which respectively correspond to the signals 354 and 352 of FIG. 3, and to determine the validity indicators for the output ports X and Y. Accordingly at a step 602, the routing circuit 350 initializes the signals X_SEL and Y_SEL and indicators I_RDY, O_V, X.v, and Y.v to default values. The router circuit 350 also employs two internal logic states x_busy and y_busy, which indicate which output message ports, if any, have been allocated to input messages.

The structure of the logic in the router circuit 350 reflects the static prioritization of inputs, YI>XI>I as described above. First the YI message, if valid (whether the YI message is valid is indicated by the v field in, e.g., the message header 298 of FIG. 2A), is allocated an output port, which is always Y in the embodiment of dimension-order routing being described. Then the XI message, if valid (whether the XI message is valid is indicated by the v field in, e.g., the message header 298 of FIG. 2A), is allocated an output port (X or Y) indicated by the address of its destination, unless Y is already busy, in which case the valid XI message is allocated to the X output port regardless of the address of its destination. Then the I message, if valid (whether the I message is valid is indicated by the v field in, e.g., the message header 298 of FIG. 2A), is allocated an output port (X or Y) indicated by the address of its destination, unless the indicated output is already busy, in which case the default setting of the I_RDY indicator to false from 602 holds and the client 390 is forced to hold the message I until the next cycle.

The router 300 routes the second dimension input, YI, first. In particular, at a step 604, the routing circuit 350 tests whether the YI input message is valid by examining the v field of its message header (FIG. 2A). If YI is not valid, then YI is "not present" on this cycle and is not routed to an output port. If YI is valid, at a step 606, the routing circuit 350 causes the router switch 330 to route YI→Y. Specifically, the routing circuit 350 sets y_busy to allocate the Y output to YI, sets the Y_SEL switch control to direct YMUX 332 to select the YI input, and sets the O_V and Y.v validity indicators, depending upon the Y coordinate of the input message. If YI.y is equal to the Y coordinate of this router, then the message is at its destination router (by the dimension-order routing invariant, it is inherent that YI.x already equals the X coordinate of the router). If YI.y equals the router Y coordinate, then the routing circuit 350 causes the router switch 330 to output the message to the client 390 on the Y output by asserting the client-output-valid signal O_V. If YI.y does not equal the router Y coordinate, then the routing circuit 350 causes the router switch 330 to output the message to the next router on the Y ring by asserting the Y-output-valid signal Y.v.

The router 300 routes the first-dimension input, XI, second. At a step 608, the routing circuit 350 tests whether the XI input message is valid by examining the v field of its message header (FIG. 2A). If XI is not valid, then XI is "not present" during this cycle and is not routed to an output port. If XI is valid, at a step 610, the routing circuit 350 tests whether the X coordinate, XI.x, of the destination of the message XI equals the X coordinate of the router 300, and also checks whether the Y output has already been allocated to YI). Only if XI.x equals the X coordinate of the router 300 and the Y output has not already been allocated to YI, the routing circuit 350 cause the router switch 330 to route the XI message to the Y output. If XI.x is not equal to the X coordinate of the router 300, then, per the dimension-order-routing algorithm, the routing circuit 350 causes the routing switch 330 to route the message XI to the X output so as to route XI to the next router in the X dimension. Similarly, if XI.x equals the X coordinate of the router 300 but the Y output is already allocated to a higher-priority message YI, then the XI message cannot output to Y and the routing circuit 350 causes the router switch 330 to deflect XI to the only available output port X.

If, at a step 612, XI.x equals the X coordinate of the router 300 and the Y output is not busy (previously allocated a valid input message YI), the router 300 routes XI→Y. Specifically, the routing circuit 350 sets y_busy to allocate the Y output to XI, sets the Y_SEL switch control to direct YMUX 332 to select the XI input, and sets the O_V and Y.v validity indicators, depending upon the Y coordinate, XI.y, of the input message XI. If XI.y equals the router Y coordinate, then the routing circuit 350 causes the router switch 330 to output the XI message to the client 390 on the Y output by asserting the client-output-valid signal O_V. If XI.y does not equal the router Y coordinate, then, the routing circuit 350 causes the router switch 330 to output XI to the next router in the Y dimension (e.g., on its Y ring) by asserting the Y-output-valid signal Y.v.

If, at the step 610, the routing circuit 350 determines that the X coordinate XI.x of the valid input message XI does not equal the X coordinate of the router 300, then, at a step 614, the router logic causes the router switch 330 to route XI to the next router on the first-dimension output X, e.g., XI→X on the X ring in a torus NOC. Also at the step 614, the routing circuit 350 sets x_busy to allocate the X output to XI, sets the X_SEL switch control to direct the XMUX 334 to select the XI input, and asserts the X.v validity indicator.

The routing circuit 350 routes the client input I last. At a step 616, the routing circuit 350 tests whether I is a valid input message by examining the field v in its message header (FIG. 2A). If I is not valid, I is "not present" during this cycle and, therefore, is not routed to an output port. If I is valid, then the routing circuit 350 causes the router 330 to route I to an output port if the correct port (based on the destination address included in the header of I) is available. If the correct output port is unavailable because it has already been allocated to a higher-priority input message YI or XI, the routing circuit 350 causes the router 300 to reject the client input message I during the current cycle. In this case, the routing circuit 350 deasserts the client-input-ready-validity indicator I_RDY (as is done by default at the step 602). The router 300 accepting or not accepting an input message I from the client 390 during any given cycle is a flow-control mechanism provided in an embodiment. If the NOC is very busy, for example, highly loaded with a plurality of messages routing hither and yon, a client input I to a particular router 300 may not be accepted, during any given cycle, if the message output port for the client input message is unavailable. In this case, the client must wait for a subsequent cycle to send its message I. The client may re-try sending the message I during the next cycle, may try to send some other input message I during the next cycle, or may try to send no message at all.

If, at a step 618, I is valid, the router logic 650 tests whether the X coordinate, I.x, of the destination of the message, I, equals the X coordinate of the router 300. If I.x does not equal the X coordinate of the router 300, then at a step 622, the routing circuit 350 tests whether the X output is already allocated to the XI input. If so, then the router 300 does not accept the client input message I this cycle. If, however, the X output is available to the valid I input, then, at a step 624, the routing circuit 350 causes the routing circuit 330 to route I→X by setting the X_SEL switch control to direct the XMUX 334 to select the I input, and asserts the X.v validity indicator.

If, at steps 616 and 618, the routing circuit 350 determines that I is valid and that I.x equals the X coordinate of the router 300, then, per the dimension-order-routing, algorithm, the router logic determines whether the router can route the valid I message to the Y output port. Specifically, at a step 620, the routing circuit 350 tests whether Y is available or was previously allocated to XI or YI. If available, at a step 626, the routing circuit 350 causes the router switch 330 to route I→Y. Specifically, the routing circuit 350 sets the Y_SEL switch control to direct YMUX 336 to select the I input, and sets the O_V and Y.v validity indicators depending upon the Y coordinate, I.y, of the input message I. If I.y equals the router Y coordinate, then the routing circuit 350 causes the router switch 330 to route the I message to the client on the Y output by asserting client output valid signal O_V. This scenario occurs if the client, for some reason, routes a message to itself, e.g., routes from (xs,ys) to (xd=xs,yd=ys). If I.y does not equal the router Y coordinate, however, then the routing circuit 350 causes the router switch 330 to output the message I to the next router on the Y dimension (e.g., its Y ring) via the Y output by asserting Y-output-valid signal Y.v.

If, at steps 616 and 618, the routing circuit 350 determines that I is valid but that I.x does not equal the X coordinate of the router 300, and if at step 620 the router logic determines that the Y output is busy, then the router 300 does not accept the valid input message I during the current cycle.

At this point, any valid input messages YI, XI, I have been routed to an output, or, if I is valid but an output is not available, I_RDY is negated such that the router 300 does not accept the message I. Put another way, the router 300 always routes a valid input message YI to Y, and always routes a valid input message XI to either Y or X depending on the availability of Y and the destination address of XI. But the router 300 does not always route a valid input message I. That is, the router 300 guarantees to route valid input messages YI and XI somewhere, but does not guarantee to route a valid input message I anywhere, during a given cycle. Therefore, an embodiment of the above-described algorithm implements, at each router 300, a measure of message-access control by giving valid messages already on the NOC priority over new messages from clients.

An embodiment of the routing circuit 350 is DOR router-function logic, which functions as described above in conjunction with FIGS. 3 and 6, is described and represented by the following Verilog source code, which can be used to synthesize and instantiate, on an FPGA, the routing circuit 350. It is understood, however, that the disclosure of this embodiment and Verilog source code is not intended to limit the scope of the principles and concepts disclosed herein.

```
1    // Msg (message) type constructors, deconstructors
2    `define Msg_(v,x,y,d) {(v),(x),(y),(d)}
3    `define Msg_W (1 + MCAST*2 + X_W + Y_W + D_W)
4    `define Msg        [`Msg_W-1:0]
5    `define v          [`Msg_W-1]
6    `define xv         [`Msg_W-2:0]
7    `define mx         [`Msg_W-2]
8    `define my         [`Msg_W-3]
9    `define x          [ X_W+Y_W+D_W-1 : Y_W+D_W]
10   `define y          [         Y_W+D_W-1 :       D_W]
11   `define d          [             D_W-1 :         0]
12
13   `define __mx(m) (MCAST & m`mx)
14   `define __my(m) (MCAST & m`my)
15
16   // RT (routing function) type constructors, destructors
17   `define Rt_(x_sel,y_sel,xi_deflect,x_ce,y_ce,y_v,x_v,i_rdy,o_v) \
18       {x_sel,y_sel,xi_deflect,x_ce,y_ce,y_v,x_v,i_rdy,o_v}
19   `define Rt           [10:0]
20   `define x_sel        [10:9]
21   `define x_sel_xi     [9]
22   `define y_sel        [8:7]
23   `define y_sel_yi     [8]
24   `define y_sel_xi     [7]
25   `define xi_deflect   [6]
26   `define x_ce         [5]
27   `define y_ce         [4]
28   `define y_v          [3]
29   `define x_v          [2]
30   `define o_v          [1]
31   `define i_rdy        [0]
32
33   `define I      2'd0
34   `define XI     2'd1
35   `define YI     2'd2
36
37   // DOR -- dimension ordered routing (sans multicast) function
38   module DOR #(
39       parameter MCAST  = 0,        // multicast?
40       parameter XSW    = 1,        // Xilinx switch?
41       parameter ENERGY = 1,        // 0: optimize latency; 3: optimize energy
42       parameter D_W    = 32,       // data payload width
43       parameter NX     = 4,        // diameter of X ring
44       parameter NY     = NX,       // diameter of Y ring
45       parameter X_W    = $clog2(NX),
46       parameter Y_W    = $clog2(NY),
47       parameter X      = 0,        // X address of this node
48       parameter Y      = 0         // Y address of this node
49   ) (
50       input  wire ce,              // clock enable
51       input  wire `Msg yi,         // Y input message
52       input  wire `Msg xi,         // X input message
53       input  wire `Msg i,          // client input message
54       output reg  `Rt r            // output route
55   );
56       reg y_busy;
57       reg x_busy;
58
```

```
59      // route YI->Y
60      task YI2Y; begin y_busy = 1; r`y_sel = `YI; YvOv(yi); end endtask
61
62      // route XI->X (sometimes for deflection)
63      task XI2X; begin x_busy = 1; r`x_sel = `XI; r`x_v = 1; end endtask
64
65      // route XI->Y
66      task XI2Y; begin
67          y_busy = 1; r`y_sel = `XI; YvOv(xi);
68          if (XSW) begin x_busy = 1; r`x_sel = `XI; end
69      end endtask
70
71      // route I->X
72      task I2X; begin x_busy=1; r`x_sel=`I; r`x_v=1; r`i_rdy=1; end endtask
73
74      // route I->Y
75      task I2Y; begin
76          y_busy = 1; r`y_sel = `I; r`i_rdy = 1; YvOv(i);
77          if (XSW) begin x_busy = 1; r`x_sel = `I; end
78      end endtask
79
80      // A message was routed to the Y ring. Set its output and Y valid flags.
81      task YvOv(input `Msg m); begin
82          // Propagate msg on Y if not yet at dest.
83          r`y_v = (m`y != Y);
84          // Output msg if at dest.
85          r`o_v = (m`y == Y);
86      end endtask
87
88      // Determine where to send each message XI/YI/I,
89      // whether there is a valid output message,
90      // and whether to accept the input message.
91      always @* begin
92          r = 0;
93          y_busy = 0;
94          x_busy = 0;
95
96          // route Y input
97          if (yi`v) begin
98              YI2Y( );                          // continue YI->Y
99          end
100
101         // route X input
102         r`xi_deflect = xi`v && (xi`x == X) && y_busy;
103         if (xi`v) begin
104             if ((xi`x == X) && !y_busy) begin    // at dest X, try turn XI->Y
105                 XI2Y( );
106             end
107             else begin
108                 XI2X( );                      // continue/deflect XI->X
109             end
110         end
111
112         // route local input
113         r`i_rdy = 0;                          // by default, input stalls
114         if (i`v) begin
115             if (i`x == X) begin                // already at dest X, inject I->Y
116                 if (!y_busy && !(XSW && x_busy)) begin
117                     I2Y( );
118                 end
119             end
120             else if (!x_busy) begin
121                 I2X( );                       // not yet at dest X, inject I->X
122             end
123         end
124     end
125 endmodule
```

In this embodiment represented by the above Verilog hardware definition language, from which a working routing DOR routing function circuit can be synthesized, the correspondence to the flowchart logic of FIG. 6 is apparent. For example, lines 97, 103, and 114 of the Verilog code correspond to steps 604, 608, and 616, respectively.

Combining the dimension-order invariant with static prioritization of inputs YI>XI>I achieves an extremely small and fast DOR routing circuit. In contrast to conventional FPGA torus NOC routers with enormous logic trees to select which of many inputs to allocate to which output ports, an embodiment of the DOR logic (e.g., the routing circuit 350 of FIG. 3) disclosed herein typically synthesizes to fewer than ten 6-LUTs and one or two LUT delays, and is one of the reasons embodiments disclosed herein achieve such frugal resource use and low per-router latency.

Depending upon a particular embodiment's switching circuit 330, different switching control outputs (here 352 and 354) may be output from the routing circuit 350. In an embodiment for implementation in Xilinx 6-LUT FPGAs, as described, for example, in conjunction with FIG. 5E, and described earlier herein, one two-bit transfer-function-select signal SEL[1:0] selects one of several transfer functions that map the various message inputs XI, YI, I to the two outputs X, Y, according to the particular subset of possible transfer functions elaborated in TABLE I, which accompanies the above discussion of FIG. 5E. By selecting transfer functions 1, 5, 8, 9 from TABLE I, an extremely simple and advantageous circuit to determine SEL[1:0] is achieved. Here, SEL[1] is just the YI input valid signal YI.v, output from the preceding router on the present router's Y ring, and SEL[0] is just the XI input valid signal XI.v, output from the preceding router on the present router's X ring. In other words, with this highly advantageous arrangement of switch transfer-function selections, SEL encodings, and the structure of the routing circuit 350, the routing circuit does not require any logic gates at all, zero gate delays, to determine how to switch the input messages XI, YI, and I to the output ports X, Y (the routing circuit does, however, include logic gates to compute the output validity signals). Here switching the XI, YI, I inputs to the X, Y outputs incurs zero gate delays in the routing circuit 350 and a single gate delay in the switching circuit 330. This switching is described below in conjunction with FIG. 10.

FIG. 7 is a diagram of a NOC router, and is used to illustrate several NOC routing scenarios, illustrating hop-by-hop message transport across the ring from source client to destination client. FIG. 7A shows ordinary point-to-point message delivery using deflecting dimension-order routing, as just disclosed above in conjunction with FIGS. 3 and 6, for messages to self (702), on a Y ring (704), on an X ring (706), on an X ring and then a Y ring (708), and (with deflection) on an X ring and a Y ring.

In route 702, the client at (0,0) sends a message to client at (0,0). The router (0,0) accepts the message on its I port and then outputs it on its Y port, asserting O_V. The client receives its own message back.

In route 704, the client at (0,1) sends a message to the client at (0,2). The router (0,1) the accepts the message on its I port, routes I→Y, while asserting Y.v, into YI of the router (0,2). During a subsequent cycle, the router (0,2) then routes YI→Y, asserts O_V, and negates (de-asserts) Y.v such that the client at (0,2) receives the message from the client at (0,1).

In route 706, the client at (1,0) sends a message to the client at (3,0). The router (1,0) accepts the message from its client, routes I→X, while asserting X.v, into XI of router (2,0). During a subsequent cycle, router (2,0) routes XI→X, while asserting X.v, into XI of router (3,0). During a subsequent cycle, router (3,0) routes XI→Y, asserts O_V, and negates Y.v such that the client at (3,0) receives the message sent by the client (1,0).

In route 708, the client at (1,1) sends a message to the client at (2,3). Router (1,1) accepts the message from its client, routes I→X, while asserting X.v, into XI of router (2,1). During a subsequent cycle, router (2,1) routes XI→Y, while asserting Y.v, into YI of router (2,2). During a subsequent cycle, router (2,2) routes YI→Y, while asserting Y.v, into YI of router (2,3). During a subsequent cycle, router (2,3) routes YI→Y, asserts O_V, and deasserts (negates) Y.v such that the client at (2,3) receives the message sent by the client at (1,1).

In route 710, the client at (1,3) sends a message to the client at (2,0). Router (1,3) accepts the message from its client, routes I→X, while asserting X.v, into XI of router (2,3). By dimension-order routing, the XI message needs to route to Y, but assume (in this example) that the Y output is already allocated to a YI input that cycle. So instead, the XI message deflects onto X. Router (2,3) routes XI→X, while asserting X.v, into XI of router (3,3). Router (3,3) routes XI→X, while asserting X.v, into XI of router (0,3) (a wrap around). Router (0,3) routes XI→X, while asserting X.v, into XI of router (1,3). Router (1,3) routes XI→X, while asserting X.v, into XI of router (2,3). This time the Y output is not allocated to a valid input message YI, and the message can "turn" into the Y ring. Router (2,3) routes XI→Y, while asserting Y.v, into YI of router (2,0). Router (2,0) routes YI→Y, asserts O_V, and deasserts Y.v, such that the client at (2,0) receives the message sent by the client at (1,3).

In an embodiment, the deflecting dimension-order routing algorithm described herein does not suffer deadlock or livelock. Even if, at a given moment in time, the NOC is completely full of messages in flight, i.e., a valid message is present on each X and Y link, over a number of clock cycles dimension-order routing provides that all messages on a given Y ring will arrive, without deflection, at their destination router (x,y), and then be output to that router's client. Therefore, over time, all of the messages initially on a Y-ring link will be output (delivered) from the NOC. This frees up Y ring links to accept X ring messages destined for that ring, and, assuming no new messages are sent on the NOC, all the initial X ring messages will also be output (delivered) from the NOC.

Multicast Message Delivery

Some parallel applications or workloads, for example, those running on a parallel multiprocessor interconnected with a NOC, can require efficient delivery of a message, or streams of messages, to many clients. For efficient implementation of high-fan-out messages, the modular router may be configured to use a 'MCDOR' (multicast deflecting dimension-order router) routing circuit. Like DOR, MCDOR routes simple messages from one source client to one destination client. MCDOR can also route a multicast message from a single source client to many destination clients as follows: X-multicast (to all clients on an X ring), Y-multicast (to all clients on a Y ring), and XY-multicast ("broadcast" to all clients). Regular and multicast messages can be arbitrarily intermixed and accepted and delivered concurrently. That is, at any given time, a NOC can be carrying regular (single-source-single-destination) messages, multicast messages, or a combination of regular and multicast messages.

Referring again to FIG. 2A, a message 298's mx and my fields control multicast delivery as follows:
1) mx=0, my=0, x,y: deliver to (x,y) only;
2) mx=0, my=1, x,ys: Y-multicast to (x,*);
3) mx=1, my=0, xs,y: X-multicast to (*,y);
4) mx=1, my=1, xs,ys: broadcast to (*,*).

In an embodiment, for X (or Y) multicast, the message x,y fields are not interpreted as destination router coordinates but rather as source X (Y) coordinates (xs,ys). These source coordinates act as sentinel values to terminate multicast delivery once the message been delivered to each selected client, as is described in more detail below.

Y-Multicast Message Delivery

Y-multicast delivers a message to all clients (xd,*) on a designated Y ring [X=xd]. Any client can multicast to any Y ring, not just its "home" Y ring. That is, the destination X coordinate xd need not be the same as the source (xs,ys), i.e., xd need not equal xs.

The base dimension-order routing policy 'X, then Y', according to an embodiment, ensures that a Y ring message at a router's YI input port has priority access to the Y output port, and, therefore, it is guaranteed to be delivered to any (xd,y) in at most NY cycles, where NY is the diameter of the Y ring (i.e., the number of routers in the Y ring). Similarly a Y-multicast message on a Y ring is guaranteed to traverse each router in the ring in at most NY cycles.

If a Y-multicast message for (xd,*) arrives on the I or XI input of router (xd,ys) and successfully allocates its Y output port, it is both output to client (xd,ys) and it propagates to the Y input of the next Y ring router. Since the Y output message is both a valid Y ring message and a valid client output message, the routing circuit 350 (FIG. 3, a MCDOR routing circuit in an example) asserts both Y.v and O_V valid output signals.

This output-and-propagate-message process repeats until the next Y ring router would be (xd,ys) again. There, at the (xd,ys) router, Y-multicast propagation ends by negating Y.v.

Figure 7B:
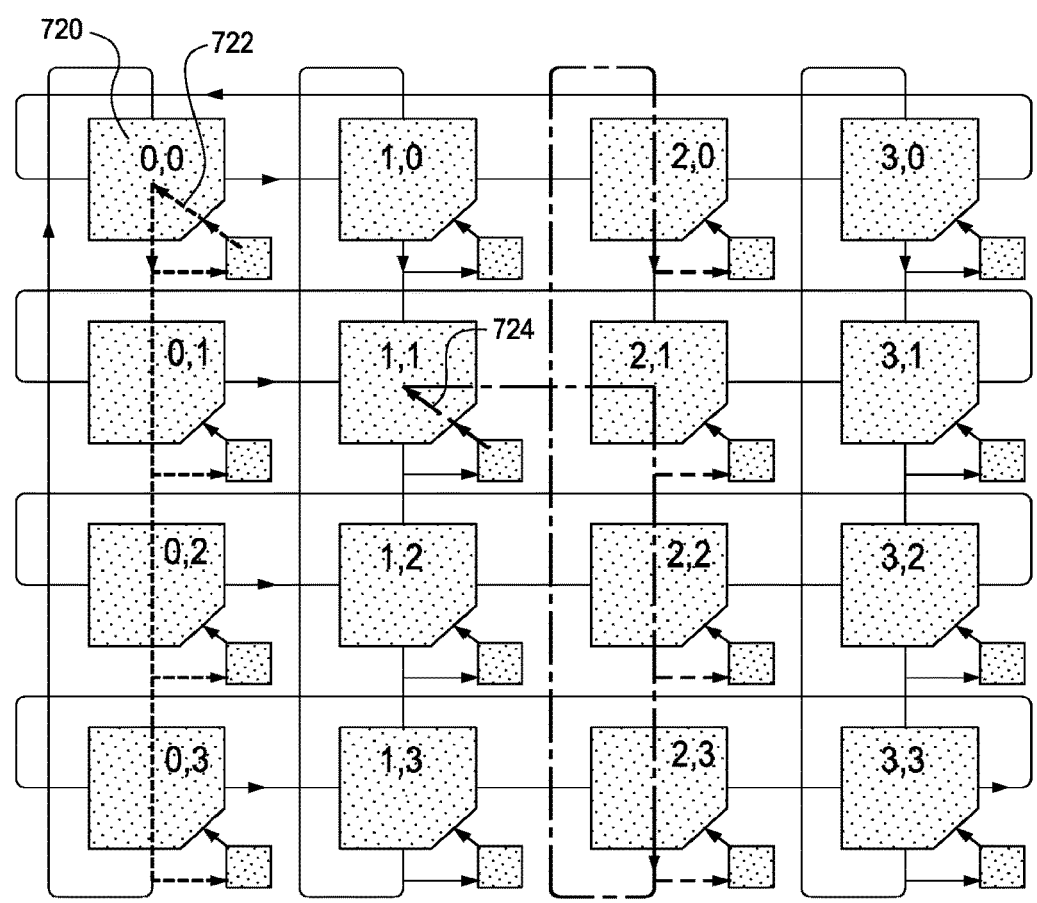

FIG. 7B is a diagram of a 4×4 NOC, and illustrates two Y-multicast message deliveries 722 and 724, according to an embodiment.

In route 722, there is a Y-multicast to a same Y ring [X=0]. Specifically, the client at location (0,0) sends a Y-multicast message to clients at (0,*). The y coordinate field of the message is the Y coordinate of the source router (here, 0). The router at location (0,0) accepts a message I from its client, routes I→Y, asserts Y.v, which is coupled to the router at location (0,1) and asserts O_V (message routed to, and received at, client (0,0), which is the source of the multicast message). Router (0,1) routes YI→Y, asserts Y.v to the router (0,2), asserts O_V (message routed to, and received at, client (0,1)). Similarly, router (0,2) sends the message to router (0,3) and to its client (0,2). Router (0,3) routes YI→Y, negates Y.v because the next router Y equals the message source at y=0 (the source router Y)), thus ending multicast, and asserts O_V (message routed to, and received at, client (0,3)).

In route 724, a message is Y-multicast to a different Y ring [X=2]. Specifically, the client at location (1,1) sends a Y-multicast to clients at (2,*). The router (1,1) accepts the message I from its client, routes I→X, asserting X.v, into XI of (i.e., to) the router (2,1). The router (2,1) routes XI→Y, asserting Y.v, into YI of router (2,2), and asserting O_V (message routed to, and received at, the client (2,1)). The message propagates to routers (2,2), (2,3), and (2,0), and is also delivered to clients (2,2), (2,3), and (2,0). Multicast propagation concludes at the router (2,0) which was the first router in the Y ring to receive the message, and which deasserts Y.v to conclude the multicast.

X-Multicast

An X-multicast message traverses each Hoplite router on an X ring, arriving on each XI input, and exiting on each X output port. As it transits each router, the message is also sent to router's Y port, whether for immediate output to the adjacent client, or for the Y ring to transport to another client at a different Y coordinate.

X-multicast is less straightforward than Y-multicast due to considerations of output port contention and dimension-order routing.

1) Output port contention—as the X-multicast message traverses each X ring router, the Y ring output might not occur if the Y output in that router is allocated to a YI input that cycle. In this case, the multicast message must continue around the ring to reattempt delivery there NX cycles later, where NX is the diameter of the X ring. In an unloaded network, an X-multicast message takes NX cycles, but in a congested network, Y-port contention may force the X-multicast message to take multiple trips around the X ring.

2) Dimension-order routing: A client (xs,ys) can X-multicast to any (*,yd), e.g., to any X ring [Y=yd]. In an embodiment, it is not correct to route the message from (xs,ys) to (xs,yd) on Y ring [X=xs] and then X-multicast it on X ring [Y=yd], because this may entail routing a message on a Y ring prior to routing the message on an X ring, violating dimension-order routing, i.e., route on an X ring (if necessary) and then route on a Y ring (if necessary). Even if in an embodiment the router data path is enhanced with YI→X switching, there may be, at the same router, an incoming XI message. Indeed, the particular X ring may be saturated with messages all waiting to enter a Y ring, but the X-multicast message(s) on the Y ring cannot enter the X ring. This might lead to deadlock or livelock.)

Therefore, X-multicast from (xs,ys) to an arbitrary row (*,yd) will traverse the X ring first, and at each router, e.g., (xd,ys), also output the message south on the Y ring towards the destination (xd,yd).

Again, if at (xd,ys) the Y port is allocated to a YI message, then the X multicast message is forced to continue around the X ring [Y=ys] and reattempt delivery later.

For an 'exactly once' message delivery to every Y in the X ring, an additional state is added to each X-ring message to track which Y rings have received it. In an embodiment, this state could be an NX-bit bit vector wherein each bit indicates that its corresponding Y ring has received the X-multicast. The X-multicast message circulates around and around the X ring [Y=ys] until every bit is set. But this adds O(NX) bits of state per each message link.

Instead, in another embodiment, the source router adds an X coordinate 'nx' (next x) to each X-ring message link and to the MCDOR routing circuit XI input and X output. 'nx' is an induction variable that tracks the X coordinate of the next pending Y ring. When an X-multicast message from (xs,ys) to (*,yd) is output on Y to Y ring [X=x], the nx output advances to (x+1) mod NX. This repeats, router by router, until nx equals xs, indicating that the X-multicast is complete. When an X-multicast message at (x,ys) cannot output to Y, the nx output does not advance. The X-multicast will traverse the entire X ring and retry at (x,ys), NX cycles later.

FIG. 7C is a diagram of a 4×4 NOC and illustrates three X-multicast message routes/deliveries 742, 744, 746.

In route 742, there is an X-multicast to a same X ring [Y=2] and there are no YI contentions. First, the source client at (0,2) sends an X-multicast message to clients at (*,2). The x-coordinate field of the message is the X coordinate of the source router (here, x=0). Router (0, 2) accepts the message I from its clients, routes I→X and I→Y, asserts X.v into XI of router (1,2) and asserts O_V (message routed to, and received at, the source client (0,2)). Router (1,2) routes XI→X and XI→Y, asserts X.v into XI of router (2,2), and asserts O_V (message routed to, and received at, client (1,2)). Similarly router (2,2) sends the message to router (3,2) on X and outputs the message to its client (2,2) on Y. Router (3,2) routes XI→Y only, negates X.v because the next router X equals the message x (i.e., the source router (0,2)), thus ending multicast, and asserts O_V (message routed to, and received at, the client (3,2)).

In route 744, there is an X-multicast from a client (0,0) in a first X ring (Y=0) to a different X ring [Y=1]. First, the source client at (0,0) sends an X-multicast message to clients at (*,1). Router (0,0) accepts a message I from its client, routes I→X and I→Y, asserts X.v into XI of router (1,0) and asserts Y.v into YI of router (0,1). Router (0,1) routes YI→Y, asserts O_V (message routed to, and received at, client (0,1)). The next X-ring router (1,0) routes XI→X, asserts X.v into XI of router (2,0) and asserts Y.v into YI of router (1,1). Router (1,1) outputs the message to client (1,1) on the Y output of the router (1,1). The next X ring router (2,0) routes XI→X, asserts X.v into XI of router (3,0) and asserts Y.v into YI of router (2,1). Router (2,1) outputs the message to client (2,1) on the Y output of the router (2,1). The next X ring router (3,0) routes XI→Y only, negates X.v (because the client (3,1) is the last client in the X ring x=1 to receive the X multicast message), and asserts Y.v into YI of router (3,1). Router (3,1) outputs the message to client (3,1) on the Y output of the router (3,1).

In a route 746, there is an X-multicast to a same X ring [Y=3], with deflection due to a contention with a valid input of YI to one of the routers in the X ring Y=3. The source client (1,3) sends an X-multicast to clients (*,3). The router (1,3) receives a message I from its client (the source client), and outputs this message to the client at (1,3) and to the XI input of the router (2,3) with nx=2. But the router (2,3) cannot output the message to client (2,3) during this cycle, in this illustrative example, because the Y output is allocated to a YI message. Instead the X-multicast message deflects, undelivered to the client (2,3), to the router (3,3) with nx=2. At the router (3,3) nx #3, so the router (3,3) routes the, sans delivery to the client (0,3), with nx=2. At the router (0,3), nx≠0, so the router (0,3) routes the message, sans delivery to the client (0,3), to the router (1,3) with nx=2. At the router (1,3), nx≠1, so the router (1,3) routes the message, sans delivery to the client (1,3), to the router (2,3) with nx=2. This time the Y output of the router (2,3) is available, so the router (2,3) routes XI→Y for output to the client (2,3) and routes XI→X with X.v into XI of the router (3,3) with nx=3 (the router (2,3) increments nx from 2 to 3). Similarly, the router (3,3) delivers the message to the client (3,3) and to the router (0,3), and increments nx to 0 (a modulo incrementation as described above). The router (0,3) delivers the message to the client (0,3), and, at that point, ends the X-multicast because nx has cycled through all of the X values 1, 2, 3, and 0.

Broadcast (XY Multicast)

Broadcast (XY multicast) delivers an input message to all clients on the NOC. Broadcast is an XY-multicast message with mx=1, my=1 (see FIG. 2A) that X-multicasts XY-multicast messages into each Y ring. Once an XY-multicast is sent into a Y ring, it acts as a Y-multicast, and is delivered to each client on that Y ring.

As with X-multicast, under NOC load, Y-output contention may lead to deflections that incur additional trip(s) around an X ring to complete injection of all XY-multicasts into all the clients of all Y rings.

Figure 7D:
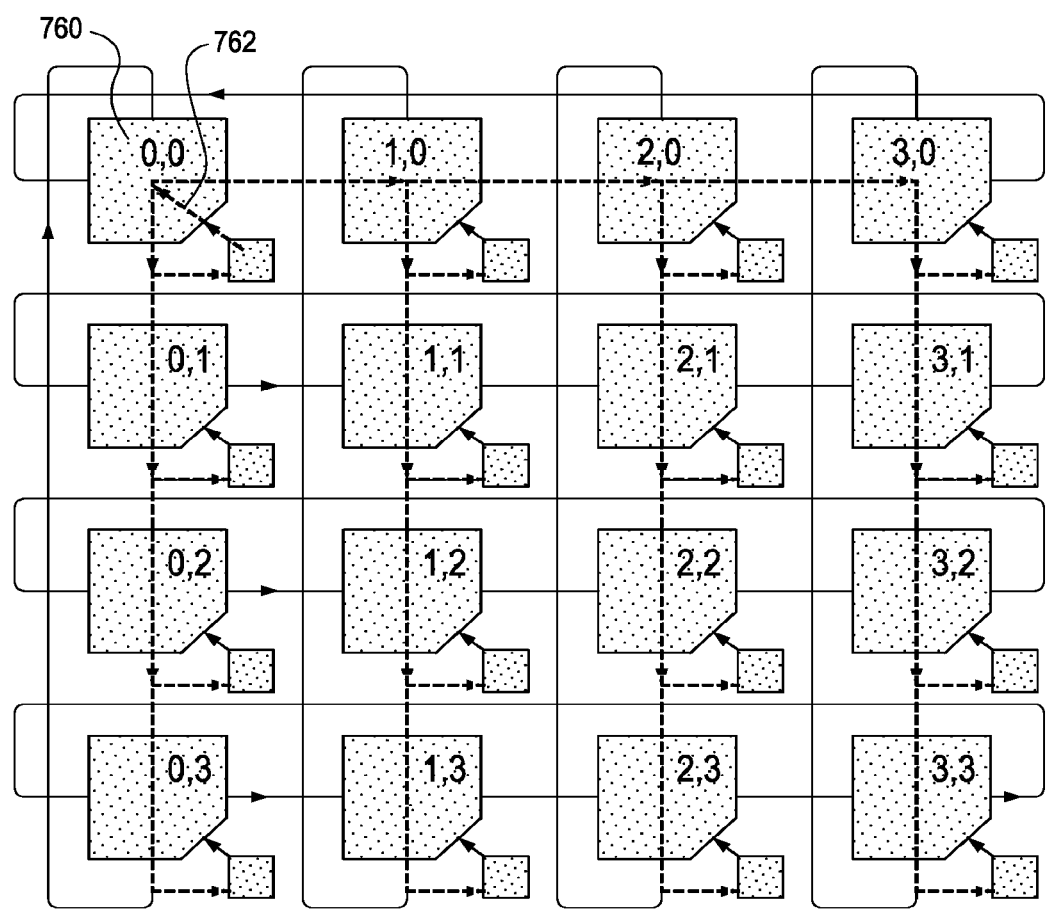

FIG. 7D is a diagram of a 4×4 NOC, and illustrates a broadcast from client (0,0) to clients (*,*). The (x,y) coordinates fields of the message are the X and Y coordinates of the of the source router, (0,0) in this example. The XY-multicast message traverses along the X ring [Y=0], visiting each router (0,0), (1,0), (2,0), (3,0) on the X ring. At each router in the X ring [Y=0], the XY-multicast message is also output on that router's Y port, with Y.v asserted and O_V asserted, so the XY-multicast message propagates along that Y ring, interpreted as a Y-multicast message within that Y ring, and is also output to each client as it proceeds along the Y-ring. On the Y ring [X=0], the XY-multicast message is output the clients at (0,0), (0,1), (0,2), and (0,3) over NY=4 cycles. It is similarly output to the clients of all other Y rings[X=1 to X=3]. In this example, message routing and delivery is pipelined in X and Y, so the broadcast takes NX+NY−1=7 cycles as follows: at a time t=1, the XY-multicast message arrives at the router and client (0,0), at a time t=2 the message arrives at the routers and clients (0,1) and (1,0), at a time t=3 the message arrives at the routers and clients (0,2), (1,1), (2,0), at a time t=4, the message arrives at the routers and clients (0,3), (1,2), (2,1), (3,0), at a time t=5 the message arrives at the routers and clients (1,3), (2,2), (3,1), at a time t=6 the message arrives at the routers and clients (2,3), (3,2), and at the time t=7 the message arrives at the router and client (3,3).

As a further illustrative example of a broadcast, i.e., an XY multicast, if, all at once, on one given cycle, every client (x,y) on the NOC of FIG. 7C simultaneously inputs, to its corresponding router, a broadcast message from (x,y) to (*,*), a total of 16×16=256 messages will be delivered (a respective message from each of the 4×4=16 clients to all of the 16 clients (including the source client). But in this embodiment, delivery of these 256 messages will take a total of only 20 clock cycles!

A key-use case for broadcast message delivery is to stream data arriving from an external interface core that is attached as one input client of the NOC by broadcasting messages to many or all clients on the NOC. In this special case, no deflection occurs (assuming that no other clients are generating messages I), because the broadcast-stream input client will input a broadcast message every cycle, at full link bandwidth. Therefore, once streaming is underway, a broadcast message will be delivered to every NOC client (including the source client) every cycle.

If the streaming-broadcast message-injection rate is less than one message per cycle, it may be practical to share the NOC with other message-generating clients.

Although the above multicast examples have illustrated, step by step, delivery of one multicast message at a time, in an embodiment a busy torus NOC may have many messages of many types (ordinary point-to-point, X-multicast, Y-multicast, broadcast) in flight, traversing the network simultaneously. It is noteworthy that in an embodiment, the same routers that transport ordinary point-to-point messages can also perform diverse multicast message delivery, with no changes required to the router switching circuit 330 (FIG. 3), and with no increase in the FPGA resources used. The only additional "cost" is the circuitry to generate and track the 'nx' register state, and a slightly more complex MCDOR routing circuit 350 (FIG. 3).

An embodiment of the MCDOR routing circuit 350 (FIG. 3) is described and represented by the following Verilog source code, which is not intended to be limiting:

```
1   //////////////////////////////////////////////////
2   // MCDOR -- dimension ordered routing (with multicast) function
3   //
4   module MCDOR #(
5       parameter MCAST   = 1,      // multicast?
6       parameter XSW     = 1,      // Xilinx switch?
7       parameter ENERGY= 1,        // 0: optimize latency; 3: opt. energy
8       parameter D_W     = 32,     // data payload width
9       parameter NX      = 4,      // diameter of X ring
10      parameter NY      = NX,     // diameter of Y ring
```

```
11      parameter X_W    = $clog2(NX),
12      parameter Y_W    = $clog2(NY),
13      parameter X      = 0,      // X address of this node
14      parameter Y      = 0       // Y address of this node
15  ) (
16      input   wire ce,                  // clock enable
17      input   wire `Msg yi,             // Y input message
18      input   wire `Msg xi,             // X input message
19      input   wire `Msg i,              // client input message
20      input   wire [X_W-1:0] nx_in,     // input X multicast next x
21      output  reg `Rt r,                // output route
22      output  reg [X_W-1:0] nx_out      // output X multicast next x
23  );
24      reg y_busy;
25      reg x_busy;
26      reg xEq;
27
28      // route YI->Y
29      task YI2Y; begin y_busy=1; r`y_sel=`YI; YvOv(yi); end endtask
30
31      // route XI->X (sometimes for deflection)
32      task XI2X; begin x_busy=1; r`x_sel=`XI; r`x_v=1; end endtask
33
34      // route XI->Y
35      task XI2Y; begin
36          y_busy = 1; r`y_sel = `XI; YvOv(xi);
37          if (XSW) begin x_busy = 1; r`x_sel = `XI; end
38      end endtask
39
40      // route I->X
41      task I2X; begin
42          x_busy=1; r`x_sel=`I; r`x_v=1; r`i_rdy=1;
43      end endtask
44
45      // route I->Y
46      task I2Y; begin
47          y_busy = 1; r`y_sel = `I; r`i_rdy = 1; YvOv(i);
48          if (XSW) begin x_busy = 1; r`x_sel = `I; end
49      end endtask
50
51      // A message was routed to Y. Set its output and Y
52      // valid flags, depending upon its Y multicast mode.
53      task YvOv(input `Msg m); begin
54          // Propagate Y msg if more multicast, or not yet at dest.
55          r`y_v = `_my(m) ? (`NEXTY != m`y) : (m`y != Y);
56          // Output msg if multicast or at dest.
57          r`o_v = `_my(m) ? 1'b1            : (m`y == Y);
58      end endtask
59
60      // Determine where to send each message XI/YI/I,
61      // whether there is a valid output message,
62      // and whether to accept the input message.
63      always @* begin
64          r = 0;
65          y_busy = 0;
66          x_busy = 0;
67          nx_out = 0;
68
69          // route YI input -- by DOR it is already on the right col X
70          if (yi`v) begin
71              YI2Y( );                              // continue YI->Y
72          end
73
74          // route XI input
75          xEq = `_mx(xi) ? (nx_in == X) : (xi`x == X);
76          if (xi`v) begin
77              // default: propagate current multicast X next x
78              nx_out = nx_in;
79              if (xEq && !y_busy) begin
80                  // at dest X, turn X->Y to output if Y avail
81                  XI2Y( );
82                  if (`_mx(xi) && `NEXTX != xi`x) begin
83                      // propagate until back to src x
84                      XI2X( );
85                      nx_out = `NEXTX;    // advance to next pending x
86                  end
87              end
```

-continued

```
88          else begin
89              XI2X( );                    // continue/deflect XI->X
90          end
91      end
92
93      // route local input
94      r`i__rdy = 0;                       // by default, input stalls
95      if (i`v) begin
96          // If multicast on X (and/or Y),
97          // i`x (and/or i`y) must be src X,Y:
98          // assert((!`__mx(i) || i`x==X) && (!`__my(i) || i`y==Y));
99          if (`__mx(i)) begin    // X multicast: inject I->X,Y
100             if (!x__busy && !y__busy) begin
101                 I2Y( );
102                 I2X( );
103                 r`x__v = `NEXTX != X;
104                 nx__out = `NEXTX;
105             end
106         end
107         else if (i`x == X) begin
108             // already at dest X, inject I->Y
109             if (!y__busy && !(XSW && x__busy)) begin
110                 I2Y( );
111             end
112         end
113         else if (!x__busy) begin
114             I2X( );    // not yet at dest X, inject I->X
115         end
116     end
117 end
118 endmodule
```

In an embodiment, the structure of the MCDOR routing-function logic follows that of the DOR router described above, and adds specific additional behaviors for multicast routing of router-input messages whose header's mx and my fields indicate multicast X, multicast Y, or multicast XY delivery. Unlike DOR, a multicast-message input routed according to MCDOR may be routed to both X and Y outputs and MCDOR may assert any or all of X-output valid (X.v), Y-output valid (Y.v), and client-output valid (O_)V signals (FIG. 3).

Since each router 300 (FIG. 3) may be readily configured with an application-specific routing circuit, it is also possible to devise embodiments that replace or augment the X-, Y-, and XY-multicast delivery patterns of MCDOR, for example, to route a message to a bit-set of destinations, a particular quadrant of the NOC, even/odd rows or columns of the NOC, or other arbitrary subsets of routers of the NOC, etc. Since routing-circuit inputs include entire input messages YI, XI, I, additional routing-function input data may also be provided by clients by adding routing-function directive data bits to the message data payload width D W.

A Floorplanned NOC and Tools

In the domain of FPGA design and FPGA electronic-design-automation CAD tools, the floor planning of a large design (i.e., the placement of the subcircuits of a design at specific sites on the physical die layout) is an essential tool for allowing a system designer to plan, express, and control the high-level system implementation, achieve methodical and deterministic results, and achieve timing closure. In lieu of floor planning, an FPGA place-and-route tool, and its various optimization passes, can reduce a highly ordered and structured hierarchical design to a set of unstructured amorphous blobs scattered about the die. Therefore, use of a place-and-route tool for a large design can render challenging the basic design routability and timing closure of the design. For example, just a small revision in the design of a submodule may result in a new physical layout for large portions of the design, or even for the entire design, with some wire delays increasing, thus generating new critical paths that may violate timing constraints.

A floor-planned NOC arrangement of 2D routers into rows and columns can provide an advantageous tool for system floor planning and for FPGA CAD tools optimizations. By floor planning the NOC, routers, or the subcircuits of routers and their client cores, may be tightly packed into neat rectangular regions. This allows these components to operate faster, as critical control signals need not traverse large paths across the die, and ensures that the router logic and interconnect do not "spill out" into the user logic of the client cores. By floor planning, inter-router link connections can employ predictable, direct routing in the programmable interconnect, and provide predictable and repeatable design implementations and simplify the system-timing closure. By floorplanning the NOC and by replacing a long communication link to distant modules with a connection to a nearby Hoplite router, no wires need be longer than a fraction of the die size. Shorter wires typically equal faster signaling and higher operating frequencies.

Furthermore, the utility of a high-bandwidth NOC, spanning the die, bringing data to/from diverse high-speed interfaces such as 100G networks and DRAM channels to any sector of the FPGA, greatly simplifies complex system-on-a-chip design. With the use of the FPGA-efficient NOC herein disclosed, it is no longer necessary for a client core that uses a DRAM channel to be physically adjacent to that channel. This is a significant advantage, as only so many client cores can be adjacent to any high-bandwidth resource, and, if a great plurality of client cores all make use of such resources, then an efficient way to place and interconnect them all is with such a NOC.

Figure 8A:
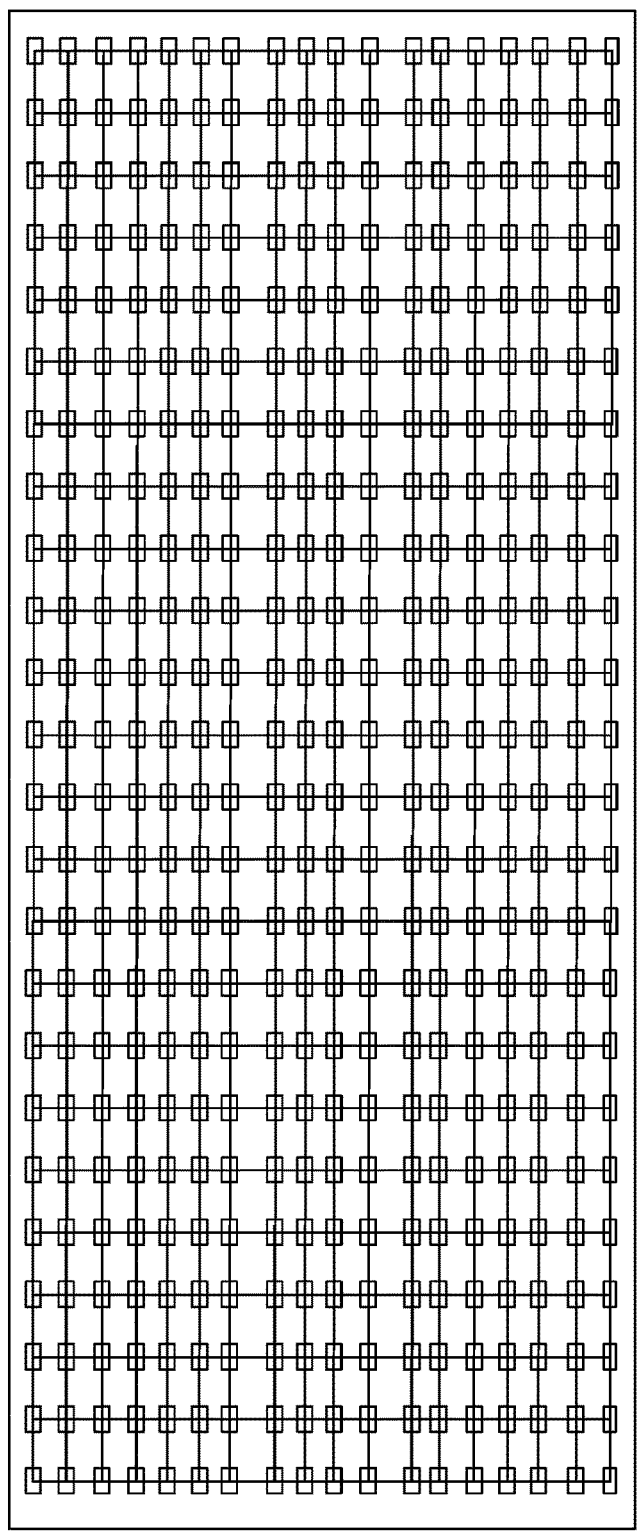
FIGS. 8A-8C are diagrams of embodiments of two implemented Xilinx FPGA designs with large floor-planned Hoplite NOCs.
Figure 8B:
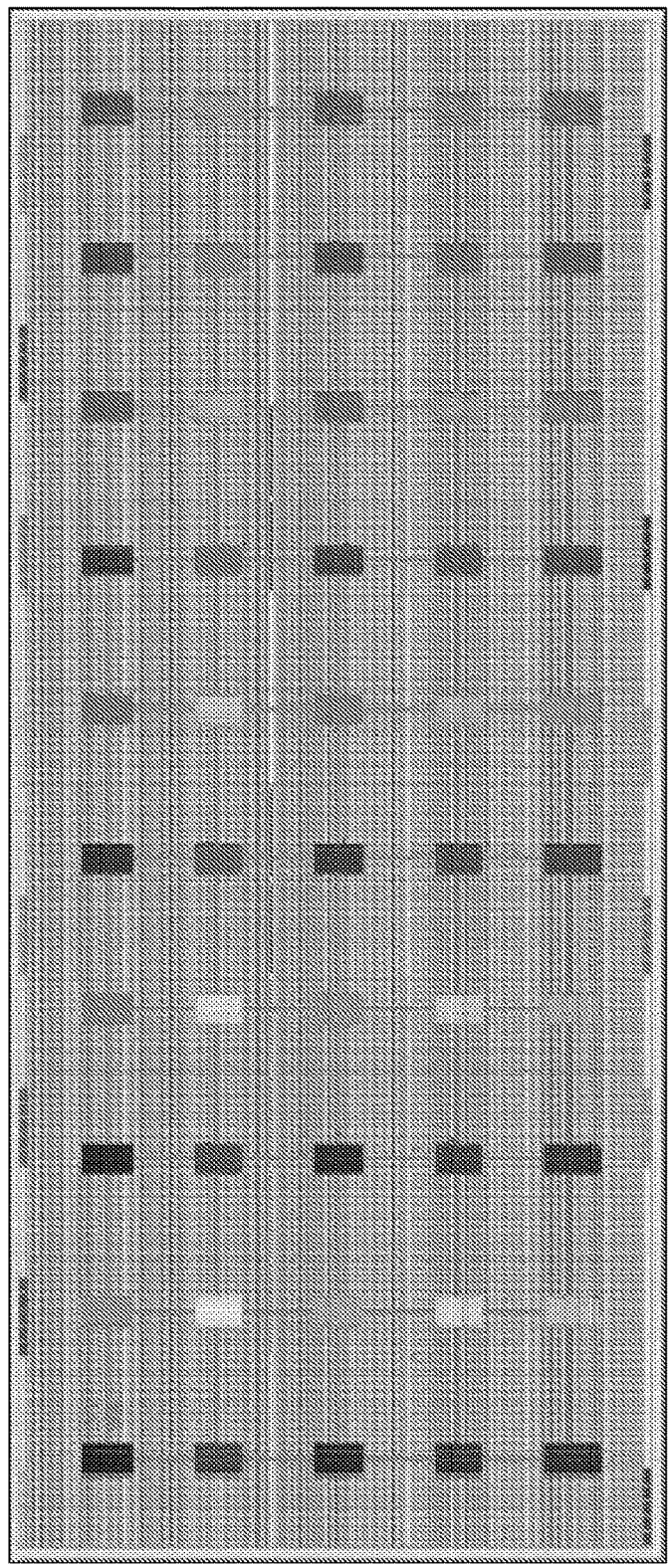
Figure 8C:
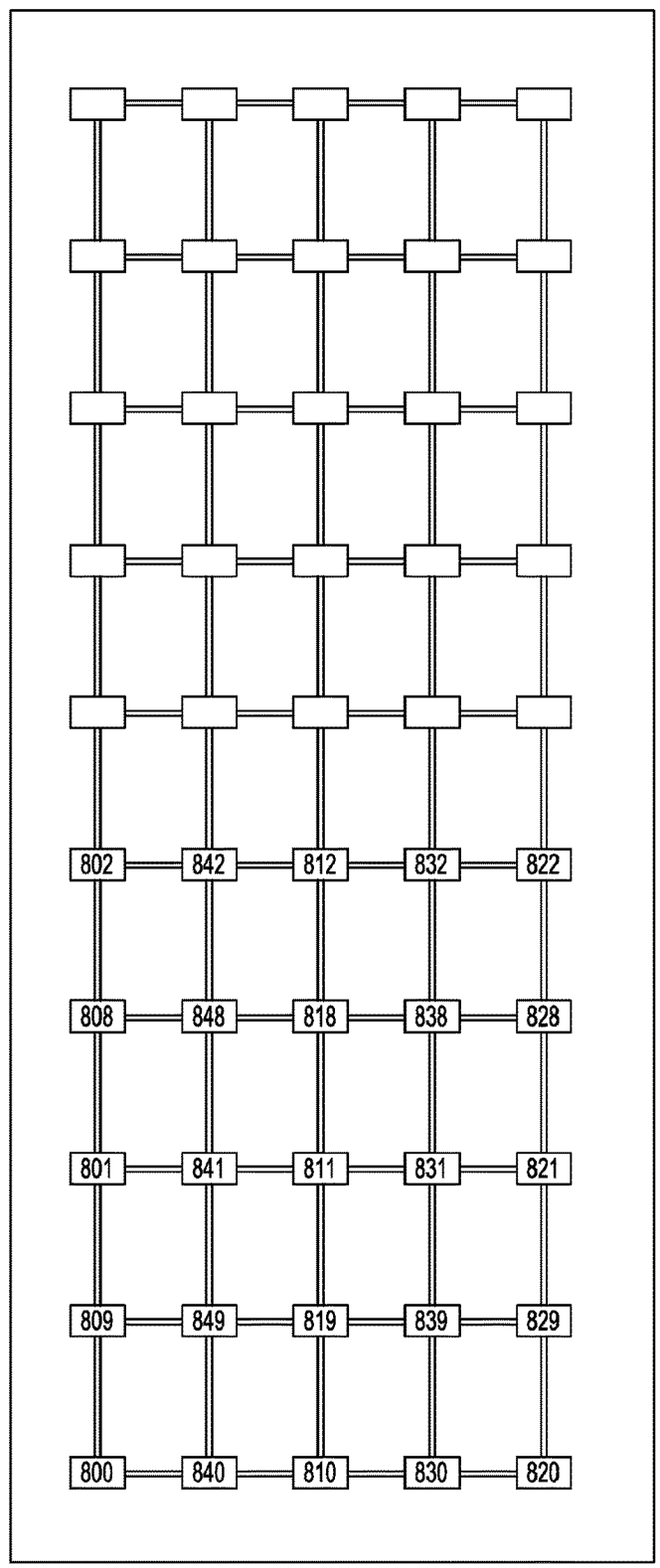

FIGS. 8A-8C are diagrams of embodiments of two implemented Xilinx FPGA designs with large floor-planned Hoplite NOCs. FIG. 8A is a diagram of a floorplan of an 18×24 (432 router) folded 2D torus NOC of w=50-bit messages, as could be employed in a massively parallel processor or accelerator array.

FIGS. 8B and 8C are diagrams of a floorplan of a 5×10 (50 router) folded 2D torus NOC of w=576-bit messages, as could be employed in a high-performance computing or networking accelerator application. FIG. 8B is a photograph of a die plot (floor-plan printout) of the 50-router NOC design, implemented in a Xilinx Kintex UltraScale KU040 device; FIG. 8C is a diagram of the same design as in FIG. 8B. In this example each link carries a total of 180 Gbps of data bandwidth, including 512 bits per cycle (150 Gbps) of memory data words. The NOC is sufficient to route 8 channels of full-speed 2400 MHz DDR4 DRAM traffic, 128 Gbps HBM DRAM traffic, or 100 Gbps network traffic to and from any client core at any site in the FPGA. The implemented routers 800, 840, 810, 820, 830, 809, 801, 808, etc. illustrate the torus is spatially folded, with router placements interleaved, to minimize worst-cast wire net lengths across the torus. That is, router 800's (i.e., router (0,0)) YI input comes from the Y output of router 809 (i.e., router (0,9)). Router 800's Y output goes to the YI input of router 801 (i.e., router (0,1)). And router 800's XI input comes from the X output of router 840 (i.e., router (4,0)). And router 800's X output goes to the XI input of router 810 (i.e., router (1,0)).

Figure 9A:
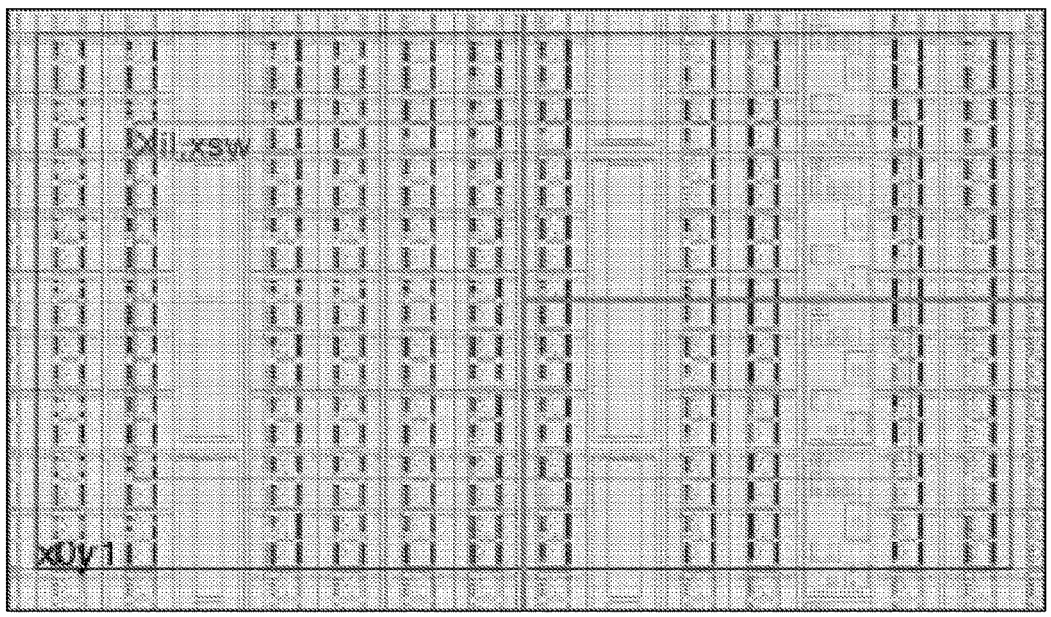
FIG. 9A is a diagram of an embodiment of a technology-mapped and floor-planned design of one 576-bit Hoplite router core from the design of FIG. 8B. Of note in this embodiment is the full utilization of most logic-cell sites. Many Xilinx logic clusters (slices), each cluster including eight 6-LUTs and 16 flip-flops, are filled with eight 6-LUTs configured to compute 16 bits of next X and Y outputs, registered in the same slice in 16 flip-flops.

FIG. 9A is a photograph of one region of a die plot of a FPGA-efficient technology-mapped and floor-planned design, the viewport magnified to render one floor-planned 576 bit Hoplite router core from FIG. 8B, according to an embodiment. Of note is the full utilization of many logic-cell sites which are seen in a darker tone. Many Xilinx logic clusters (slices), of eight 6-LUTs and 16 flip-flops, are here seen filled with eight 6-LUTs computing 16 bits of next X and Y outputs, registered in the same slice in 16 flip-flops. This dense implementation is facilitated by the advantageous Xilinx 6-LUT router switch technology mapping optimizations described earlier at FIG. 5E. FIG. 9A also depicts some regions without logic cells. These represent embedded block RAM and embedded DSP blocks that are not consumed by the router implementation and remain available for use by other logic in the system, for example, an adjacent client core, if any.

Figure 9B:
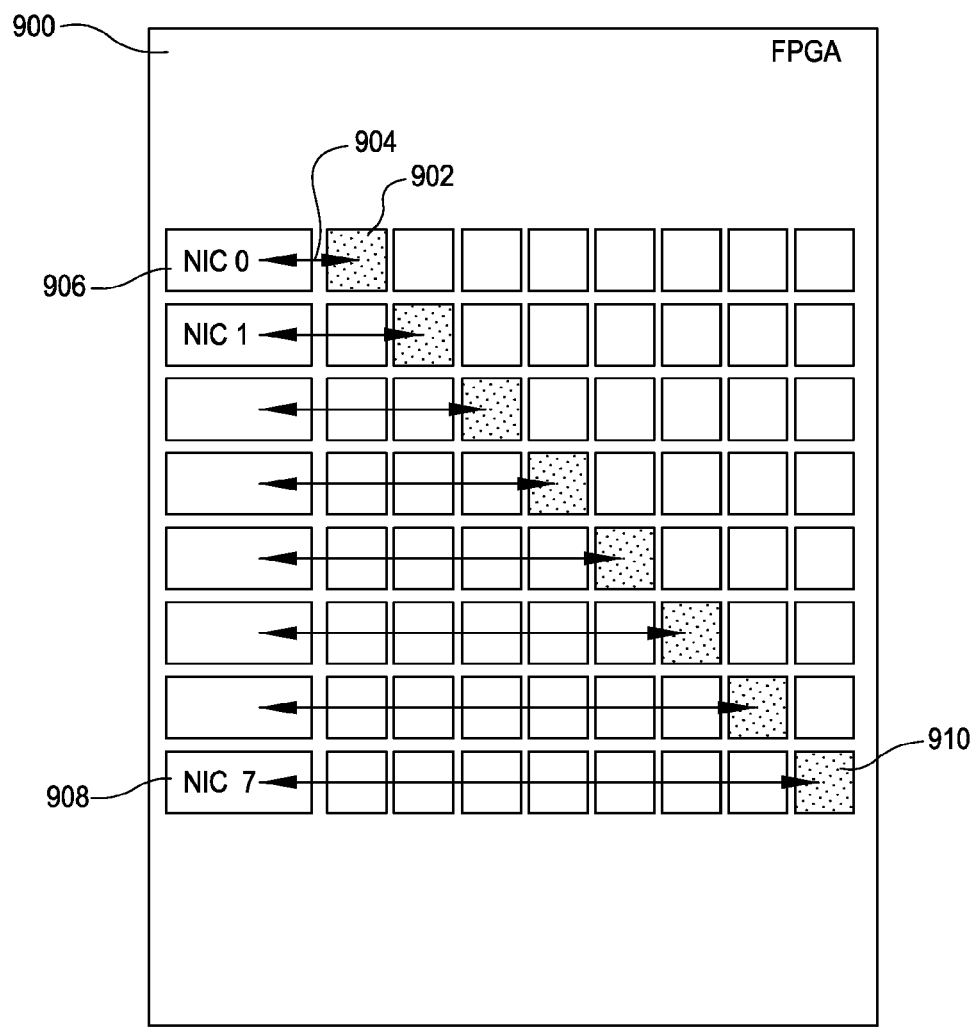
FIG. 9B is a diagram of an embodiment of another FPGA NOC floorplan, a dense one with no interior space for client cores, an 8×8 (64 routers) folded 2D torus, each router with w=256-bit links, with a 2.2 ns clock period (110 Gb/s bandwidth/link) suitable for hosting a 100 Gb/s Ethernet switching fabric. Eight network interface cores (NICs) inject and receive messages into/from the NOC.

FIG. 9B is a diagram of another FPGA NOC floor plan, a dense one with no interior space for client cores, an 8×8 (64 routers) folded 2D torus NOC, each router with w=256-bit links, with a 2.2 ns clock period (110 Gbps bandwidth/link) suitable for hosting a large 100 Gbps Ethernet switching fabric, according to an embodiment. In an embodiment, if N Ethernet network interface cores (NIC) are placed at certain router sites in an N×N torus NOC, such as at router locations (0,0), (1,1), . . . (N−1,N−1), then Ethernet traffic data messages from any NIC output port to any NIC input port may route at full bandwidth, usually without deflection, achieving an effective network switch fabric.

More specifically, an FPGA 900 contains a circuit comprising a plurality of NICs and a NOC of 8×8=64 Hoplite routers 902 each interconnected by w=256-bit links (not shown for clarity) to form 8 X rings and 8 Y rings. Certain routers, including routers 902 and 910, at router coordinates (0,0), (1,1), . . . , (7,7) are connected to NIC clients such as 906 and 908. Any message from a NIC[i] client 906 at a router (i,i) 902 to another NIC[j] client 908 at a router (j,j) 910 enters the NOC at router (i,i) 902, traverses routers on its X ring to router (j,i), then routes on the Y ring (X=j) to the router (j,j) 910. This embodiment includes an assignment of client cores to routers (on a diagonal) to reduce the rate of message routing deflections. In an embodiment, if a plurality of NOC client cores are placed at disjoint x and y sites in a torus NOC, such as on the diagonal (0,0), (1,1), . . . (N−1,N−1), then message traffic over the NOC, from any client input port to any client output port, may route at full bandwidth, usually without deflection. For example, in an embodiment with Ethernet NIC client cores, the design achieves an effective and versatile Ethernet network switch fabric.

Figure 10:
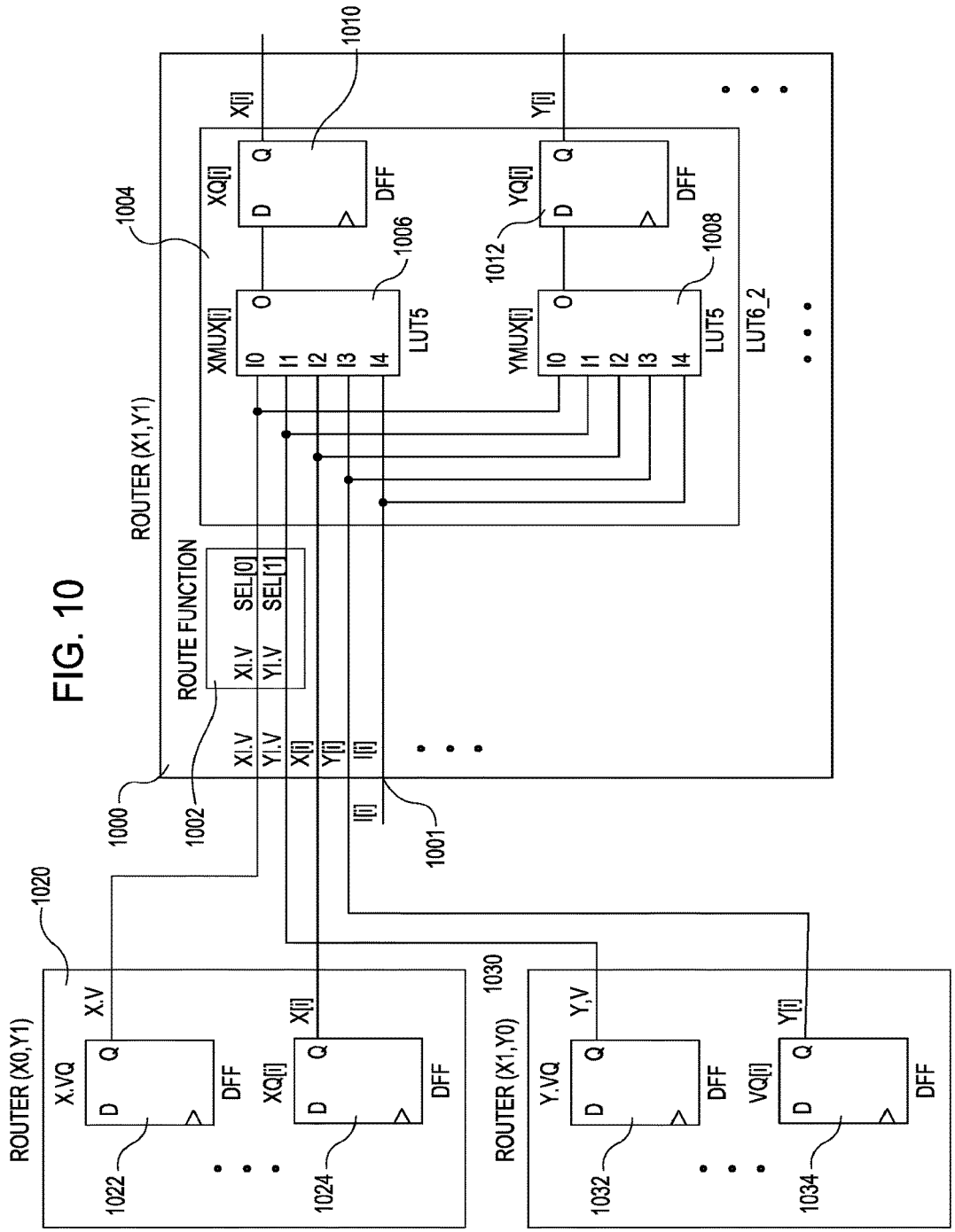
FIG. 10 is a diagram of an embodiment of a Xilinx post-implementation technology-mapped circuit representation of the critical path in the embodiment of the NOC of FIG. 8B. The diagram of FIG. 10 illustrates the extreme circuit efficiency that the overall Hoplite router and NOC design achieves. There is only a single LUT delay (gate delay) between two upstream routers' data and valid-output flip-flops X[i], X.v, Y[i], Y.v, and the destination router's corresponding data-output flip-flops X[i], Y[i]. This example also illustrates that the output-multiplexer-switch-logic design described herein enables a zero-gate, zero-delay routing function where the output multiplexers' transfer function-select signals are directly formed from the upstream router's output valid signals.

FIG. 10 is a diagram of a Xilinx post-implementation-technology-mapped circuit schematic of one subcircuit of the FIG. 8B system, which contains at least 5×10×576=28,800 such subcircuits, according to an embodiment. FIG. 10 illustrates the extreme circuit efficiency (some would say extreme circuit optimization) that the overall Hoplite router and NOC design, embodiments of which are disclosed herein, achieves. The embodiment described in conjunction with FIG. 10 pertains to a Xilinx implementation, and the switch circuit 1004 is similar to the switch circuit described above in conjunction with FIG. 5E. Here there is only a single LUT delay (gate delay) between the upstream routers' message-payload output flip-flops X[i], X.v, Y[i], Y.v, and this router's message payload output flip-flops X[i], Y[i]. Select-router-input flip-flops are as follows. Some of the output flip-flops of upstream X-ring router 1020 and upstream Y-ring router 1030 are as follows: flip-flop 1032 generates a Ymessage-valid signal; flip-flop 1034 generates a Y-message data-payload bit (one of many); flip-flop 1022 generates an X-message-valid signal; and flip-flop 1024 generates a corresponding X-message data-payload bit (one of many). These signals are input to the router 1000 on inputs XI.v, YI.v, XI[i], YI[i], and a client-message data-payload bit is input on input I[i], at 1001. Logic circuit 1002 is responsible for determining the X and Y switch multiplexer-select controls SEL[1:0](analogous to signals 352 and 354 of FIG. 3) as a function of the XI, YI, and I message inputs. A logic cell 1004 comprises a dual-output 6-LUT that is split into two common-5-input LUTs 1006 and 1008 that compute the next X-output-message bit and Y-output-message bit, respectively. Each 5-LUT has five inputs: SEL[1], SEL[0], XI[i], YI[i], I[i] and one output X_NXT[i] or Y_NXT[j]. The outputs registered in flip-flops 1010 and 1012 form two of the router's X[i] and Y[i] output bits. In this embodiment, the router's switch-multiplexer select-control subcircuit 1002 uses no gates or LUTs—just wire relabeling—because careful selection of switch multiplexer LUT 1006 and 1008 transfer functions and the DOR routing function logic (both described above) enable the direct use of the input messages' XI-valid and YI-valid signals to select the output-multiplexer transfer functions.

An Exemplary Computing System Application of the Router and NOC

An exemplary FPGA computing system is herein disclosed to illustrate and to foster appreciation for the utility of the router, NOC, and overall interconnect network system. In this example, the system implements a massively parallel Ethernet router and packet processor.

Figure 11:
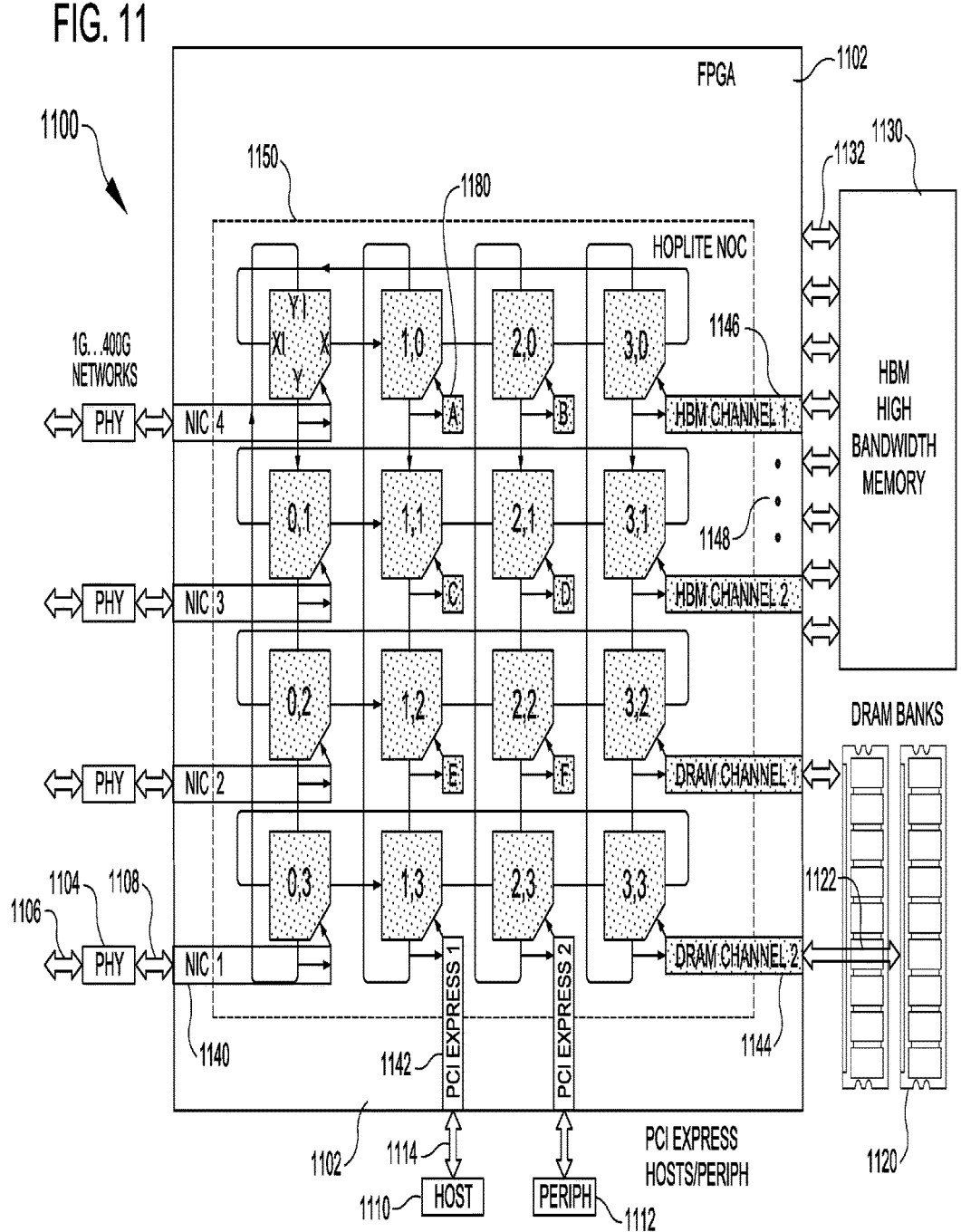
FIGS. 11 and 12 are diagrams of an embodiment of an exemplary FPGA computing system that incorporates one of more embodiments of a router, NOC, and overall interconnect network system described in conjunction with FIGS. 1-10. The system implements a massively parallel Ethernet router and packet processor.

FIG. 11 is a diagram of a top-level view of a system that includes a computing device 1100, according to an embodiment. In addition to the computing device 1100, the system comprises an SOC implemented in an FPGA 1102, network interfaces 1106 with NIC external-interface client cores 1140, PCI-express interfaces 1114 with PCI-express external-interface client cores 1142, connected PCI-express host 1110, DRAM 1120 with DRAM-channel external-interface client cores 1144, a HBM (high bandwidth memory) device with HBM-channel external-interface client cores 1146, and multiprocessor/accelerator-cluster client cores 1180 (cores A-F).

Figure 12:
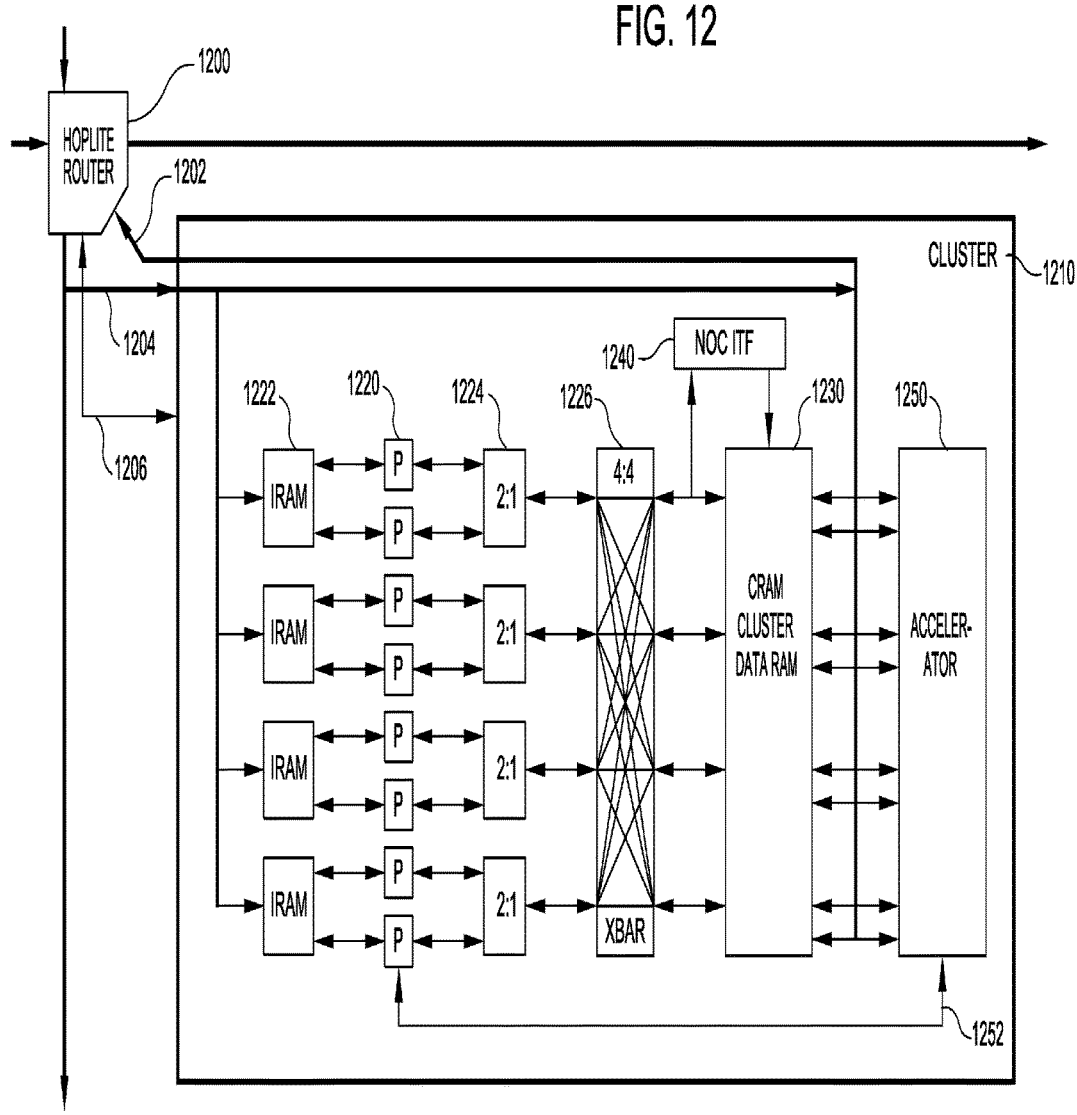

FIG. 12 is a diagram of one cluster "tile" of the system of FIG. 11, according to an embodiment. The tile comprises a Hoplite router 1200 (corresponding to router (1,0) of FIG. 11) coupled to other Hoplite routers (not shown in FIG. 12) and coupled to the multiprocessor/accelerator-cluster client 1210 (corresponding to client core "A" 1180 in FIG. 11). The exemplary cluster 1210 comprises eight 32-bit RISC soft processor cores 1220, with instruction memory (IRAM) block RAMs 1222, which share access to a cluster data RAM (CRAM) 1230, which is also connected to an accelerator core 1250. The cluster 1210 is connected to the router 1200 to send and receive messages over the NOC. A local interconnection network of request concentrators 1224 and a 4×4 crossbar 1226 connects the processors to the multi-ported cluster RAM 1230, which comprises a plurality of block RAMs, and to the Hoplite NOC router interface 1240.

In this example system, a cluster-core tile uses four block RAMs for the instruction RAMs 1222 and eight block RAMs for the cluster-data RAM 1230. This configuration enables up to four independent reads or writes into the CRAM 1230 by the processors and concurrently up to eight reads or writes into the CRAM by the accelerators (if any) or by the network interface.

In the exemplary computing system described herein, the system comprises ten rows×five columns=50 of such multiprocessor/accelerator cluster cores, or 50×8=400 processors in total. The NOC is used to carry data as messages between clusters, between clusters and external-interface cores (for example to load or store to external DRAM), and directly between external-interface cores. In this example, NOC messages are approximately 300 bits wide, including 288 bits of data payload (32-bit address and 256-bit data field).

The cluster core 1210 also comprises a Hoplite NOC router interface 1240, which connects the cluster's memory banks to the cluster's Hoplite router input, so that a message read from the cluster's memory banks may be sent (output) to another client on the NOC via the message input port on the cluster's Hoplite router, or a message received from another NOC client via the NOC via the cluster's Hoplite router may be written into the cluster's memory banks. In this example, the processor cores 1220 share access to the local memory banks with each other and with the Hoplite NOC interface. Accordingly, a message received from the NOC into the local memory may be directly accessed and processed by any (or many) of the cluster's processors, and conversely the cluster's processors may prepare a message in memory and then cause it to be sent out of the cluster to other clients of the NOC via the cluster's Hoplite router.

In the arrangement of cores 1210, cluster RAM 1230, and network interface 1240 described in conjunction with FIGS. 11 and 12, high-throughput and low-latency computation may be achieved. An entire 32 byte request message may be received from the NOC in one clock cycle; then as many as eight processors may be dispatched to work on the request in parallel; then a 32 byte response may be sent into the NOC in one clock cycle. This can even happen simultaneously across some of the fifty instances of the cluster 1210, on a single FPGA device.

In this example, a computing cluster 1210 may further comprise zero, one, or more accelerator cores 1250, coupled to the other components of the cluster in various ways. An accelerator 1250 may use the cluster-local interconnect network to directly read or write the shared memory banks. An accelerator 1250 may couple to a soft processor 1220, and interact with software execution on that processor, in various ways, for example and without limitation, to access registers, receive data, provide data, determine conditional-branch outcomes, through interrupts, or through processor-status-word bits. An accelerator 1250 may couple to the Hoplite router interface 1240 to send or receive messages. Within a cluster 1210, interconnection of the processor cores 1220, accelerators 1250, memories 1222 and 1230, and Hoplite NOC interface 1240 make it possible for the combination of these components to form an effective accelerated computing engine. Aspects of a workload that are best expressed as a software algorithm may be executed on one or more of the processor cores 1220. Aspects that may be accelerated or made more energy efficient by expression in a dedicated logic circuit may be executed on one or more accelerators 1250. The various components may share state, intermediate results, and messages through direct-communication links and through the cluster's shared memory 1230.

At the top level of the system design hierarchy, a Hoplite NOC interconnects the system's NICs 1140, DRAM channels 1114, and processing clusters 1210. Therefore, the application running across the compute clusters may take full advantage of all of these resources. By sending a message to a DRAM-channel controller 1114 via the NOC, a cluster 1210 may request the message data payload be stored in DRAM at some address, or may request the DRAM channel controller to perform a DRAM read transaction and then send the resulting data back to the cluster, in another message over the NOC. In a similar fashion, another client core, such as a NIC, may send messages across the NOC to other clients. When a NIC interface 1140 receives an incoming Ethernet packet, it may reformat it as one or a plurality of NOC messages and send these via the NOC to a DRAM-channel interface 1144 to save the packet in memory, it may send these messages to another NIC to directly output the packet on another Ethernet network port, or it may send these messages to a compute cluster for packet processing. In some applications, it may be useful to multicast certain messages to a plurality of clients including compute-cluster clients 1210. Rather than sending the messages over and over to each destination, multicast delivery may be accomplished efficiently by prior configuration of the NOC's constituent Hoplite routers to implement multicast message routing.

An application of this exemplary multiprocessor system is as a "smart router" that routes packets between NICs while also performing packet compression and decompression and packet sniffing for malware at full throughput, as packets traverse the router. This specific example should not be construed to be limiting, but rather serves to illustrate how an integrated parallel-computing device employing a Hoplite NOC interconnect system can input work requests and data, perform the work requests cooperatively and often in parallel, and then output work results. In such an application, a network packet arrives at a NIC. The NIC receives the packet and formats it into one or more 32 byte messages. The NIC then sends the messages to a specific computing-cluster client 1210 via the NOC for packet processing. The computing cluster 1210 receives the input packet messages and assembles them into a copy of the original packet in the cluster memory. If the packet data is compressed, one or more soft processors in the cluster execute a decompression algorithm on the packet, forming a new, uncompressed packet in memory.

Given an uncompressed packet, malware-detection software executes on one or more soft processors 1220 to scan the bytes of the message payload for particular byte sequences that exhibit characteristic signatures of specific malware programs or code strings. If potential malware is found, the packet is not transmitted on, but rather is saved to DRAM memory for subsequent 'offline' analysis. If potential malware is not detected, then the packet is compressed by a compression algorithm running on one or more of the soft processors.

Next, packet-routing software, run on one or more of the soft processors 1220, consults tables to determine where to send the packet next. Certain fields of the packet, such as 'time to live', may be updated. Finally, the packet is formatted as one or more NOC messages and sent through the cluster's Hoplite router 1200, via the NOC, to the appropriate NIC client core. As these messages are received by the NIC via the NOC, they are formatted by the NIC into an output packet, which the NIC transmits via its external network interface.

In this example, the computations of decompression, malware detection, compression, and routing are performed in software, possibly in a parallel or pipelined fashion, by one or more soft processors 1220 in one or more computing-cluster clients 1210. In alternative embodiments, any or all of these steps may be performed in dedicated logic hardware by accelerator cores 1250 in the cluster, which accelerator cores interconnect to each other or to the other components of the cluster.

In an embodiment, packet processing for a given packet takes place in one computing-cluster client 1210. In alternative embodiments, multiple compute-cluster clients 1210 may cooperate to process packets in a distributed fashion. For example, specific clusters 1210 may specialize in decompression or compression, while others may specialize in malware detection. In this case, the packet messages might be sent from a NIC to a decompression cluster 1210. After decompression, the decompression cluster 1210 may send the decompressed packet (as one or more messages) on to a malware scanner cluster 1210. There, if no malware is detected, the malware scanner may send the decompressed, scanned packet to a routing cluster 1210. There, after determining the next destination for the packet, the routing cluster 1210 may send the packet to a NIC client 1140 for output. There, the NIC client 1140 may transmit the packet to its external network interface. In this distributed packet-processing system, in an embodiment, a client may communicate with another client via some form of direct connection of signals, or, in an embodiment, a client may communicate with another client via messages transmitted via the NOC. In an embodiment, communications may be a mixture of direct signals and NOC messages.

A particular embodiment of this exemplary computing system may be implemented in an FPGA as follows. Once again, the following specific example should not be construed to be limiting, but rather to illustrate an advantageous application of an embodiment disclosed herein. The FPGA device is a Xilinx Kintex UltraScale KU040, which provides a total of 300 rows×100 columns of slices of eight 6-LUTs=240,000 6-LUTs, and 600 BRAMs (block RAMs) of 36 Kb each. This FPGA is configured to implement the exemplary computing device described above, with the following specific components and parameters. A Hoplite NOC configured for multicast DOR routing, with NY=10 rows by NX=5 columns of Hoplite routers and with w=256+32+8+4=300-bit wide links, forms the main NOC of the system.

The FPGA is floor planned into 50 router+multiprocessor/accelerator clusters arranged as rectangular tiles, and arrayed in a 10×5 grid layout, with each tile spanning 240 rows by 20 columns=4800 6-LUTs and with 12 BRAMs. The FPGA resources of a tile are used to implement a cluster-client core 1210 and the cluster's Hoplite router 1200. The cluster 1210 has a configurable number (zero, one, or a plurality) of soft processors 1220. In this example, the soft processors 1220 are in-order pipelined scalar RISC cores that implement the RISC-V RV32I instruction-set architecture. Each soft processor 1220 consumes about 300 6-LUTs of programmable logic. Each cluster has eight processors 1220. Each cluster also has four dual-ported 4 KB BRAMs that implement the instruction memories 1222 for the eight soft processors 1220. Each cluster 1210 also has eight dual-ported 4 KB BRAMs that form the cluster data RAM 1230. One set of eight ports on the BRAM array is arranged to implement four address-interleaved memory banks, to support up to four concurrent memory accesses into the four banks by the soft processors 1220. The other set of eight ports, with input and output ports each being 32 bits wide, totaling 32 bits×8=256 bits, on the same BRAM array is available for use by accelerator cores 1230 (if any) and is also connected to the cluster's Hoplite router input port 1202 and the Hoplite router's Y output port 1204. Router-client control signals 1206 (correspond to I_RDY and O_V of FIG. 3) indicate when the router's Y output is a valid input for the cluster 1210 and when the router 1200 is ready to accept a new message from the client 1210.

A set of memory bank arbiters and multiplexers 1224, 1226 manages bank access to the BRAM array from the concurrent reads and writes from the eight processors 1220.

In this exemplary system, software running on a soft processor 1220 in a cluster 1210 can initiate a message send of some bytes of local memory to a remote client across the NOC. In some embodiments, a special message-send instruction may be used. In another embodiment, a regular store instruction to a special I/O address corresponding to the cluster's NOC interface controller 1240 initiates the message send. The store instruction provides a store address and a 32-bit store-data value. The NOC interface controller 1240 interprets this as a message-send request, to copy 1-32 bytes at the local "store" address, to the destination client on the NOC (and at a destination address within the client) indicated by the store's 32-bit data value.

Three examples illustrate a method of operation of the system of FIGS. 11 and 12, according to an embodiment.

1) To send a message to another processor 1220 in another cluster 1210, a processor 1220 prepares the message bytes in its cluster RAM 1230, then stores (sends) the message to the receiver/destination. The 32-bit store-data value encodes both the (x,y) coordinates of the destination cluster's router 1200, and the address within the destination cluster's local memory array to receive the copy of the message. The NOC interface controller reads up to 32 bytes from the cluster BRAM array, formats this into a message, and sends it via the cluster's Hoplite router, across the NOC, to the specific cluster, which receives the message and writes the message payload into its local cluster memory at the specified address.

2) To store a block of 1-32 bytes of data to DRAM through a specific DRAM channel 1144, perhaps in a conventional DRAM, perhaps in a segment of an HBM DRAM device, a processor stores (sends) the block of data and provides a 32-bit store-data address that indicates a) the store is destined for DRAM rather than the local cluster memory of some cluster, and b) the address within the DRAM array at which to receive the block of data. The NOC interface controller 1240 reads the 1-32 bytes from the cluster local memory array, formats this into a message, and sends it via the cluster's Hoplite router 1200 across the NOC to the specific DRAM channel controller 1144, which performs the store.

3) To perform a remote read of a block of 1-32 bytes of data, for example, from a DRAM channel 1144, into 1-32 bytes of cluster local memory, a processor 1220 prepares a load-request message, in local memory, which specifies the address to read, and the local destination address of the data, and sends that message to the specific DRAM channel controller 1144, over the NOC. Upon receipt by the DRAM channel controller 1144, the latter performs the read request, reading the specified data from DRAM (e.g., DRAM 1120), then formatting a read-response message comprising the read-data bytes. The DRAM channel controller 1144 sends the read-response message via its Hoplite router 1200 via the Hoplite NOC, back to the cluster 1210 that issued the read, where the message payload (the read data) is written to the specified read address in the cluster local memory 1230.

This exemplary parallel computing system is a high-performance FPGA system on a chip. Across all 5×10=50 clusters 1210, 50×8=400 processor cores 1220 operate with a total throughput of up to 400×333 MHz=133 billion operations per second. These processors can concurrently issue 50×4=200 memory accesses per clock cycle, or a total of 200×333 MHz=67 billion memory accesses per second, which is a peak bandwidth of 267 Gbps (gigabits per second). Each of the 50 clusters' memories 1230 also have an accelerator/NOC port which can access 32 bytes/cycle/cluster for a peak accelerator/NOC memory bandwidth of 50×32 bytes/cycle=1.6 Kbytes/cycle or 533 Gbps. The total local memory bandwidth of the machine is 800 Gbps. Each link in the Hoplite NOC carries a 300-bit message, per cycle, at 333 MHz. Each message can carry a 256-bit data payload for a link payload bandwidth of 85 Gbps and a NOC bisection bandwidth of 10×85=850 Gbps.

The LUT area of a single Hoplite router 1200 in this exemplary system is 300 6-LUTs for the router data path and approximately 10 LUTs for the router control/routing function. Thus the total area of this Hoplite NOC 1200 is about 50×310=15,500 LUTs, or just 6% of the total device LUTs. In contrast the total area of the soft-processor cores is 50×300×8=120,000 LUTs, or about half (50%) of the device LUTs, and the total area of the cluster local memory interconnect multiplexers and arbiters is about 50×800=40,000 LUTs, or 17% of the device.

As described earlier, in this continuing example system, messages are processed, one by one as they arrive at each NIC, by one or more clusters. In another embodiment, the array of 50 compute clusters 1210 is treated as a "Gatling gun" in which each incoming packet is sent as NOC messages to a different, idle cluster. In such a variation, clusters may be sent new packets to process in a strict round robin order, or packets may be sent to idle clusters even as other clusters take more time to process larger or more-complex packets. On a 25G (25 Gbps bandwidth) network, a 100 byte (800 bit) message may arrive at a NIC every (800 bits/25e$^9$ b/s)=32 ns. As each received packet is forwarded (as four 32-byte NOC messages) from a NIC to a specific cluster 1210, that cluster, one of 50, works on that packet exclusively for up to 50 packet-arrival-intervals before it must finish up and prepare to receive its next packet. A cluster-packet processing-time interval of 50×32 ns=1600 ns, or 1600 ns/3 ns/cycle=533 clock cycles, and with 8 soft processors 1220 the cluster can devote 533 cycles×8 processors x up to 1 instruction/cycle, e.g., up to 4200 instructions of processing on each packet. In contrast, a conventional FPGA system is unable to perform so much general purpose programmable computation on a packet in so little time. For applications beyond network-packet compression and malware detection, throughput can be can be further improved by adding dedicated accelerator-function core(s) to the soft processors 1220 or to the cluster 1210.

In addition to message-passing-based programming models, an embodiment of the system is also an efficient parallel computer to host data-parallel-programming models such as that of OpenCL. Each parallel kernel invocation may be scheduled to, or assigned to, one or more of the clusters 1210 in a system, wherein each thread in an OpenCL workgroup is mapped to one core 1220 within a cluster. The classic OpenCL programming pattern of 1) reading data from an external memory into local/workgroup memory; then 2) processing it locally, in parallel, across a number of cores; then 3) writing output data back to external memory, maps well to the architecture described in conjunction with FIGS. 11 and 12, wherein these first and third phases of kernel execution performing many memory loads and stores, achieve high performance and high throughput by sending large 32-byte data messages, as often as each cycle, to or from any DRAM controller's external-interface client core.

In summary, in this example, a Hoplite NOC facilitates the implementation of a novel parallel computer by providing efficient interconnection of its diverse clients—computing-cluster cores, DRAM channel-interface cores, and network interface cores. The NOC makes it easy for computation to span compute clusters, which communicate by sending messages (or multicast messages). By efficiently carrying extreme bandwidth data traffic to any site in the FPGA, the NOC simplifies the physical layout (floor planning) of the system. Any client in the system, at any site in the FPGA, can communicate at high bandwidth with any NIC interface or with any DRAM channel interface. This capability may be particularly advantageous to fully utilize FPGAs that integrate HBM DRAMs and other die-stacked, high-bandwidth DRAM technologies. Such memories present eight or more DRAM channels, 128-bit wide data, at 1-2 Gbps (128-256 Gbps/channel). Hoplite NOC configurations, such as demonstrated in this exemplary computing system, efficiently enable a core, from anywhere on the FPGA die, to access any DRAM data on any DRAM channel, at full memory bandwidth. It is believed that no conventional systems or networking technologies or architectures can provide this capability.

To illustrate an example reduction to practice of an embodiment of the above-described system, FIGS. 13A-13D are diagrams of four die plots that illustrate different aspects of the physical implementation and floor planning of such a system and its NOC.

Figure 13A:
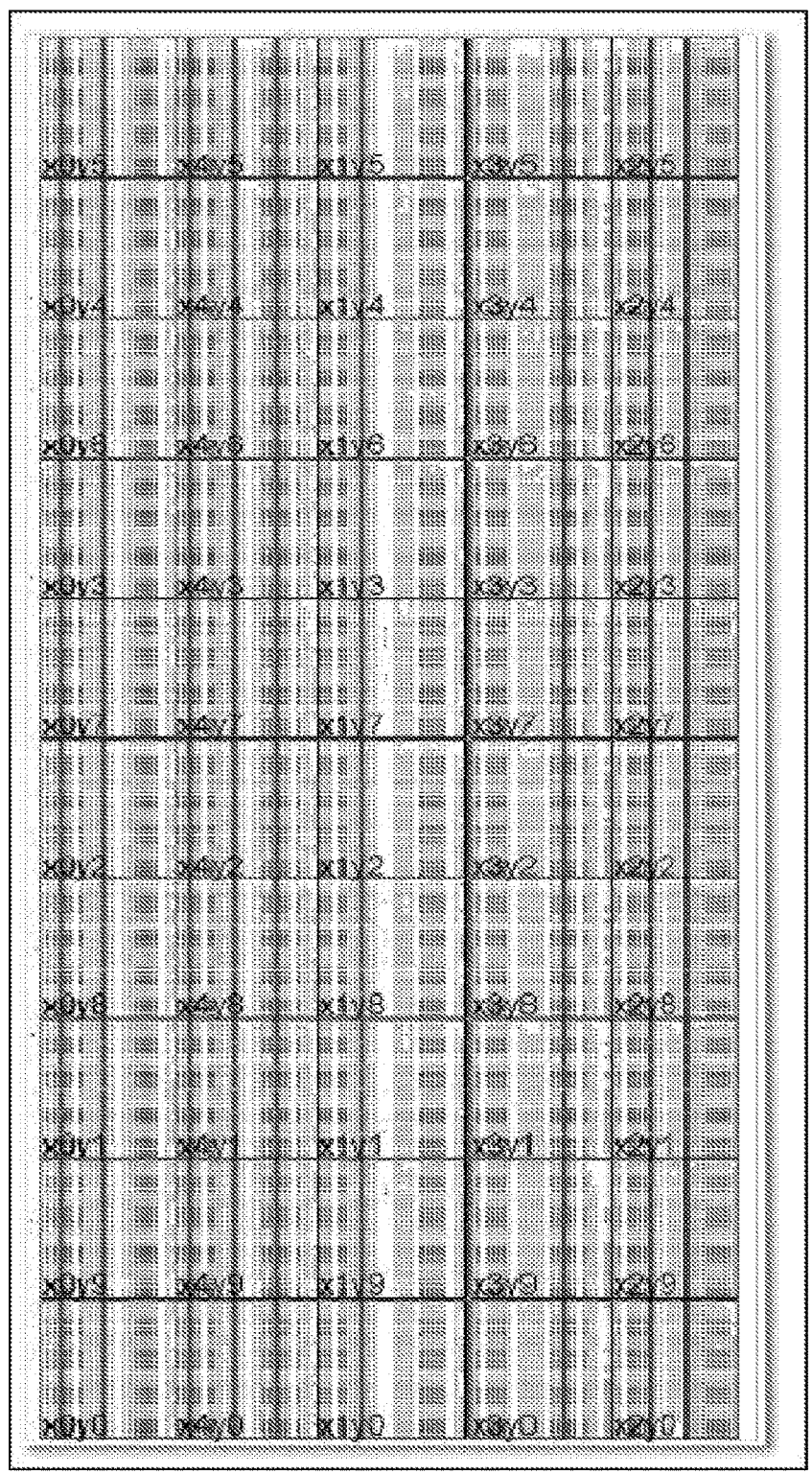

FIG. 13A is a diagram of the FPGA SOC overall, according to an embodiment. FIG. 13A overlays a view of the logical subdivision of the FPGA into 50 clusters, labeled x0y0, x1y0, etc. up to x4y9, atop the placement of all logic in the system. The darker sites are placed soft-processor cores 1220 (FIG. 12) (400 in all) and their block RAM memories (IRAMs 1222 and CRAMs 1230 of FIG. 12).

Figure 13B:
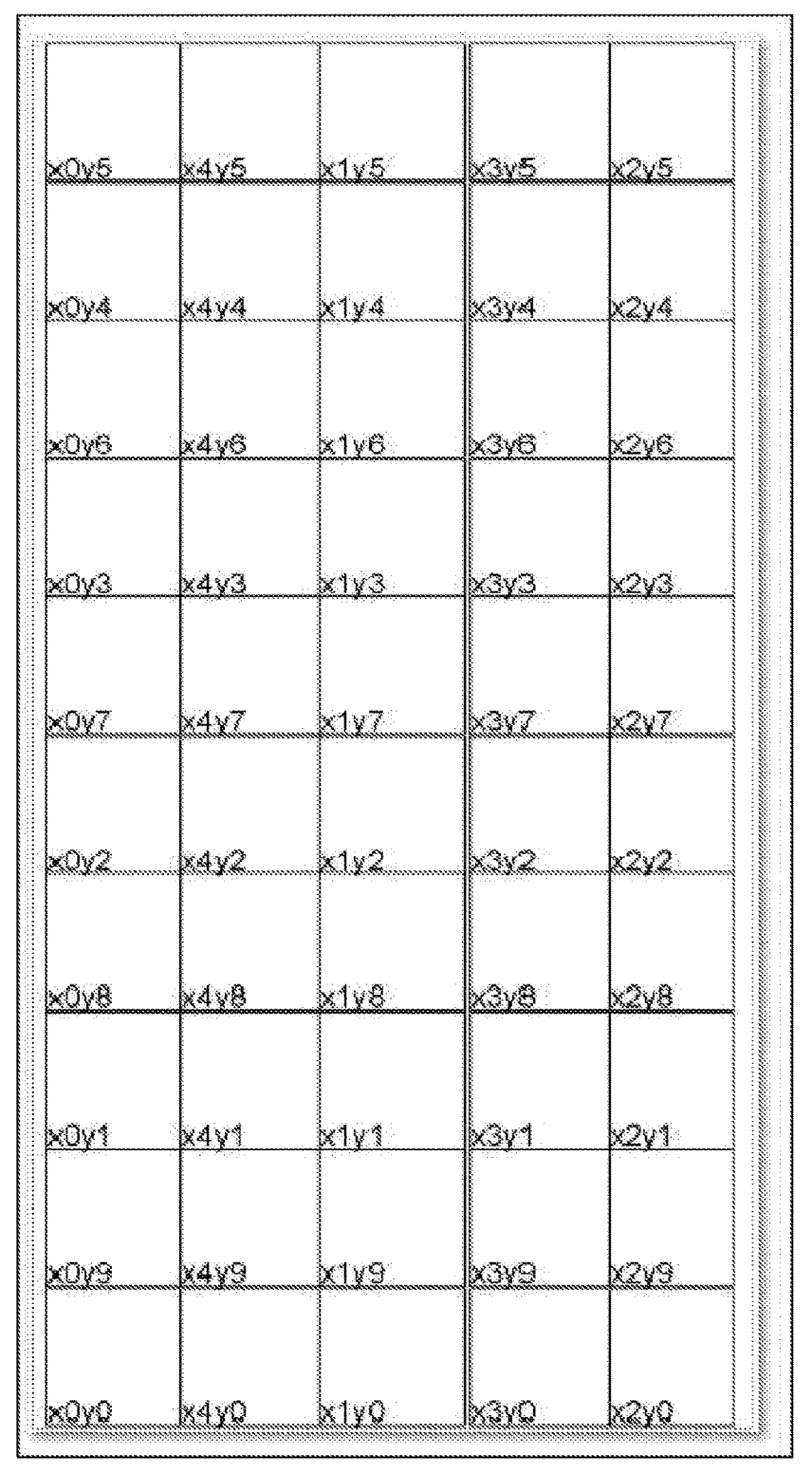

FIG. 13B is a diagram of the high-level floorplan of the tiles that lay out the router+cluster tiles in a folded 2D torus, according to an embodiment. The physically folded (interleaved) arrangement of routers and router addressing (e.g., x0y0, x4y0, x1y0, x3y0, x2y0) reduces the number of, or eliminates, long, slow, die-spanning router nets (wires) in the design.

Figure 13C:
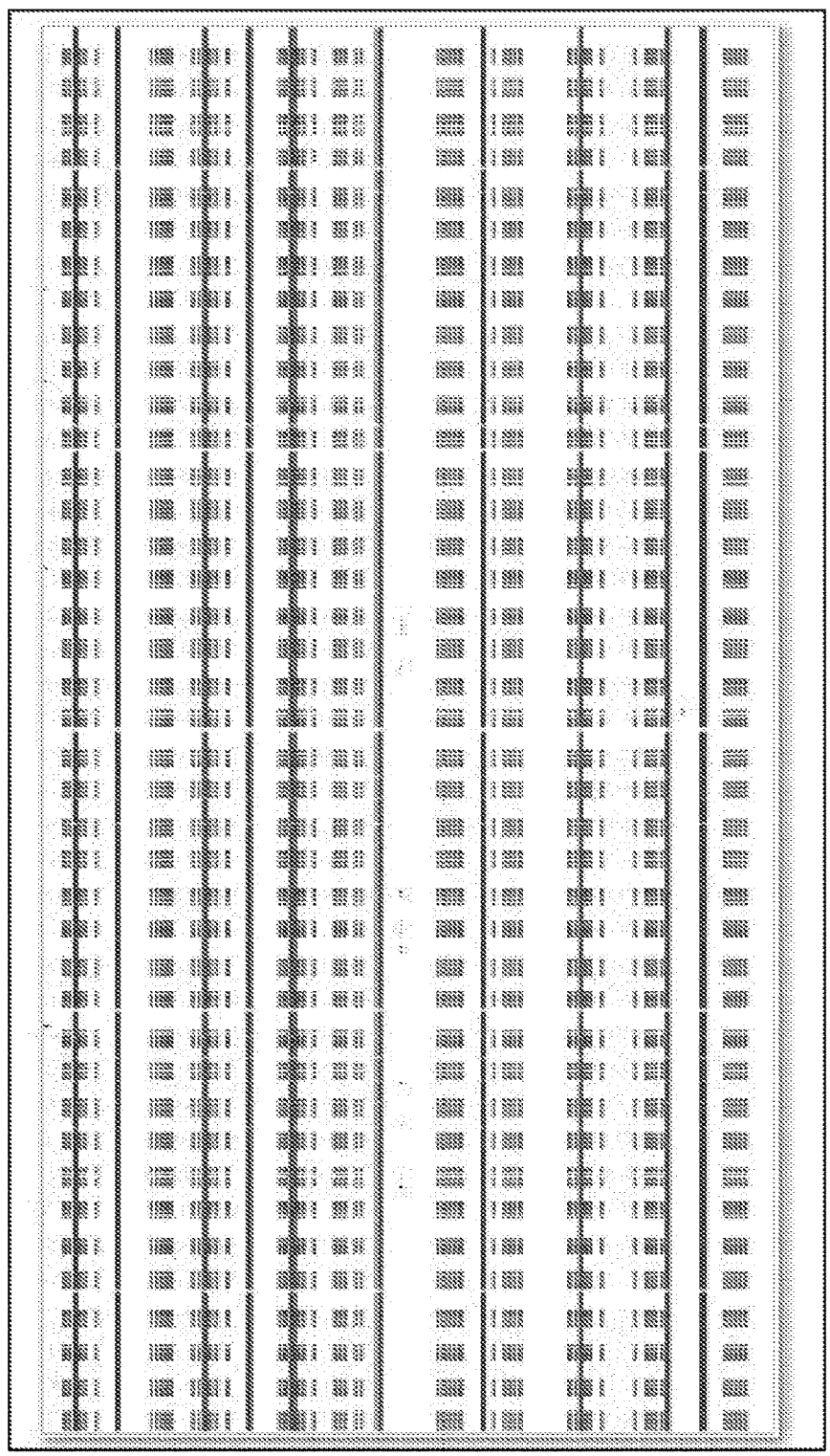

FIG. 13C is a diagram of the explicitly placed floor-planned elements of the design, according to an embodiment. This system comprises 400 copies of the 'relationally placed macro' of the soft processor 1220 (FIG. 12)—in FIG. 13C, each four-row-by-five-column arrangement of dots (which represent FPGA 'slices' comprising eight 6-LUTs) corresponds to one processor's 32-bit RISC data path. There are total of 40 rows by 10 columns of processors 1220. These processors 1220, in turn, are organized into clusters of four rows of two columns of processors. In addition, the vertical black stripes in FIG. 13C correspond to 600 explicitly placed block RAM memories that implement instruction and data memories (1222 and 1230 of FIG. 12) within each of the 50 clusters, each with 12 BRAMs (4 IRAMs, 8 for cluster data RAM).

Figure 13D:
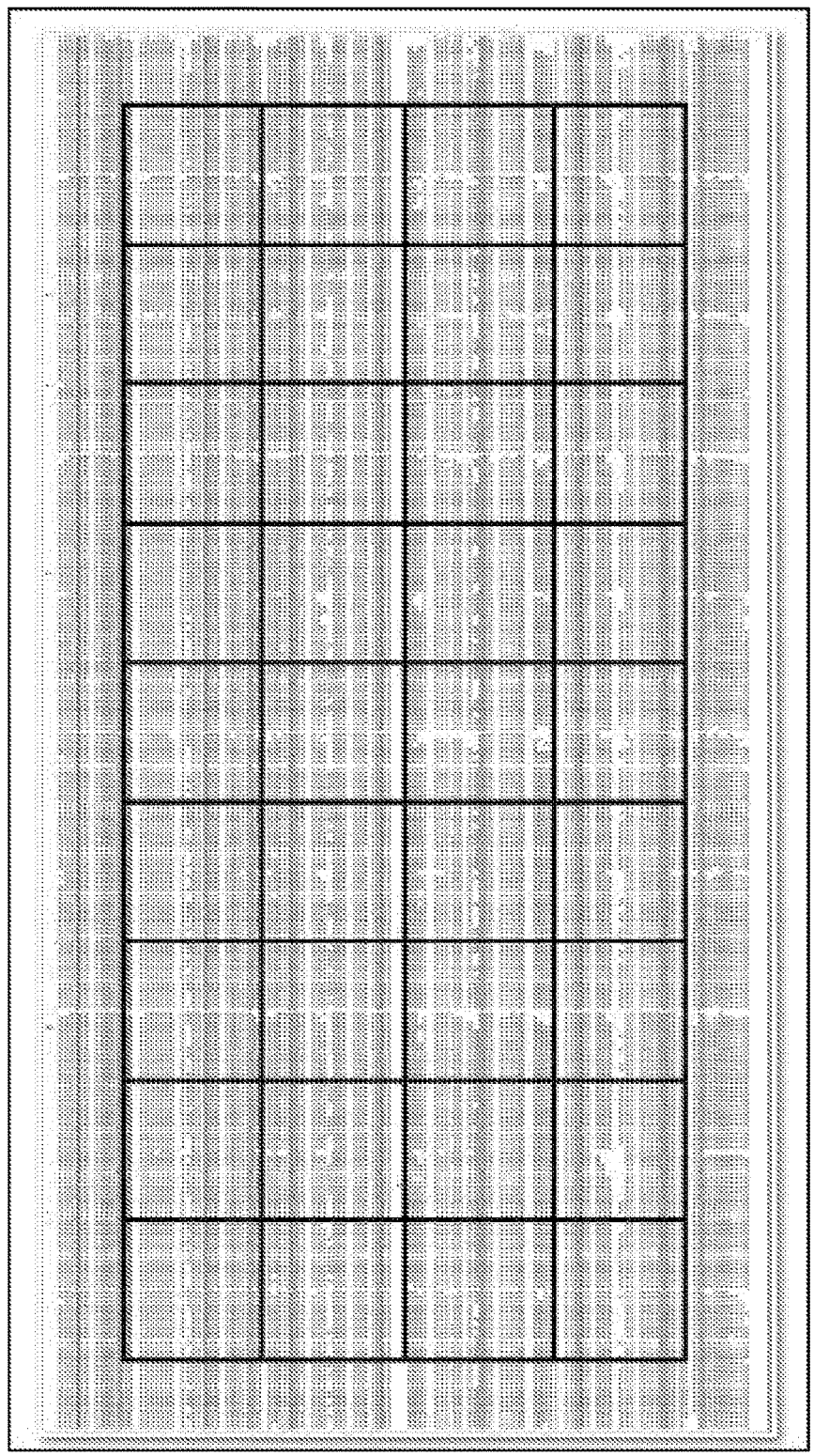

FIG. 13D is a diagram of the logical layout of the NOC that interconnects the clusters 1210 (FIG. 12). Each thick black line corresponds to approximately 300 nets (wires) in either direction between routers in X and Y rings. Note that the NOC is folded per FIGS. 13A and 13B so, for example, the nets from the x0y0 tile to the x1y0 tile pass across the x4y0 tile.

FIG. 14 is a diagram of an FPGA 1410 coupled to a configuration-firmware memory 1423, according to an embodiment. FIG. 14 illustrates that a disclosed router, NOC, or system design, after processing by FPGA implementation tools, is manifest in an FPGA configuration bitstream file; the file is stored in a configuration FLASH memory or similar computer readable medium; the configuration bitstream is conveyed to the FPGA, via its configuration port, and then to its configuration system, in order to load the bitstream file internally and to configure the device's myriad programmable logic elements and interconnect fabric, in order that the FPGA circuitry is configured as the disclosed router, NOC, or system.

In an embodiment, the disclosed router, NOC, client cores, or system may be implemented in an FPGA. FPGA devices provide diverse programmable, and often reprogrammable (i.e., reconfigurable), logic resources, including lookup tables, memories, embedded function blocks, and the programmable interconnect fabric (i.e. the "programmable wiring" resources) that interconnects these resources. To implement a specific circuit or function, such as the disclosed routers, NOC, or system, an FPGA is configured by means of a configuration circuit. The configuration circuit loads a data file known as a configuration bitstream. A configuration bitstream is a special kind of firmware for FPGAs that determines the settings of the millions of configuration cells in the device. Each configuration cell controls some aspect of the programmable logic device. Some configuration cells form the truth tables of the FPGA's lookup table programmable logic gates. Some configuration cells control the pass gates and multiplexer select lines that form the programmable interconnect fabric to selectively route one gate's output to the specific inputs of specific other gates. The remarkable flexibility and extent of configurability of a modern FPGA is manifest in the enormous quantity of configuration data present in a configuration bitstream file. For example, a Xilinx UltraScale VU440 device configuration bitstream file is over one billion bits long. Without a configuration bitstream that establishes the logic gates and the programmable wiring that that interconnects the gates, to program the clock distribution, to set up the embedded memories, and so forth, an FPGA implements no circuit at all, is inert and useless.

Most FPGA devices employ CMOS memory cells for configuration cells. This memory is volatile; should the FPGA ever be powered down, its configuration memory is lost and, just as with a conventional computer, upon power up the configuration bitstream file is then reloaded from another source, often a non-volatile memory device, such as a FLASH memory chip. Other FPGA devices may employ non-volatile configuration cells, for example, flash memory cells, so that once they are initially programmed with a configuration, the configuration is retained across power cycles. Even in these devices, though, a configuration bitstream file is loaded or downloaded at least once to implement the specific desired logic design or system.

As illustrated in FIG. 14, a system 1400 comprises an FPGA 1410, a flash device within which is stored the FPGA's configuration bitstream file, and various external device and interfaces such as Ethernet networks, DRAM memory, and PCI Express hosts. At power up, the FPGA is unconfigured and cannot yet perform a useful function. Using its config port 1420 the FPGA 1410 loads, bit by bit, byte by byte, the configuration bitstream file data from the configuration bitstream flash memory 1424 over the configuration signals bus 1422, into the FPGA's configuration port 1420. A circuit on the FPGA 1410 loads the bitstream, optionally checks it for validity, optionally decrypts it, and loads it bit by bit into the configuration cells across the FPGA. When the entire configuration bitstream has been loaded and the FPGA's configuration cells have been initialized, then the FPGA 1410 "wakes up" configured as the disclosed router, NOC, or system.

Using a NOC to Interconnect a Plethora of Different Client Cores

Metcalfe's Law states that the value of a telecommunications network is proportional to the square of the number of connected users of the system. Similarly the value of a NOC and the FPGA that implements it is a function of the number and diversity of types of NOC client cores. With this principle in mind, the design philosophy and prime aspiration of the NOC disclosed herein is to "efficiently connect everything to everything."

Without limitation, many types of client cores may be connected to a NOC. Referring to FIG. 11 and FIG. 12, in general there are regular (on-chip) client cores 1210, for example a hardened (non-programmable logic) processing subsystem, a soft processor 1220, an on-chip memory 1222 and 1230, or even a multiprocessor cluster 1210; and there are external-interface client cores, such as network interface controller (NIC) 1140, PCI-express interface 1142, DRAM channel interface 1144, and HBM channel interface 1146, which serve to connect the FPGA to an external interface or device. When these external-interface cores are clients of a NOC, they efficiently enable an external device to communicate with any other client of the NOC, on-chip or external, and vice versa. This section of the disclosure describes how a diversity of on-chip and external devices may be connected to an NOC and its other client cores.

One key class of external devices to interface to an FPGA NOC is a memory device. In general, a memory device may be volatile, such as static RAM (SRAM) or dynamic RAM (DRAM), including double data rate (DDR) DRAM, graphics double data rate (GDDR), quad data rate (QDR) DRAM, reduced latency DRAM (RLDRAM), Hybrid Memory Cube (HMC), WideIO DRAM, and High Bandwidth Memory (HBM) DRAM. Or a memory may be non-volatile, such as ROM, FLASH, phase-change memory, or 3DXPoint memory. Usually there is one memory channel per device or bank of devices (e.g. a DRAM DIMM memory module), but emerging memory interfaces such as HMC and HBM provide many high-bandwidth channels per device. For example, a single HBM device (die stack) provides eight channels of 128 signals at a signaling rate of 1-2 Gbps/signal.

FPGA vendor libraries and tools provide external-memory-channel-controller interface cores. To interconnect such a client core to a NOC, i.e., to interconnect the client to a router's message input port and a message output port, one can use a bridge circuit to accept memory transaction requests (e.g., load, or store, a block of bytes) from other NOC clients and present them to the DRAM channel controller, and vice versa, to accept responses from the memory channel controller, format them as NOC messages, and send them via the router to other NOC clients.

The exemplary parallel packet-processing system disclosed herein describes a NOC client that may send a DRAM store message to a DRAM controller client core to store one byte or many bytes to a particular address in RAM, or may send a DRAM load request message to cause the DRAM channel client to perform a read transaction on the DRAM, then transmit back over the NOC the resulting data to the target (cluster, processor) identified in the request message.

As another example, the exemplary FPGA SOC described above in conjunction with FIG. 1 shows how a DRAM controller client may receive a command message from a PCI-express controller client core to read a block of memory and then, in response, transmit the read bytes of data over the NOC, not back to the initiating PCI express controller client core, but rather to an Ethernet NIC client core, to transmit it as a packet on some external Ethernet network.

An embodiment of the area-efficient NOC disclosed herein makes possible a system that allows any client core at any site in the FPGA, connected to some router, to access any external memory via any memory-channel-controller-client core. To fully utilize the potential bandwidth of an external memory, one may implement a very wide and very fast NOC. For example, a 64-bit DDR4 2400 interface can transmit or receive data at up to 64-bits times 2.4 GHz=approximately 150 Gbps. A Hoplite NOC of channel width w=576 bits (512 bits of data and 64 bits of address and control) running at 333 MHz can carry up to 170 Gbps of data per link. In an FPGA with a pipelined interconnect fabric such as Altera HyperFlex, a 288-bit NOC of 288-bit routers running at 667 MHz also suffices.

In some embodiments, multiple banks of DRAM devices interconnected to the FPGA by multiple DRAM channels are employed to provide the FPGA SOC with the necessary bandwidth to meet workload-performance requirements. Although it is possible for the multiple external DRAM channels to be aggregated into a single DRAM controller client core, coupled to one router on the NOC, this may not provide the other client cores on the NOC with full-bandwidth access to the multiple DRAM channels. Instead, an embodiment provides each external DRAM channel with its own full-bandwidth DRAM channel-controller client core, each coupled to a separate NOC router, affording highly concurrent and full-bandwidth ingress and egress of DRAM request messages between the DRAM controller client cores and other clients of the NOC.

In some use cases, different memory-request NOC messages may use different minimum-bit-width messages. For example, in the exemplary parallel packet processing FPGA SOC described above in conjunction with FIGS. 11 and 12, a processor in a multiprocessor/accelerator cluster client core sends a DRAM store message to transfer 32 bytes from its cluster RAM to a DRAM channel-controller-interface client core. A 300 bit message (256 bits of data, 32 bits of address, control) suffices to carry the command and data to the DRAM channel controller. In contrast, to perform a memory read transaction, the processor sends a DRAM load-request message to the DRAM channel controller. Here a 64-bit message suffices to carry the address of the memory to be read from the DRAM, and the target address, within its cluster memory, receives the memory read. When this message is received and processed at a DRAM channel-controller client core, and the data read from DRAM, the DRAM channel controller sends a DRAM load-response message, where again a 300-bit message suffices. In this scenario, with some 300-bit messages and some 64-bit messages, the shorter messages may use a 300-bit-wide NOC by padding the message with 0 bits, by box-car'ing several such requests into one message, or by using other conventional techniques.

Alternatively, in other embodiments of the system, a system designer may elect to implement an SOC's DRAM memory system by instantiating in the design two parallel NOCs, a 300-bit-wide NOC and a 64-bit-wide NOC, one to carry messages with a 32 byte data payload, and the second to carry messages without such a data payload. Since the area of a Hoplite router is proportional to the bit width of its switch data path, a system with a 300-bit NOC and an additional 64-bit NOC requires less than 25% more FPGA resources than a system with one 300-bit NOC alone.

In this dual-NOC example, a client core 1210 that issues DRAM-load messages is a client of both NOCs. That is, the client core 1210 is coupled to a first, 300-bit-message NOC router and is also coupled to a second, 64-bit-message NOC router. An advantage of this arrangement of clients and routers is that the shorter DRAM-load-request messages may traverse their own NOC, separately, and without contending with, DRAM-store and DRAM-load-response messages that traverse their NOC. As a result, a greater total number of DRAM transaction messages may be in flight across the two NOCs at the same time, and therefore a higher total bandwidth of DRAM traffic may be served for a given area of FPGA resources and for a given expenditure of energy.

In general, the use of multiple NOCs in a system, and the selective coupling of certain client cores to certain routers of multiple NOCs, can be an advantageous arrangement and embodiment of the disclosed routers and NOCs. In contrast, in much less efficient conventional NOC systems, the enormous FPGA resources and energy consumed by each NOC makes it impractical to instantiate multiple parallel NOCs in a system.

To best interface an FPGA SOC (and its many constituent client cores) to a High Bandwidth Memory DRAM device, which provides eight channels of 128-bit data at 1-2 GHz, a system design may use, for example, without limitation, eight HBM channel-controller-interface-client cores, coupled to eight NOC router cores. A NOC with 128-Gbps links suffices to carry full-bandwidth memory traffic to and from HBM channels of 128 bits operating at 1 GHz.

Another type of die-stacked, high-bandwidth DRAM memory is Hybrid Memory Cube. Unlike HBM, which employs a very wide parallel interface, HMC links, which operate at speeds of 15 Gbps/pin, use multiple high-speed serial links over fewer pins. An FPGA interface to an HMC device, therefore, uses multiple serdes (serial/deserializer blocks) to transmit data to and from the HMC device, according to an embodiment. Despite this signaling difference, considerations of how to best couple the many client cores in an FPGA SOC to a HMC device, via a NOC, are quite similar to the embodiment of the HBM system described above. The HMC device is logically accessed as numerous high-speed channels, each typically of 64 bits wide. Each such channel might employ an HBM channel-controller-interface client core to couple that channel's data into the NOC to make the remarkable total memory bandwidth of the HMC device accessible to the many client cores arrayed on the NOC.

A second category of external-memory device, nonvolatile memory (NVM), including FLASH and next generation 3D XPoint memory, generally runs memory-channel interfaces at lower bandwidths. This may afford the use of a less-resource-intensive NOC configured with lower-bandwidth links, according to an embodiment. A narrower NOC comprising narrower links and correspondingly smaller routers, e.g., w=64 bits wide, may suffice.

Alternatively, a system may comprise an external NVM memory system comprising a great many NVM devices, e.g., a FLASH memory array, or a 3D XPoint memory array, packaged in a DIMM module and configured to present a DDR4-DRAM-compatible electrical interface. By aggregating multiple NVM devices together, high-bandwidth transfers to the devices may be achieved. In this case, the use of a high bandwidth NVM-channel-controller client core and a relatively higher-bandwidth NOC and NOC routers can provide the NOC's client cores full-bandwidth access to the NVM memory system, according to an embodiment.

In a similar manner, other memory devices and memory systems (i.e., compositions and arrangements of memory devices), may be interfaced to the FPGA NOC and its other clients via one or more external-memory-interface client cores, according to an embodiment.

Another category of important external interfaces for a modern FPGA SOC is a networking interface. Modern FPGAs directly support 10/100/1000 Mbps Ethernet and may be configured to support 10G/25G/40G/100G/400G bps Ethernet, as well as other external-interconnection-network standards and systems including, without limitation, Interlaken, RapidIO, and InfiniBand.

Networking systems are described using OSI reference-model layers, e.g., application/presentation/session/transport/network/data link/physical (PHY) layers. Most systems implement the lower two or three layers of the network stack in hardware. In certain network-interface controllers, accelerators, and packet processors, higher layers of the network stack are also implemented in hardware (including programmable logic hardware). For example, a TCP Offload Engine is a system to offload processing of the TCP/IP stack in hardware, at the network interface controller (NIC), instead of doing the TCP housekeeping of connection establishment, packet acknowledgement, check summing, and so forth, in software, which can be too slow to keep up with very-high-speed (e.g., 10 Gbps or faster) networks.

Within the data-link layer of an Ethernet/IEEE 802.3 system is a MAC (media-access-control circuit). The MAC is responsible for Ethernet framing and control. It is coupled to a physical interface (PHY) circuit. In some FPGA systems, for some network interfaces, the PHY is implemented in the FPGA itself. In other systems, the FPGA is coupled to a modular transceiver module, such as SFP+ format, which, depending upon the choice of module, transmits and receives data according to some electrical or optical interface standard, such as BASE-R (optical fiber) or BASE-KR (copper backplane).

Network traffic is transmitted in packets. Incoming data arrives at a MAC from its PHY and is framed into packets by the MAC. The MAC presents this framed packet data in a stream, to a user logic core, typically adjacent to the MAC on the programmable logic die.

In a system comprising the disclosed NOC, by use of an external-network-interface-controller (NIC) client core coupled to a NOC router, other NOC client cores located anywhere on the device, may transmit (or receive) network packets as one or more messages sent to (received from) the NIC client core, according to an embodiment.

Ethernet packets come in various sizes—most Ethernet frames are 64-1536 bytes long. Accordingly, to transmit packets over the NOC, it is beneficial to segment a packet into a series of one or more NOC messages. For example, a large 1536-Byte Ethernet frame traversing a 256-bit-wide NOC could require 48 256-bit messages to be conveyed from a NIC client core to another NOC client core or vice versa. Upon receipt of a packet (composed of messages), depending upon the packet-processing function of a client core, the client may buffer the packet in in-chip or external memory for subsequent processing, or it may inspect or transform the packet, and subsequently either discard it or immediately retransmit it (as another stream of messages) to another client core, which may be another NIC client core if the resulting packet should be transmitted externally.

To implement an embodiment of a Hoplite router NOC for interfacing to NIC client cores that transmit a network packet as a series of NOC messages, a designer can configure the Hoplite NOC routers for in-order delivery. An embodiment of the basic Hoplite router implementation, disclosed previously herein, does not guarantee that a sequence of messages M1, M2, sent from client core C1 to client core C2, will arrive in the order that the messages were sent. For example, upon sending messages M1 and M2 from client C11 at router (1,1) to client C33 at router (3,3), it may be that when message M1 arrives on the X-message input at intermediate router (3,1) via the X ring [y=1], and attempts to route to next to the router (3,2) on the Y ring [x=3], at that same moment a higher-priority input on router (3,1)'s YI input is allocated the router's Y output. Message M1, therefore, deflects to router (3,1)'s X output, and traverses the X ring [y=1] to return to router (3,1) and to reattempt egress on the router's Y output port. Meanwhile, the message M2 arrives at router (3,1) and later arrives at router (3,3) and is delivered to the client (3,3), which is coupled to the router (3,3). Message M1 then returns to router (3,1), is output on this router's Y-message output port, and is delivered to the client (3.3) of router (3,3). Therefore, the messages were sent in the order M1 then M2, but were received in the reverse order M2 then M1. For some use cases and workloads, out-of-order delivery of messages is fine. But for the present use case of delivering a network packet as a series of messages, it may be burdensome for clients to cope with out-of-order messages because a client is forced to first "reassemble" the packet before it can start to process the packet.

Therefore, in an embodiment, a Hoplite router, which has a configurable routing function, may be configured with a routing function that ensures in-order delivery of a series of messages between any specific source router and destination router. In an embodiment, this configuration option may also be combined with the multicast option, to also ensure in-order multicast delivery. In an embodiment, the router is not configurable, but it nevertheless is configured to implement in-order delivery.

There are various methods to implement in-order message delivery. An embodiment adds to the basic router, which is stateless, a small table or memory, called DEFLECT, which remembers that some message was recently deflected away from its preferred output port by the router. There are a variety of possible embodiments of a deflect table with different area/performance tradeoffs. One of the simplest is a single bit, which is set when a message, whose x coordinate corresponds to the router's x coordinate, was unable to be output on the router's Y-message output due to output-port contention, and was deflected around the X ring. Another embodiment of such a table is a one-bit-wide RAM that is indexed by the destination y coordinate of the message on the X input. If deflect[X.y] is set, it means some prior message with destination (x,y) has deflected and, therefore, the present message, if destined for (x,y), is also forced to deflect (or else it would arrive at its destination ahead of the prior-deflected message). Another embodiment of the deflect table is a one-bit-wide RAM that is indexed by the source x coordinate of the message on the X input. (In this case, the NOC generator or designer adds the source's x coordinate to the message payload so it is available to the current router's routing function.) In this embodiment, deflect[X.src.x] is set if and only if some message from the router at (X.src.x,X.src.y) has deflected and, therefore, the present message, if it shares the same router source x coordinate, and is destined for (x,*), is also forced to deflect to ensure messages destined for (x,y) arrive in order. Another embodiment of the deflect table is a two-dimensional, one-bit-wide RAM indexed by the message's source x coordinate and destination y coordinate. In this embodiment, deflect[X.src.x][X.y] is set when some prior message from the specific source router to the specific destination (x,y) has deflected, such that another, subsequent, message from the same source to the same destination is also forced to deflect.

In an embodiment, there is also a mechanism to reset entries in a router's deflect table. In an embodiment, this mechanism is a delay structure such as a shift register, local to the router, called UNDEFLECT, with delay (or depth) approximately equal to the diameter (i.e., dimension) of the router's X ring, that records which deflect-table entries, if any, have recently been set. In an embodiment, a single bit of state per X-ring diameter suffices. Each time a router routes input messages i.e., as often as every clock cycle, the oldest bit is removed from UNDEFLECT. This bit corresponds to the router's current X input message, to destination (x,y), which, if it deflected previously, has now looped around the entire X ring, and is about to reattempt routing onto the router's Y-output message port. The corresponding entry in the deflect table is reset. This affords the current X-input message an opportunity to route to the Y-message output as desired. If, once again due to Y-output-port contention, the X-input message is forced to deflect, once again the corresponding entry in the deflect table is set, a new '1' bit is added to the undeflect structure, and once again other messages that may be destined for the message's destination will also deflect, ensuring in-order delivery of messages that eventually route to the destination router's Y ring. In another embodiment, the undeflect state is not kept at each router, but rather is added to the X-ring message data, or otherwise travels along with the X-ring message. When the message loops around, it is accompanied by its undeflect flag, and once again the old deflect-table entry may be cleared accordingly. Alternative embodiments of the deflect and undeflect mechanisms are contemplated.

Using an embodiment of the disclosed in-order message-delivery method, it is straightforward to couple various NIC client cores 1140 (FIG. 11) to a NOC, according to an embodiment. A message format is selected to carry the packet data as a series of messages. In an embodiment, a message may include a source-router-ID field or source-router (x,y) coordinates. In an embodiment, a message may include a message-sequence-number field. In an embodiment, these fields may be used by the destination client to reassemble the incoming messages into the image of a packet. In an embodiment, the destination client processes the packet as it arrives, message by message, from a NIC client 1140. In an embodiment, packet flows and, hence, message flows, are scheduled so that a destination client may assume that all incoming messages are from one client at a time, e.g., it is not necessary to reassemble incoming messages into two or more packets simultaneously.

Many different external-network-interface core clients may be coupled to the NOC. A NIC client 1140 may comprise a simple PHY, a MAC, or a higher-level network-protocol implementation such as a TCP Offload Engine. In an embodiment, the PHY may be implemented in the FPGA, in an external IC, or may be provided in a transceiver module, which may use electrical or optical signaling. In general, the NOC router and link widths can be configured to support full-bandwidth operation of the NOC for the anticipated workload. For 1 Gbps Ethernet, almost any width and frequency NOC will suffice, whereas for 100 Gbps Ethernet, a 64-Byte packet arrives at a NIC approximately every 6 ns; therefore, to achieve 100 Gbps bandwidth on the NOC, wide, fast routers and links, comparable to those disclosed earlier for carrying high-bandwidth DRAM messages. For example, a 256-bit-wide NOC operating at 400 MHz, or a 512-bit-wide NOC operating at 200 MHz, is sufficient to carry 100 Gbps Ethernet packets at full bandwidth between client cores.

An embodiment of an FPGA system on a chip comprises a single external network interface, and, hence, a single NIC client core on the NOC. Another embodiment may use multiple interfaces of multiple types. In an embodiment, a single NOC is adequate to interconnect these external-network-interface client cores to the other client cores on the NOC. In an embodiment, NIC client cores 1140 may be connected to a dedicated high-bandwidth NOC for 'data-plane' packet routing, and to a secondary lower-bandwidth NOC for less-frequent, less-demanding 'control-plane' message routing.

Besides the various Ethernet network interfaces, implementations, and data rates described herein, many other networking and network-fabric technologies, such as RapidIO, InfiniBand, FibreChannel, and Omni-Path fabrics, each benefit from interconnection with other client cores over a NOC, using the respective interface-specific NIC client core 1140, and coupling the NIC client core to its NOC router. Once an external-network-interface client core is added to the NOC, it may begin to participate in messaging patterns such as maximum-bandwidth direct transfers from NIC to NIC, or NIC to DRAM, or vice versa, without requiring intervening processing by a (relatively glacially slow) processor core and without disturbing a processor's memory hierarchy.

In an embodiment, a NOC may also serve as network switch fabric for a set of NIC client cores. FIG. 9B, which is described above, illustrates that arbitrary traffic from one NIC-client output to another NIC-client input may be switched at high bandwidth using a NOC on which every NIC is a client. In an embodiment, only some of the routers on the NOC have NIC client cores; other routers may have no client inputs or outputs. In an embodiment, these "no-input" routers can use the advantageous half-cost NOC router-switch circuit and technology-mapping efficiencies described above in conjunction with FIG. 5C and disclosed elsewhere herein. In an embodiment that implements multicast fanout of switched packets, the underlying NOC routers may also be configured to implement multicast routing, so that as an incoming packet is segmented by its NIC client core into a stream of messages, and these messages are sent into the NOC, the message stream is multicast to all, or to a subset, of the other NIC client cores on the NOC for output upon multiple external-network interfaces.

Another important external interface to couple to the NOC is the PCI Express (PCIe) interface. PCIe is a high-speed, serial, computer-expansion bus that is widely used to interconnect CPUs, storage devices, solid-state disks, FLASH storage arrays, graphics-display devices, accelerated network-interface controllers, and diverse other peripherals and functions.

Modern FPGAs comprise one or more PCIe endpoint blocks. In an embodiment, a PCIe master or slave endpoint is implemented in an FPGA by configuring an FPGA's PCIe endpoint block and configuring programmable logic to implement a PCIe controller. In an embodiment, programmable logic also implements a PCIe DMA controller so that an application in the FPGA may issue PCIe DMA transfers to transfer data from the FPGA to a host or vice-versa.

In an embodiment, an FPGA PCIe controller, or a PCIe DMA controller, may be coupled to a NOC by means of a PCIe interface client core, which comprises a PCIe controller and logic for interfacing to a NOC router. A PCIe interface client core enables advantageous system use cases. In an embodiment, any client core on the NOC may access the PCIe interface client core, via the NOC, by sending NOC messages that encapsulate PCI Express read and write transactions. Therefore, recalling the prior exemplary network-packet-processing system described above in conjunction with FIGS. 11 and 12, if so configured, any of the 400 cores or the accelerators in the clustered multiprocessor might access memory in a host computer by preparing and sending a PCI Express transaction request message to a PCI Express interface client core via the NOC. The latter core receives the PCI Express transaction-request message and issues it into the PCI express message fabric via its PCI Express endpoint and PCIe serdes PHY. Similarly, in an embodiment, any on-chip embedded memory or any external memory devices attached to the FPGA may be remotely accessed by a PCIe-connected host computer or by another PCIe agent. In this example, the PCIe interface client core receives the local-memory access request from its PCIe endpoint, formats and sends a cluster memory read- or write-request message that is routed by the NOC to a specific multiprocessor cluster client, whose router address on the NOC is specified by certain bits in the read- or write-request message.

In an embodiment, in addition to facilitating remote single-word read or write transactions, external hosts and on-die client cores may utilize a PCIe DMA (direct memory access) engine capability of a PCIe interface client core to perform block transfers of data from host memory, into the PCIe interface client, and then sent via the NOC to a specific client core's local memory. In an embodiment, the reverse is also supported—transferring a block of data from a specific client core's memory, or vice-versa, from the memory of a specific client core on the NOC, to the PCIe interface client core, and then as a set of PCIe transaction messages, to a memory region on a host or other PCIe-interconnected device.

Recalling, as described above, that a NOC may also serve as network switch fabric for a set of NIC client cores, in the same manner, in an embodiment, a NOC may also serve as a PCIe switch fabric for a set of PCIe client cores. As external PCIe transaction messages reach a PCIe interface client core, they are encapsulated as NOC messages and sent via the NOC to a second PCIe interface client core, and then are transmitted externally as PCIe transaction messages to a second PCIe attached device. As with the network switch fabric, in an embodiment a PCIe switch fabric may also take advantage of NOC multicast routing to achieve multicast delivery of PCIe transaction messages.

Another important external interface in computing devices is SATA (serial advanced technology attachment), which is the interface by which most storage devices, including hard disks, tapes, optical storage, and solid-state disks (SSDs), interface to computers. Compared to DRAM channels and 100 Gbps Ethernet, the 3/6/16 Gbps signaling rates of modern SATA are easily carried on relatively narrow Hoplite NOC routers and links. In an embodiment, SATA interfaces may be implemented in FPGAs by combining a programmable-logic SATA controller core and an FPGA serdes block. Accordingly, in an embodiment, a SATA interface Hoplite client core comprises the aforementioned SATA controller core, serdes, and a Hoplite router interface. A NOC client core sends storage-transfer-request messages to the SATA interface client core, or in an embodiment, may copy a block of memory to be written or a block of memory to be read, to/from a SATA interface client core as a stream of NOC messages.

Besides connecting client cores to specific external interfaces, a NOC can provide an efficient way for diverse client cores to interconnect to, and exchange data with, a second interconnection network. Here are a few non-limiting examples. In an embodiment, for performance scalability reasons, a very large system may comprise a hierarchical system of interconnects such as a plurality of secondary interconnection networks that themselves comprise, and are interconnected by, a NOC into an integrated system. In an embodiment, these hierarchical NOCs routers may be addressed using 3D or higher-dimensional coordinates, e.g., router (x,y,i,j) is the (i,j) router in the secondary NOC found on the global NOC at global NOC router (x,y). In an embodiment, a system may be partitioned into separate interconnection networks for network management or security considerations, and then interconnected, via a NOC, with message filtering between separate networks. In an embodiment, a large system design may not physically fit into a particular FPGA, and, therefore, is partitioned across two or more FPGAs. In this example, each FPGA comprises its own NOC and client cores, and there is a need for some way to bridge sent messages so that clients on one NOC may conveniently communicate with clients on a second NOC. In an embodiment, the two NOCs in two different devices are bridged; in another embodiment, the NOCs segments are logically and topologically one NOC, with message rings extending between FPGA devices and messages circulating between FPGAs using parallel, high-speed I/O signaling, now available in modern FPGAs, such as Xilinx RXTX-BITSLICE IOBs. In an embodiment, a NOC may provide a high-bandwidth "superhighway" between client cores, and the NOC's client cores themselves may have constituent subcircuits interconnected by other means. A specific example of this is the multiprocessor/accelerator-compute-cluster client core diagrammed in FIG. 11 and described in the exemplary packet-processing system described herein. Referring to FIG. 12, in this example, the local interconnection network is a multistage switch network of 2:1 concentrators 1224, a 4×4 crossbar 1226, and a multi-ported cluster-shared memory 1230.

In each of these examples, clients of these varied interconnect networks may be advantageously interconnected into an integrated whole by means of treating the various subordinate interconnection networks themselves as an aggregated client core of a central Hoplite NOC. As a client core, the subordinate interconnection network comprises a NOC interface by which means it connects to a Hoplite NOC router and sends and receives messages on the NOC. In FIG. 12, the NOC interface 1240 coordinates sending of messages from CRAM 1230 or accelerator 1250 to the router 1200 on its client input 1202, and receiving of messages from the router on its Y-message output port 1204 into the CRAM 1230 or accelerator 1250, or into a specific IRAM 1222.

Now turning to the matter of interconnecting together as many internal (on-chip) resources and cores together as possible via a NOC, one of the most important classes of internal-interface client cores is a "standard-IP-interface" bridge client core. A modern FPGA SOC is typically a composition of many prebuilt and reusable "IP" (intellectual property) cores. For maximal composability and reusability, these cores generally use industry-standard peripheral interconnect interfaces such as AXI4, AXI4 Lite, AXI4-Stream, AMBA AHB, APB, CoreConnect, PLB, Avalon, and Wishbone. In order to connect these preexisting IP cores to one another and to other clients via a NOC, a "standard-IP-interface" bridge client core is used to adapt the signals and protocols of the IP interface to NOC messages and vice versa.

In some cases, a standard-IP-interface bridge client core is a close match to the NOC messaging semantics. An example is AXI4-Stream, a basic unidirectional flow-controlled streaming IP interface with ready/valid handshake signals between the master, which sends the data, and the slave, which receives the data. An AXI4-Stream bridge NOC client may accept AXI4-Stream data as a slave, format the data into a NOC message, and send the NOC message over the NOC to the destination NOC client, where (if the destination client is also an AXI4-Stream IP bridge client core) a NOC client core receives the message and provides the stream of data, acting as an AXI4-Stream master, to its slave client. In an embodiment, the NOC router's routing function is configured to deliver messages in order, as described above. In an embodiment, it may be beneficial to utilize an elastic buffer or FIFO to buffer either incoming AXI4-Stream data before it is accepted as messages on the NOC (which may occur if the NOC is heavily loaded), or to use a buffer at the NOC message output port to buffer the data until the AXI4-Stream consumer becomes ready to accept the data. In an embodiment, it is beneficial to implement flow control between source and destination clients so that (e.g., when the stream consumer negates its ready signal to hold off stream-data delivery for a relatively long period of time) the message buffer at the destination does not overflow. In an embodiment, flow control is credit based, in which case the source client "knows" how many messages may be received by the destination client before its buffer overflows. Therefore, the source client sends up to that many messages, then awaits return credit messages from the destination client, which return credit messages signal that buffered messages have been processed and more buffer space has freed up. In an embodiment, this credit return message flows over the first NOC; in another embodiment, a second NOC carries credit-return messages back to the source client. In this case, each AXI4-Stream bridge client core is a client of both NOCs.

The other AXI4 interfaces, AXI4 and AXI4-Lite, implement transactions using five logical unidirectional channels that each resemble the AXI4-Stream, with ready/valid handshake flow-controlled interfaces. The five channels are Read Address (master to slave), Read Data (slave to master), Write Address (master to slave), Write Data (master to slave), and Write Response (slave to master). An AXI4 master writes to a slave by writing write transactions to the Write Address and Write Data channels and receiving responses on the Write Response channel. A slave receives write-command data on the Write Address and Write Data channels and responds by writing on the Write Response Channel. A master performs reads from a slave by writing read-transaction data to the Read Address channel and receiving responses from the Read Response channel. A slave receives read-command data on the Read Address channel and responds by writing data to the Read Response channel.

An AXI4 master or slave bridge converts the AXI4 protocol messages into NOC messages and vice-versa. In an embodiment, each AXI4 datum received on any of its five constituent channels is sent from a master (or slave) as a separate message over the NOC from source router (master (or slave)) to destination router (slave (or master)) where, if there is a corresponding AXI slave/master bridge, the message is delivered on the corresponding AXI4 channel. In another embodiment with higher performance, each AXI4 bridge collects as much AXI4 channel data as it can in a given clock cycle from across all of its input AXI4 input channels, and sends this collected data as a single message over the NOC to the destination bridge, which unpacks it into its constituent channels. In another embodiment, a bridge client waits until it receives enough channel data to correspond to one semantic request or response message such as "write request (address, data)" or "write response" or "read request(address)" or "read response(data)," and then sends that message to the destination client. This approach may simplify the interconnection of AXI4 masters or slaves to non-AXI4 client cores elsewhere on the NOC.

Thus a NOC-intermediated AXI4 transfer from an AXI4 master to an AXI4 slave actually traverses an AXI4 master to an AXI4 slave bridge-client core to a source router through the NOC to a destination router to an AXI4 master bridge-client core to the AXI4 slave (and vice-versa for response channel messages). As in the above description of AXI4-Stream bridging, in an embodiment it may be beneficial to implement credit-based flow control between client cores.

In a similar way, other IP interfaces described herein, without limitation, may be bridged to couple clients of those IP interfaces to the NOC, and thereby to other NOC clients.

An "AXI4 Interconnect IP" core is a special kind of system core whose purpose is to interconnect the many AXI4 IP cores in a system. In an embodiment, a Hoplite NOC plus a number of AXI4 bridge-client cores may be configured to implement the role of "AXI4 Interconnect IP", and, as the number of AXI4 clients or the bandwidth requirements of clients scales up well past ten cores, this extremely efficient NOC+bridges implementation can be the highest-performance, and most resource-and-energy-efficient, way to compose the many AXI4 IP cores into an integrated system.

Another important type of internal NOC client is an embedded microprocessor. As described above, particularly in the description of the packet-processing system, an embedded processor may interact with other NOC clients via messages, to perform such functions as: read or write a byte, half word, word, double word, or quad word of memory or I/O data; read or write a block of memory; read or write a cache line; transmit a MESI cache-coherence message such as read, invalidate, or read for ownership; convey an interrupt or interprocessor interrupt; to explicitly send or receive messages as explicit software actions; to send or receive command or data messages to an accelerator core; to convey performance trace data; to stop, reset, or debug a processor; and many other kinds of information transfer amenable to delivery as messages. In an embodiment, an embedded-processor NOC client core may comprise a soft processor. In an embodiment, an embedded-processor NOC client core may comprise a hardened, full-custom "SOC" subsystem such as an ARM processor core in the Xilinx Zynq PS (processing subsystem). In an embodiment, a NOC client core may comprise a plurality of processors. In an embodiment, a NOC may interconnect a processor NOC client core and a second processor NOC client core.

In this Winter of Dennard Scaling, in this Autumn of Moore's Law, as conventional microprocessor-performance scaling ebbs, and as reducing energy per datacenter workload becomes a business imperative, there is growing interest in FPGA acceleration of datacenter workloads. The trend has led to the advantageous inclusion of FPGA accelerator cards connected to multiprocessor server sockets via PCI Express in datacenter server blades. As this trend continues, the FPGA will be coupled ever closer to the processors.

The next step towards close integration of FPGAs and server CPUs will be advanced packaging wherein the server CPU die and the FPGA die are packaged side by side via a chip-scale interconnect such as Xilinx 2.5D Stacked Silicon Integration (SSI) or Intel Embedded Multi-Die Interconnect bridge (EMIB). In this era, an FPGA NOC client is coupled via the NOC, via an "external coherent interface" bridge NOC client, and via the external coherent interface, to the cache coherent memory system of the server CPU die. The external interconnect may support cache-coherent transfers and local-memory caching across the two dies, employing technologies such as, without limitation, Intel QuickPath Interconnect or IBM/OpenPower Coherence Attach Processor Interface (CAPI). This advance will make it more efficient for NOC clients on the FPGA to communicate and interoperate with software threads running on the server processors.

The next, next step will embed FPGA fabric onto the server CPU die, or equivalently, embed server CPU cores onto the FPGA die. In this era, it is imperative to more quickly and more efficiently interconnect FPGA-programmable accelerator cores to server CPUs and other fixed-function accelerator cores on the die. In this era, the many server CPUs will be interconnected to one another and to the "uncore" (i.e., the rest of the chip excluding CPU cores and FPGA fabric cores) via an uncore-scalable interconnect fabric such as a 2D torus. The FPGA fabric resources in this SOC may be in one large contiguous region or may be segmented into smaller tiles located at various sites on the die. In this era, an embodiment of the disclosed FPGA NOC will interface to the rest of the SOC using "FPGA-NOC-to-uncore-NOC" bridge FPGA-NOC client cores. In an embodiment, FPGA NOC routers and uncore NOC routers may share the router addressing scheme so that messages from CPUs, fixed logic, or FPGA NOC client cores may simply traverse into the hard uncore NOC or the soft FPGA NOC according to the router address of the destination router. Such a tightly coupled arrangement facilitates simple, efficient, high-performance communication amongst FPGA NOC client cores, uncore NOC client cores, and the server CPUs.

Modern FPGAs comprise hundreds of embedded block RAMs, embedded fixed-point DSP blocks, and embedded floating-point DSP blocks, distributed at various sites all about the device. One FPGA system-design challenge is to efficiently access these resources from many clients at other sites in the FPGA. An FPGA NOC makes this easier.

Block RAMs are embedded static RAM blocks. Examples include 20 Kbit Altera M20Ks, 36 Kbit Xilinx Block RAMs, and 288 Kbit Xilinx Ultra RAMs. As with other memory interface NOC client cores described above, a block RAM NOC client core receives memory-load or store-request messages, performs the requested memory transaction against the block RAM, and (for load requests) sends a load-response message with the loaded data back to the requesting NOC client. In an embodiment, a block RAM controller NOC client core comprises a single block RAM. In an embodiment, a block RAM controller NOC client core comprises an array of block RAMs. In an embodiment, the data bandwidth of an access to a block RAM is not large—up to 10 bits of address and 72 bits of data at 500 MHz. In another embodiment employing block RAM arrays, the data bandwidth of the access can be arbitrarily large. For example, an array of eight 36 Kbit Xilinx block RAMs can read or write 576 bits of data per cycle, i.e., up to 288 Gbps. Therefore, an extremely wide NOC of 576 to 1024 bits may allow full utilization of the bandwidth of one or more of such arrays of eight block RAMs.

Embedded DSP blocks are fixed logic to perform fixed-point wide-word math functions such as add and multiply. Examples include the Xilinx DSP48E2 and the Altera variable-precision DSP block. An FPGA's many DSP blocks may also be accessed over the NOC via a DSP NOC client core. The latter accepts a stream of messages from its NOC router, each message encapsulating an operand or a request to perform one or more DSP computations; and a few cycles later, sends a response message with the results back to the client. In an embodiment, the DSP function is configured as a specific fixed operation. In an embodiment, the DSP function is dynamic and is communicated to the DSP block, along with the function operands, in the NOC message. In an embodiment, a DSP NOC client core may comprise an embedded DSP block. In an embodiment, a DSP NOC client core may comprise a plurality of embedded DSP blocks.

Embedded floating-point DSP blocks are fixed logic to perform floating-point math functions such as add and multiply. One example is the Altera floating-point DSP block. An FPGA's many floating-point DSP blocks and floating-point enhanced DSP blocks may also be accessed over the NOC via a floating-point DSP NOC client core. The latter accepts a stream of messages from its NOC router, each message encapsulating an operand or a request to perform one or more floating-point computations; and a few cycles later, sends a response message with the results back to the client. In an embodiment, the floating-point DSP function is configured as a specific fixed operation. In an embodiment, the floating-point DSP function is dynamic and is communicated to the DSP block, along with the function operands, in the NOC message. In an embodiment, a floating-point DSP NOC client core may comprise an embedded floating-point DSP block. In an embodiment, a DSP NOC client core may comprise a plurality of floating-point embedded DSP blocks.

A brief example illustrates the utility of coupling the internal FPGA resources, such as block RAMs and floating-point DSP blocks, with a NOC so that they may be easily and dynamically composed into a parallel-computing device. In an embodiment, in an FPGA, each of the hundreds of block RAMs and hundreds of floating-point DSP blocks are coupled to a NOC via a plurality of block RAM NOC client cores and floating-point DSP NOC client cores. Two vectors A[,] and B[,] of floating-point operands are loaded into two block RAM NOC client cores. A parallel dot product of the two vectors may be obtained by means of 1) the two vectors' block RAMs contents are streamed into the NOC as messages and both sent to a first floating-point DSP NOC client core, which multiplies them together; the resulting stream of elementwise products is sent by the first floating-point DSP NOC client core via the NOC to a second floating-point DSP NOC client core, which adds each product together to accumulate a dot product of the two vectors. In another embodiment, two N×N matrices A[,] and B[,] are distributed, row-wise and column-wise, respectively, across many block RAM NOC client cores; and an arrangement of N×N instances of the prior embodiment's dot-product pipeline are configured so as to stream each row of A and each column of B into a dot-product pipeline instance. The results of these dot-product computations are sent as messages via the NOC to a third set of block RAM NOC client cores that accumulate the matrix-multiply-product result C[,]. This embodiment performs a parallel, pipelined, high-performance floating-point matrix multiply. In this embodiment, all of the operands and results are carried between memories and function units over the NOC. It is particularly advantageous that the data-flow graph of operands and operations and results is not fixed in wires nor in a specific programmable-logic configuration, but rather is dynamically achieved by simply varying the (x,y) destinations of messages between resources sent via the NOC. Therefore, a data-flow-graph fabric of memories and operators may be dynamically adapted to a workload or computation, cycle by cycle, microsecond by microsecond.

Another important FPGA resource is a configuration unit. Some examples include the Xilinx ICAP (Internal Configuration Access Port) and PCAP (Processor Configuration Access Port). A configuration unit enables an FPGA to reprogram, dynamically, a subset of its programmable logic, also known as "partial reconfiguration", to dynamically configure new hardware functionality into its FPGA fabric. By coupling an ICAP to the NOC by means of a configuration unit NOC client core, the ICAP functionality is made accessible to the other client cores of the NOC. For example, a partial-reconfiguration bitstream, used to configure a region of the programmable logic fabric, may be received from any other NOC client core. In an embodiment, the partial-reconfiguration bitstream is sent via an Ethernet NIC client core. In an embodiment, the partial-reconfiguration bitstream is sent via a DRAM channel NOC client core. In an embodiment, the partial-reconfiguration bitstream is sent from a hardened embedded-microprocessor subsystem via an embedded-processor NOC client core.

In a dynamic-partial-reconfiguration system, the partially reconfigurable logic is generally floor planned into specific regions of the programmable logic fabric. A design challenge is how this logic may be best communicatively coupled to other logic in the system, whether fixed programmable logic or more dynamically reconfigured programmable logic, anticipating that the logic may be replaced by other logic in the same region at a later moment. By coupling the reconfigurable logic cores to other logic by means of a NOC, it becomes straightforward for any reconfigurable logic to communicate with non-reconfigurable logic and vice versa. A partial-reconfig NOC client core comprises a partial-reconfig core designed to directly attach to a NOC router on a fixed set of FPGA nets (wires). A series of different partial-reconfig NOC client cores may be loaded at a particular site in an FPGA. Since each reconfiguration directly couples to the NOC router's message input and output ports, each enjoys full connectivity with other NOC client cores in the system.

Additional Aspects

In an embodiment, a system floor-planning EDA tool incorporates configuration and floor planning of NOC topologies, and may be used to place and interconnect client core blocks to routers of the NOC.

In an embodiment, an FPGA-implementation place-and-route EDA tool incorporates interconnection to a NOC to facilitate simpler, incremental, or parallel place-and-route algorithms.

In an embodiment in which the plurality of routers forms a directional 2D torus NOC, the X and Y outputs are connected to the XI and YI inputs of other routers on an X ring and a Y ring, respectively, but in an alternative embodiment, diverse NOC topologies may be composed from the routers, by alternative interconnections of links, for example, and without limitation, a 1D shift register, a 1D ring, 1D ring with additional "express" links (i.e., that connect a first router to a second router that is, e.g., four hops away on the ring, in order to reduce the average number of hops it takes for a message to be routed from a source router to a destination router on a large ring), a 1D bidirectional ring, 1D double bandwidth ring, 2D mesh, hybrid of a 1D ring and a 1D shift register, 2D torus (e.g., conventional 2D torus with bidirectional links), binary trees, and higher-dimension NOC topologies. In particular, the configurability of the router's routing circuit and the extensibility of the message-data layout, via adding routing data to the D_W data-payload size, and the utility of a configured routing circuit able to inspect and route upon any data in any field of an input message, affords great flexibility in the composition of 2D routers into diverse NOC topologies with diverse message-routing algorithms. The use of terms XI/X and YI/X for "first-dimension input/output" and "second-dimension input/output," and expressions such as "X output to the next router on the X ring" (respectively Y), herein for purposes of clear disclosure of 2D directional torus routing, are not limiting the disclosure to 2D directional torus NOC topologies only. In an embodiment, a higher dimension NOC, for example a three dimensional NOC, may comprise a disclosed 2D torus NOC.

In an embodiment, a plurality of routers form a NOC. In an embodiment, a system may comprise a plurality of NOCs. Referring to FIG. 1, as seen in 152 and 150, a NOC may be a composite or hierarchical NOC composed of routers whose "clients cores" themselves comprise NOCs of other clients.

Referring to FIG. 3, in an embodiment, during each clock cycle, a router accepts input messages and routes them, registering the router outputs in the router output registers 336 and 338. In an alternative embodiment, either or both of the router output registers 336 and 338 may not exist, i.e., the router switching circuit may be combinational rather than pipelined. In another embodiment, for higher-clock-frequency operation by additional degrees of pipelining, additional pipeline input or output registers may be added within the router, or pipeline registers may be employed between routers in the inter-router links. In an embodiment, router pipelining may not require actual register or flip-flop state elements (e.g., 'wave pipelining'). In an embodiment, where an FPGA programmable interconnect fabric may be enhanced to provide optional pipeline registers in the interconnect itself, a system may employ the FPGA's pipelined interconnect within routers or between routers (e.g., pipelined inter-router links) for higher-frequency operation or for lower-resource consumption. An example of such an embodiment is an implementation of the router and NOC in an Altera Stratix 10 device. In this embodiment, NOC links (i.e., the set of signals carrying a message 298 (FIG. 2A) and a corresponding valid indicator to a router's message input port or from a router's output port) are pipelined, and the link pipeline registers are configured to employ Stratix 10 "HyperFlex" pipeline registers in the interconnect fabric.

Some applications of an embodiment include, without limitation, 1) reusable modular "IP" NOCs, routers, and switch fabrics, with various interfaces including AXI4; 2) interconnecting FPGA subsystem client cores to interface controller client cores, for various devices, systems, and interfaces, including DRAMs and DRAM DIMMs, in-package 3D die stacked or 2.5D stacked silicon interposer interconnected HBM/WideIO2/HMC DRAMs, SRAMs, FLASH memory, PCI Express, 1G/10G/25G/40G/100G/400G networks, FibreChannel, SATA, and other FPGAS; 3) as a component in parallel-processor overlay networks; 4) as a component in OpenCL host or memory interconnects; 5) as a component as configured by a SOC builder design tool or IP core integration electronic design automation tool; 4) use by FPGA electronic design automation CAD tools, particularly floor-planning tools and programmable-logic placement and routing tools, to employ a NOC backbone to mitigate the need for physical adjacency in placement of subsystems, or to enable a modular FPGA implementation flow with separate, possibly parallel, compilation of a client core that connects to the rest of system through a NOC client interface; 6) use of floor-planned NOCs in dynamic-partial-reconfiguration systems to provide high-bandwidth inter-connectivity between dynamic-partial-reconfiguration blocks, and via floor planning to provide guaranteed logic- and interconnect-free "keep-out zones" for facilitating loading new dynamic-logic regions into the keep-out zones, and 7) use of the disclosed router and NOC system as a component or plurality of components, in computing, datacenters, datacenter application accelerators, high-performance computing systems, machine learning, data management, data compression, deduplication, databases, database accelerators, networking, network switching and routing, network processing, network security, storage systems, telecom, wireless telecom and base stations, video production and routing, embedded systems, embedded vision systems, consumer electronics, entertainment systems, automotive systems, autonomous vehicles, avionics, radar, reflection seismology, medical diagnostic imaging, robotics, complex SOCs, hardware emulation systems, and high frequency trading systems.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure. Furthermore, "connect" and "couple", and their various forms, are used interchangeably to mean that there can be one or more components between two other components that are "connected" or "coupled" to one another.

The invention claimed is:

1. A system, comprising:
   a first unidirectional ring of routers including a first router;
   a second unidirectional ring of routers including a second router;
   a first client core coupled to the first router;
   a second client core coupled to the second router;
   a third router, disposed in both of the first and second rings, configured to couple first data from the first ring to one of the first and second rings responsive to a destination of the first data, and to couple second data from the second ring to one of the first and second rings responsive to a destinations of the second data; and
   wherein the first, second, and third routers are configured to couple third data from the first client core to the second client core responsive to a destination of the third data being the second client core.

2. The system of claim 1 wherein at least one of the first and second client cores comprises a memory interface core.

3. The system of claim 2 wherein the memory interface core comprises or is coupled to a dynamic RAM (DRAM) controller or a High Bandwidth Memory controller or a High Bandwidth Memory channel controller or a Hybrid Memory Cube controller or a Hybrid Memory Cube channel controller.

4. The system of claim 2 wherein the memory interface core is communicatively coupled to a DRAM or a High Bandwidth Memory DRAM or a Hybrid Memory Cube DRAM.

5. The system of claim 2 wherein the memory interface core comprises or is coupled to a FLASH memory controller or a 3DXPoint memory controller.

6. The system of claim 2 wherein the memory interface core is communicatively coupled to a FLASH memory or a 3DXPoint memory.

7. The system of claim 2 wherein the system further comprises a second memory interface client core coupled to a router.

8. The system of claim 1 wherein at least one of the first and second client cores comprises or is coupled to a network interface core.

9. The system of claim 8 wherein the network interface core comprises or is coupled to an Ethernet controller or an Ethernet media access controller or an Interlaken interface controller or a RapidIO interface controller or an InfiniBand interface controller or an Omni-Path interface controller or a Fibre Channel interface controller.

10. The system of claim 8 wherein the network interface core is communicatively coupled to an Ethernet media access controller or an Ethernet physical interface or an optical transceiver or Interlaken transceivers or RapidIO transceivers or InfiniBand transceivers or Omni-Path transceivers or Fibre Channel transceivers.

11. The system of claim 1 wherein at least one of the first and second client cores is communicatively coupled to a PCI express interface.

12. The system of claim 1 wherein at least one of the first and second client cores is communicatively coupled to a circuit via PCI express.

13. The system of claim 1 at least one of the first and second client cores comprises or is coupled to a SATA interface controller.

14. The system of claim 1 wherein at least one of the first and second client cores is communicatively coupled to a device via a SATA interface.

15. The system of claim 1 wherein at least one of the first and second client cores comprises or is coupled to a bridge to a second interconnection network.

16. The system of claim 15 wherein the second interconnection network is in the same device or is in a second device or is in a multi-die package.

17. The system of claim 15 wherein the second interconnection network is a network on a chip (NOC).

18. The system of claim 17 wherein the NOC is a hard NOC implemented in fixed logic or is a soft NOC implemented in programmable logic.

19. The system of claim 1 wherein at least one of the first and second client cores comprises or is coupled to an IP interface bridge core.

20. The system of claim 19 wherein the IP interface bridge core comprises an AXI4-Stream bridge core or an AXI4-Memory-Mapped bridge core or an Advanced Microcontroller Bus Architecture (AMBA) bridge core.

21. The system of claim 19 wherein the IP interface bridge core is communicatively coupled to another core via an AXI4-Stream interface or via an AXI4-Memory-Mapped interface or via an AMBA interface.

22. The system of claim 1 wherein at least one of the first and second client cores comprises or is coupled to a processor core.

23. The system of claim 1 wherein the processor core is implemented in fixed logic or is implemented in programmable logic.

24. The system of claim 1 wherein at least one of the first and second client cores comprises or is coupled to a coherent memory interconnect bridge core.

25. The system of claim 1 wherein at least one of the first and second client cores is communicatively coupled via a coherent memory interconnect to a processor.

26. The system of claim 1 wherein at least one of the first and second client cores comprises or is coupled to one or more embedded SRAM blocks.

27. The system of claim 1 wherein at least one of the first and second client cores comprises or is coupled to one or more embedded fixed point DSP blocks or floating point DSP blocks.

28. The system of claim 1 wherein at least one of the first and second client cores comprises or is coupled to an FPGA reconfiguration circuit.

29. The system of claim 1 wherein at least one of the first and second client cores comprises or is coupled to a dynamically reconfigurable circuit.

30. The system of claim 1 wherein the first router is implemented within a first integrated circuit die and the second router is implemented in a second integrated circuit die.

31. The system of claim 1 wherein the third router is implemented in programmable logic or is implemented in fixed logic.

32. The system of claim 1 wherein at least one of the first and second client cores is implemented in programmable logic or is implemented in fixed logic.

33. A non-transitory machine-readable medium storing configuration data that when loaded into a programmable gate array, causes the programmable gate array to instantiate a system comprising:
   a first unidirectional ring of routers including a first router;
   a second unidirectional ring of routers including a second router;
   a first client core coupled to the first router;
   a second client core coupled to the second router;
   a third router, disposed in both of the first and second rings, configured to couple first data from the first ring to one of the first and second rings responsive to a destination of the first data, and to couple the second data from the second ring to one of the first and second rings responsive to a destination of the second data; and
   wherein the first, second, and third routers are configured to couple third data from the first client core to the second client core responsive to a destination of the third data being the second client core.

34. The non-transitory machine-readable medium of claim 33 wherein the first core comprises or is communicatively coupled to a memory interface core or a memory device or a network interface or a PCI express interface or a storage interface or a processor or an IP interface bridge or an AXI4 interface bridge or a NOC or an embedded memory or an embedded DSP block or an FPGA reconfiguration circuit or a dynamically reconfigurable circuit.

* * * * *